United States Patent
Tamura et al.

[11] Patent Number: 5,889,661
[45] Date of Patent: Mar. 30, 1999

[54] POWER CONVERSION APPARATUS, CONTROL METHOD AND UNINTERRUPTIBLE POWER SUPPLY EQUIPPED WITH THE APPARATUS

[75] Inventors: Shizuri Tamura; Akinori Nishihiro; Masakatu Daijoo; Haruji Murakami, all of Tokyo, Japan

[73] Assignee: Mitsubishi Denki Kabushiki Kaisha, Tokyo, Japan

[21] Appl. No.: 881,665

[22] Filed: Jun. 24, 1997

[30] Foreign Application Priority Data

Sep. 10, 1996 [JP] Japan .................................. 8-239329

[51] Int. Cl.⁶ ...................................................... H02M 5/45
[52] U.S. Cl. ................................................................ 363/37
[58] Field of Search .................................. 363/34, 35, 36, 363/37

[56] References Cited

U.S. PATENT DOCUMENTS 5,111,373  5/1992  Higaki ........................................ 363/37
5,654,882  8/1997  Kanazawa et al. ......................... 363/37

FOREIGN PATENT DOCUMENTS

SHO-59-194697  11/1984  Japan .
HEI-787753  3/1995  Japan .

*Primary Examiner*—Matthew Nguyen
*Attorney, Agent, or Firm*—Sughrue, Mion, Zinn, Macpeak & Seas, PLLC

[57] ABSTRACT

A power conversion apparatus and its control method is disclosed in which a main circuit and its control circuit are simplified by allowing part of the main circuit to be shared by a converter section and an inverter section. The power conversion apparatus comprises a converter section 120 and an inverter section 130, each having upper and lower arm switch sections, and a common section 110 also having upper and lower arm switch sections. One phase of an AC input power terminal is connected to one phase of an AC output power terminal. The common phase is also connected to a connection point 1RU of the upper and lower arm switch sections of the common section. The remaining phases of the AC input terminals are connected to connecting points of upper and lower arm switch sections of the converter section, and the remaining phases of the AC output terminals are connected to connection points of upper and lower arm switch sections of the inverter section. The common section and the converter section cooperate to convert the AC input power into a DC power, and the common section and the inverter section cooperate to convert the DC power into an AC output power.

18 Claims, 37 Drawing Sheets

POWER CONVERSION APPARATUS, CONTROL METHOD AND UNINTERRUPTIBLE POWER SUPPLY EQUIPPED WITH THE APPARATUS

FIELD OF THE INVENTION

The present invention relates to a power conversion apparatus that produces an output of the same frequency as that of its input, a control method of power conversion and an uninterruptible power supply equipped with the power conversion apparatus. More particularly, this invention relates to a power conversion apparatus having a PWM controlled converter section and a PWM controlled inverter section, its control method and an uninterruptible power supply equipped with the power conversion apparatus.

DESCRIPTION OF THE RELATED ART

Referring to FIGS. 39 to 50, discussed below is the structure and operation of a conventional uninterruptible power supply employing a power conversion apparatus which receives a three-phase AC input power and outputs a three-phase AC output power having the same frequency as that of the AC input. FIG. 39 is a block diagram showing the main circuit configuration of the uninterruptible power supply, FIG. 40 shows the internal details of switch SWJ7, FIG. 41 shows the internal details of reactor 8, FIG. 42 shows the internal details of filter 11, FIG. 43 shows the internal details of switch SWH12, FIG. 44 shows the internal details of switch SWI14, FIG. 45 shows the internal details of converter section 20, FIG. 46 shows the internal details of inverter section 30, FIG. 47 is a block diagram of the control circuit of the uninterruptible power supply, FIG. 48 is a block diagram showing details of inverter U-phase voltage modulation command generator circuit 50, FIG. 49 is a block diagram showing details of converter current command generator circuit 43, and FIG. 50 is a block diagram showing details of converter R-phase voltage command generator circuit 44.

With respect to the control circuit of FIG. 47, it may be provided separately from the main circuit of FIG. 39. The control circuit is connected between the input terminals 1S and 1R, and is connected across the output terminals 6W, 6V and 6U (FIG. 39). The control circuit is also connected between the positive DC terminal P and the negative DC terminal N (FIG. 39). From the input terminals the control circuit fetches the signals I(S), l(R) and V(RS). Using the signal V(RS) the control circuit determines the reference signals θ(R) and θ(S). From the DC terminals the control circuit fetches the signal V(DC) and using this signal the control circuit determines the phase current command signals I(S)* and I(R)* in conjunction with the signals θ(R) and θ(S). And using the signals I(S) and I(R) the control circuit determines the converter phase voltage modulation command signals V(SNC)* and V(RNC)* in conjunction with the signals I(S)* and I(R)*.

Similarly, from the output terminals the control circuit fetches the signals I(V), I(U), V(VW) and V(UW). Using the signals V(VW) and V(UW) the control circuit determines the signals V(VNI) and V(UNI). And using the signals I(V) and I(U) the control circuit determines the signal I(W), and determines the inverter phase voltage modulation command signals V(VNI)*, V(UNI)* and V(WNI)* in conjunction with the signals V(VNI), V(UNI), θ(R) and θ(S).

In the figures, the same reference numerals denote the same or equivalent components. Shown in the figures are power conversion apparatus 70, included within uninterruptible power supply 80 (FIG. 39). The uninterruptible power supply 80 includes a normal operation path via the power conversion apparatus 70 and a by-pass path via isolating transformer 13. The selection of paths is generally accomplished using switches SWJ7, SWH12 and SWI14. During normal operation switch SWH7 supplies the input AC power to the reactor 8, which transfers the input power to the AC/DC converter section 20. The converter section 20 converts the three-phase AC input power into a DC power, and provides its DC output to the inverter section 30. The inverter section 30 converts the DC power into a three-phase AC power having the same frequency as the three-phase AC input power. The output of the converter section 30 is then filtered by filter 11 and provided to the output terminals via switch SWH12.

A more detailed explanation of the operation of the conventional power supply 80 is provided below. However, first a more detailed explanation of the various elements shown in the drawings is provided.

Switch SWJ7 is made up of switches SWJ1, SWJ2 and SWJ3 (FIG. 40), and reactor 8 is made up of reactors L11, L12 and L13 (FIG. 41). Smoothing capacitor 9 is provided in the power conversion apparatus 70 for smoothing the DC output of converter section 20 before it is applied to inverter 30. Battery unit 10 is provided for supplying a DC power by closing switch SW when a three-phase power source (not shown) is in abnormal conditions, such as during power interruptions. Filter 11 is constructed of reactors L21, L22 L23 and C1, C2 and C3 (FIG. 42). Switch SWH12 is made up of switches SWH1, SWH2, and SWH3 (FIG. 43). Three-phase isolating transformer 13 is connected to switch SWI14 which is made up of switches SWI1, SWI2, and SWI3 (FIG. 44).

There are also shown terminals 1R, 1S, and 1T, to which R-phase, S-phase and T-phase of the three-phase AC power source are supplied. Three-phase terminals 2R, 2S, and 2T are shown between switch SWJ7 and reactor 8, and three-phase terminals 3R, 3S and 3T are shown between reactor 8 and converter section 20. Three-phase terminals 4U, 4V, and 4W are shown between inverter section 30 and filter 11, and three-phase terminals 5U, 5V and 5W are shown between filter 11 and switch SWH12. Three-phases AC output terminals 6U, 6V and 6W are connected to a load (not shown) to be driven, and three-phase terminals 7R, 7S and 7T are shown between isolating transformer 13 and switch SWI14. Positive DC terminal P is provided for the positive DC output of converter section 20, and negative DC terminal N is provided for the negative DC output of converter section 20. Also provided are neutral point NC (not shown) of the three-phase AC power source, and neutral point NI (node of capacitors C1, C2, and C3 shown in FIG. 42) of the output of inverter section 30.

Shown in FIG. 45 are T-phase upper and lower arm switch sections 21, S-phase upper and lower arm switch sections 22, and R-phase upper and lower arm switch sections 23, which respectively include upper arm switch section 21a and lower arm switch section 21b, upper arm switch section 22a and lower arm switch section 22b, and upper arm switch section 23a and lower arm switch section 23b. Each of the upper and lower arm switch sections 21a, 21b, 22a, 22b, 23a, and 23b is constructed of a switching element such as a transistor, FET, or IGBT, and a diode in an inverse-parallel connection.

Shown in FIG. 46 are W-phase upper and lower arm switch sections 31, V-phase upper and lower arm switch sections 32, and U-phase upper and lower arm switch sections 33, which respectively include upper arm switch section 31a and lower arm switch section 31b, upper arm switch section 32a and lower arm switch section 32b, and upper arm switch section 33a and lower arm switch section 33b. Each of the upper and lower arm switch sections 31a, 31b, 32a, 32b, 33a, and 33b is constructed of a switching element such as a transistor, FET, or IGBT, and a diode in an inverse-parallel connection.

Turning to FIG. 47, the various elements of the control section of the conventional power supply will be described below. While not shown in the drawings, converter drive circuit 47 is connected to the AC/DC converter section 20 to provide the control signals to the converter section 20 (FIG. 39). Similarly, inverter drive circuit 54 is connected to the DC/AC inverter section 30 of the main circuit to provide the drive signals to the inverter section 30.

A PLL circuit 40 is provided for generating a reference signal corresponding to the input V(RS) that is one of line-to-line voltages of the three-phase AC input power. Phase transformation circuit 41 is provided for generating, in response to the output signal of PLL circuit 40, two different phase signals having predetermined phase differences. Trigonometric function generator circuit 42 is provided for generating sinusoidal wave signals corresponding to the two different phase signals of phase transformation circuit 41. Converter current command generator circuit 43 outputs R-phase current command signal l(R)* and S-phase current command signal I(S)* of converter section 20, while receiving measured voltage signal V(DC) measured across smoothing capacitor 9, DC voltage command signal V(DC)* and the two sinusoidal wave signals sinθ(R) and sinθ(S) of trigonometric function generator circuit 42.

Further shown is converter R-phase voltage modulation command generator circuit 44 that outputs converter R-phase voltage modulation-command signal V(RNC)*, while receiving measured R-phase current value signal I(R) of the three-phase AC input power and R-phase current command signal I(R)* of converter current command generator circuit 43. Converter S-phase voltage modulation command generator circuit 45 outputs converter S-phase voltage modulation command signal V(SNC)*, while receiving measured S-phase current value signal I(S) of the three-phase AC input power and S-phase current command signal I(S)* from converter current command generator circuit 43. Converter T-phase voltage modulation command generator circuit 46 outputs converter T-phase voltage modulation command signal V(TNC)* (=−V(RNC)*−V(SNC)*), while receiving converter R-phase voltage modulation command signal V(RNC)* and converter S-phase voltage modulation command signal V(SNC)*. Converter drive circuit 47 outputs signals that PWM-control R-phase, S-phase, and T-phase upper and lower switch sections 23, 22, and 21 of converter section 20, while receiving converter R-phase voltage modulation command signal V(RNC)*, converter S-phase voltage modulation command signal V(SNC)* and converter T-phase voltage modulation command signal V(TNC)*.

Inverter phase voltage command generator circuit 48 outputs inverter phase voltage command signals V(AC)*sinθ(R) and V(AC)*sinθ(S), while receiving inverter phase voltage command signal V(AC)* and two sinusoidal wave signals sinθ(R) and sinθ(S) of trigonometric function generator circuit 42. Voltage converter circuit 49 measures line-to-line voltages V(UW) and V(VW) across three-phase AC output terminals 6U, 6V and 6W, while producing voltage signals V(UNI) and V(VNI) between each of AC output terminals 6U and 6V and neutral point NI of capacitors C1, C2 and C3 shown in FIG. 42, in accordance with the following equations.

$$V(UNI)=(V(UV)-V(WU))/3$$

$$V(VNI)=(V(VW)-V(UV))/3$$

$$V(UV)=-V(VW)-V(WU)$$

Inverter U-phase voltage modulation command generator circuit 50 outputs an inverter U-phase voltage modulation command signal V(UNI)* and U-W-phase voltage computing signal V(UNI)W, while receiving inverter phase voltage command signal V(AC)*sinθ(R), voltage signal V(UNI) of voltage converter circuit 49, and measured value signal I(U) of U-phase current of the three-phase AC output power. Inverter V-phase voltage modulation command generator circuit 51 outputs inverter V-phase voltage modulation command signal V(VNI)* and V-W-phase voltage computing signal V(VNI)W, while receiving inverter phase voltage command signal V(AC)*sinθ(S), voltage signal V(VNI) of voltage converter circuit 49 and measured value signal I(V) of the V-phase current of the three-phase AC power output.

W-phase current generator circuit 52 computes W-phase current signal I(W)(=−I(U)−I(V)) while receiving U-phase current measured value signal I(U) and V-phase current measured value signal I(V) of the three-phase AC output power. Inverter W-phase voltage modulation command generator circuit 53 outputs inverter W-phase voltage modulation command signal V(WNI)* while receiving W-phase current signal I(W), U-W-phase voltage computing signal V(UNI)W and V-W-phase voltage computing signal V(VNI)W, and inverter drive circuit 54 outputs signals that PWM-control the U-phase, V-phase, and W-phase upper and lower arm switch sections 33, 32, 31 of inverter section 30 while receiving inverter U-phase voltage modulation command signal V(UNI)*, inverter V-phase voltage modulation command signal V(VNI)* and inverter W-phase voltage modulation command signal V(WNI)*.

Subtracter 501 (FIG. 48) subtracts voltage signal V(UNI) of voltage converter circuit 49 from inverter phase voltage command signal V(AC)*sinθ(R) of inverter phase voltage command generator circuit 48, and PID circuit 502 generates U-W-phase voltage computing signal V(UNI)W by PID (Proportional plus Integral plus Derivative) controlling output signal of subtracter 501. Reactor voltage-drop generator circuit 503 is for computing a voltage drop caused by reactor L23 by differentiating U-phase current measured value signal I(U), and adder 504 generates inverter U-phase voltage modulation command signal V(UNI)* by adding the output signal of reactor voltage-drop generator circuit 503 to the U-W-phase voltage computing signal V(UNI)W.

Subtracter 431 of current command generator 43 (FIG. 49) subtracts measured voltage signal V(DC) measured across smoothing capacitor 9 from DC voltage command signal V(DC)*, and PI circuit 432 amplifies the output signal of subtracter 431 by PI (Proportional plus Integral) control. Multiplier 433 multiplies sinusoidal wave signal sinθ(R) of trigonometric function generator circuit 42 by the output signal of PI circuit 432 to generate R-phase current command signal I(R)*, and multiplier 434 multiplies sinusoidal wave signal sinθ(S) of trigonometric function generator circuit 42 by the output signal of PI circuit 432 to generate S-phase current command signal I(S)*.

Subtracter 441 of R-Phase voltage command generator 44 (FIG. 50) subtracts R-phase current command signal I(R)* of converter current command generator circuit 43 from R-phase current measured value signal I(R), and P circuit 442 amplifies the output signal of subtracter 441 by P (Proportional) control to generate converter R-phase voltage modulation command signal V(RNC)*.

The operation of the uninterruptible power supply is now discussed. During normal operation both switch SWJ7 and switch SWH12 are closed, and switch SWI14 is open. The three-phase AC power input from terminals 1R, 1S and 1T is converted to a DC power through converter section 20 and reactor 8. In this case, R-phase, S-phase, and T-phase upper and lower arm switch sections 23, 22, 21 are PWM-controlled by converter drive circuit 47 so that input current waveform of each of R-phase, S-phase and T-phase of the three-phase AC power is sinusoidal wave and the phase of each of R-phase, S-phase and T-phase currents is in phase with each of the R-phase, S-phase and T-phase voltages, respectively, for the input power factor to be approximately 1, and for the voltage across smoothing capacitor 9 to be equal to DC voltage command signal V(DC)*.

In the control method of the power supply, line-to-line voltages V(RS) between R-phase and S-phase of the three-phase AC power input is fed to PLL circuit 40 as a reference signal. Then, phase transformation circuit 41 produces two phases having predetermined phase differences with respect to line-to-line voltage V(RS) (the phase differences are referenced to a phase voltage with respect to the line-to-line voltage). For example, suppose that line-to-line voltage V(RS) has a phase difference of θ with respect to a given reference, then θ(R)=θ−π/6, and θ(S)=θ−5π/6. Trigonometric function generator circuit 42 generates the sinusoidal wave signals corresponding to these phases. The resulting signals are sinθ(R) (=sin (θ−π/6)) and sinθ(S) (=sin (θ−5π/6)).

Converter current command generator circuit 43 generates an error signal between measured voltage signal V(DC) measured across smoothing capacitor 9, and DC voltage command signal V(DC)*, performs PI control to amplify the error signal, and computes the product of the amplified error signal and each of sinusoidal wave signals sinθ(R) and sinθ(S) to produce R-phase current command signal I(R)* and S-phase current command signal I(S)*. R-phase and S-phase currents I(R) and I(S) out of the three-phase AC input currents are detected. Converter R-phase voltage modulation command generator circuit 44 amplifies by P control the difference between detected current I(R) and R-phase current command signal I(R)* to produce converter R-phase voltage modulation command signal V(RNC)*. In a similar fashion, converter S-phase voltage modulation command generator circuit 45 derives converter S-phase voltage modulation command signal V(SNC)* from detected current I(S) and R-phase current command signal I(S)*.

Converter T-phase voltage modulation command generator circuit 46 produces another phase signal, namely, converter T-phase voltage modulation command signal V(TNC)*, based on converter R-phase voltage modulation command signal V(RNC)* and converter S-phase voltage modulation command signal V(SNC)*, and the converter voltage modulation command signals for the three phases are obtained. These three-phase converter modulation command signals are fed to converter drive circuit 47 to PWM control three pairs of upper and lower arm switch sections 21, 22, and 23 of converter section 20, to control the input power factor to be approximately 1, and to control the voltage across smoothing capacitor 9 to be a predetermined DC voltage. A high power factor control using PWM control is disclosed in Japanese Patent Laid-Open Publication No. 59-194697 and is a known technique.

The DC voltage between positive DC terminal P and negative DC terminal N is PWM-controlled by inverter section 30 and filter 11 so that each of U-phase, V-phase and W-phase AC output voltages is at a predetermined amplitude voltage V(AC)* and is of a sinusoidal three-phase waveform having the same frequency as the three-phase AC input. Thus, three-phase AC output power at a predetermined voltage and of the same frequency as the three-phase AC input power appears at output terminals 6U, 6V and 6W.

Namely, inverter phase voltage command generator circuit 48 produces two inverter phase voltage command signals V(AC)*sinθ(R) and V(AC)*sinθ(S), having predetermined voltage amplitude value V(AC)*. Inverter U-phase voltage modulation command generator circuit 50 PID-controls an error signal that is the difference between inverter phase voltage command signal V(AC)*sinθ(R) and voltage signal V(UNI) of voltage converter circuit 49 to produce U-W-phase voltage computing signal V(UNI)W. Reactor voltage-drop generator circuit 503 (FIG. 48) differentiates detected current I(U) to compute the voltage drop caused by reactor L23, and the resulting voltage drop is added to the U-W-phase voltage computing signal V(UNI)W (to compensate for the voltage drop due to reactor L23), and inverter U-phase voltage modulation command signal V(UNI)* is thus produced.

In a similar fashion, inverter V-phase voltage modulation command generator circuit 51 produces V-W-phase voltage computing signal V(VNI)W and inverter V-phase voltage modulation command signal V(VNI)* based on inverter phase voltage command signal V(AC)*sinθ(S) and voltage signal V(VNI) of voltage converter circuit 49. Inverter W-phase voltage modulation command generator circuit 53 inverts in polarity the sum of U-W-phase voltage computing signal V(UNI)W and V-W-phase voltage computing signal V(VNI)W, and adds, to the inverted result, the voltage drop component due to reactor L21 and current I(W) of W-phase current generator circuit 52 in order to produce inverter W-phase voltage modulation command signal V(WNI)*. These three-phase inverter phase voltage command signals are fed to inverter drive circuit 54, to PWM-control three pairs of upper and lower arm switch sections 31, 32, and 33 of inverter section 30, and thus a three-phase AC output power at a predetermined voltage and of the same frequency as the three-phase AC input power is obtained.

The battery unit 10 is normally charged by a charger circuit (not shown) or directly by smoothing capacitor 9, and works as an input power source for inverter section 30 when the three-phase AC input power is abnormal, for example during power interruptions or instantaneous voltage drops.

If converter section 20 or inverter section 30 malfunctions, both switches SWJ7 and SWH12 are opened, and switch SWI14 is closed. The three-phase AC output power is output on terminals 6U, 6V and 6W through isolating transformer 13 and switch SWI14. In the event of such a malfunction, the three-phase AC output power has to be instantaneously switched to the output terminals 6U, 6V and 6W. To this end, there must be a duration during which switch SWJ7, switch SWH12 and switch SWI14 are concurrently closed.

The output voltage of the bypass circuit made of isolating transformer 13 and the output voltage of inverter section 30 have to be in-phase and at the same potential. Converter section 20 switches the potential of the input of reactor 8 between P and N potential, while the potential at each of output terminals 6U, 6V and 6W is the sinusoidal wave voltage with respect to the reference of inverter section 30, and thus, the reference potential at the AC input side and the reference potential of the output side of inverter section 30 are different. If switch SWJ7, switch SWH12 and switch SWI14 are concurrently closed without isolating transformer 13, components having different reference potentials will be connected, causing a short-circuit current to flow through the switching elements.

The prior art power conversion apparatus requires reactors L11, L12, and L13 corresponding to the number of phases of the AC input power source, and upper and lower arm switch sections 21, 22, and 23 of converter section 20 corresponding to the number of phases. The prior art power conversion apparatus further requires upper and lower arm switch sections 31, 32, and 33 of inverter section 30 corresponding to the number of phases of the AC output, and filter 11 made up of reactors L21, L22, and L23 and capacitors C1, C2 and C3. Since converter drive circuit 47 and inverter drive circuit 54 require command signals corresponding to the number of phases for controlling the switching elements and circuits and driving, each of the switching elements, the number of components of the main circuit and control circuit of the apparatus increases, thereby increasing the weight and making the apparatus bulky.

The converter phase voltage modulation command corresponding to the phases of the AC input power source is required on a per phase basis. Similarly, the inverter phase voltage modulation command corresponding to the phases of the AC output is required on a per phase basis. Therefore, converter and inverter phase voltage modulation command generator circuits 44, 45, 46, 50, 51, and 53 are required corresponding to the number of phases of the AC input and the number of phases of the AC output. Furthermore, since both the converter and the inverter use the modulation commands corresponding to phase voltages, voltage converter circuit 49 is required to convert the line-to-line voltage of the detected AC output power into the phase voltage.

Furthermore, the uninterruptible power supply equipped with the power conversion apparatus requires a number of switches corresponding to the number of phases for each of switch SWJ7, switch SWH12 and switch SWI14. The bypass circuit requires isolating transformer 13 to absorb the potential difference when the three-phase AC input power source is switched to the output of inverter section 30 in an uninterrupted fashion. Thus, the number of components increases, thereby increasing the weight of the power supply and making the power supply bulky.

SUMMARY OF THE INVENTION

The present invention has been developed to resolve the above problems, and it is an object of the present invention to provide an apparatus and control method for power conversion which feature a reduced component count and reduced weight in its main circuit and control circuit, with part of the upper and lower arm switch sections shared by the converter and the inverter in their control.

It is another object of the present invention to provide an uninterruptible power supply that incorporates a power conversion apparatus featuring a reduced component count and reduced weight in its main circuit and control circuit. Additionally, the conventional isolating transformer in the bypass circuit that transfers a three-phase AC input power to an output side is eliminated.

According to a general aspect of the invention, the power conversion apparatus of the present invention comprises a converter section for converting an AC power into a DC power by PWM-controlling a plurality of switch sections, and an inverter section for converting the DC power into an AC power by PWM-controlling a plurality of switch sections. A common section is provided which cooperates with the converter section for converting the AC power into a DC power, and with the inverter section for inverting the DC power into an AC power, by PWM-controlling a plurality of switch sections. A converter control section performs PWM control for converting the AC input power into the DC power through the combination of the common section and the converter section, and an inverter control section performs PWM control for converting the DC power into an AC output through the combination of the common section and the inverter section.

Each of the converter section, the inverter section and the common section comprises at least one pair of upper and lower arm switch sections. One phase of the AC input power is commonly connected to one phase of the AC output power, and the commonly connected phase is also connected to a common connecting point of the upper arm switch section and the lower arm switch section of the common section. The other phases of the AC input are connected to connecting points of the upper arm switch sections and the lower arm switch sections of the converter section, and the other phases of the AC output power are connected to connecting points of the upper arm switch sections and the lower arm switch sections of the inverter section.

In one embodiment, each of the converter section and the inverter section comprises two pairs of upper and lower arm switch sections, and the common section comprises a pair of upper and lower arm switch sections. Two phases of a three-phase AC input power are connected to respective connecting points of the two pairs of upper and lower arm switch sections of the converter section, and two phases of a three-phase AC output power are connected to respective connecting points of the two pairs of upper and lower arm switch sections of the inverter section.

In another embodiment, the converter section comprises two pairs of upper and lower arm switch sections and each of the inverter section and the common section comprises a pair of upper and lower arm switch sections. Two phases of a three-phase AC input power are connected to respective connecting points of the two pairs of upper and lower arm switch sections of the converter section, and one phase of a single phase AC output power is connected to a connecting point of the pair of upper and lower arm switch sections of the inverter section.

In a still another embodiment, each of the converter section and the common section comprises a pair of upper and lower arm switch sections, and the inverter section comprises two pairs of upper and lower arm switch sections. One phase of a single phase AC input power is connected to a connecting point of the pair of upper and lower arm switch sections of the converter, and two phases of a three-phase AC output power are connected to respective connecting points of the two pairs of upper and lower arm switch sections of the inverter section.

A control method is disclosed which comprises the steps of: using as a reference signal at least one phase of the AC input power, producing a common section voltage modulation signal that PWM-controls the common section according to the reference signal, producing a converter section voltage modulation signal and an inverter section voltage modulation signal each having a predetermined phase difference with respect to the common section voltage modulation signal, using as a PWM modulation signal of the converter control section the converter section voltage modulation signal and the common section voltage modulation signal, and using, as a PWM modulation signal of the inverter control section, the inverter section voltage modulation signal and the common section voltage modulation signal.

When each of the converter section, the inverter section and the common section comprises at least a pair of upper and lower arm switch sections, the method further comprises the steps of: commonly connecting one phase of the AC input power to one phase of the AC output, connecting the commonly connected phase to a common connecting point of the upper arm switch section and the lower arm switch section of the common section, connecting the remaining phases of the AC input power to connecting points of the upper arm switch sections and the lower arm switch sections of the converter section, connecting the remaining phases of the AC output power to connecting points of the upper arm switch sections and the lower arm switch sections of the inverter section, and producing the reference signal from a line-to-line voltage between the commonly connected phase of the AC input power and the other phase of the AC input power.

When each of the converter section and the inverter section comprises two pairs of upper and lower arm switch sections, and the common section comprises a pair of upper and lower arm switch sections, the method further comprises the steps of: connecting two phases of the three-phase AC input power to respective connecting points of the two pairs of upper and lower arm switch sections of the converter section, connecting two phases of the three-phase AC output power to respective connecting points of the two pairs of upper and lower arm switch sections of the inverter section, producing the common section voltage modulation signal based on the reference signal with a line-to-line phase relationship introduced, and producing the inverter section voltage modulation signal based on the common section voltage modulation signal and a line-to-line voltage modulation signal that is produced based on line-to-line voltages between one phase of an AC output power commonly connected to one phase of the AC input power and the other two phases of the AC output power.

When each of the converter section and the inverter section comprises two pairs of upper and lower arm switch sections, and the common section comprises a pair of upper and lower arm switch section, the method further comprises the steps of: connecting two phases of the three-phase AC input power to respective connecting points of the two pairs of upper and lower arm switch sections of the converter section, connecting two phases of the three-phase AC output power to respective connecting points of the two pairs of upper and lower arm switch sections of the inverter section, producing the common section voltage modulation signal based on the reference signal with a line-to-line phase relationship introduced, and producing the converter section voltage modulation signal based on the common section voltage modulation signal and a line-to-line voltage modulation signal that is produced based on line-to-line voltages between one phase of an AC output power commonly connected to one phase of the AC input power and the other two phases of the AC input power.

The function signal used to generate the common phase voltage modulation signal for PWM-controlling the common section may be a sinusoidal wave signal, a trapezoidal-wave signal or a triangular-wave signal.

An uninterruptible power supply equipped with a power conversion apparatus according to the invention comprises: a converter section for converting an AC power into a DC power by PWM-controlling a plurality of switch sections, an inverter section for converting a DC power into an AC power by PWM-controlling a plurality of switch sections, a common section for converting the AC power into the DC power or the DC power into an AC power by PWM-controlling a plurality of switch sections, a converter control section that performs PWM control for converting an AC input power into a DC power through a combination of the common section and the converter section, an inverter control section that performs PWM control for converting the DC power into an AC output power through the combination of the common section and the inverter section, and a switch section for selectively applying to output terminals either the AC input power or the AC output power of the inverter section.

In one embodiment, each of the converter section, the inverter section and the common section comprises at least one pair of upper and lower arm switch sections. One phase of the AC input power is commonly connected to one phase of the AC output power, and the commonly connected phase is connected to a common connecting point of the upper arm switch section and the lower arm switch section of the common section. Other phases of the AC input power are connected to connecting points of the upper arm switch sections and the lower arm switch sections of the converter section, and other phases of the AC output power are connected to connecting points of the upper arm switch sections and the lower arm switch sections of the inverter section.

In another embodiment, each of the converter section and the inverter section comprises two pairs of upper and lower arm switch sections, and the common section comprises a pair of upper and lower arm switch section. Two phases of the three-phase AC input power are connected to respective connecting points of the two pairs of upper and lower arm switch sections of the converter section, and two phases of the three-phase AC output power are connected to respective connecting points of the two pairs of upper and lower arm switch sections in the inverter section.

Moreover, the converter section comprises two pairs of upper and lower arm switch sections, and each of the inverter section and the common section comprises a pair of upper and lower arm switch sections. Two phases of the three-phase AC input power are connected to respective connecting points of the two pairs of upper and lower arm switch sections of the converter section, and one phase of the single phase AC output is connected to connecting point of the pair of upper and lower arm switch sections of the inverter section.

In still another embodiment, each of the converter section and the common section comprises a pair of upper and lower arm switch sections, and the inverter section comprises two pairs of upper and lower arm switch sections. One phase of the single phase AC input power is connected to connecting point of the pair of upper and lower arm switch sections of the converter, and two phases of the three-phase AC output power are connected to respective connecting points of the two pairs of upper and lower arm switch sections of the inverter section.

Other objects and advantages of this invention will become apparent from the detailed description given hereinafter. It should be understood, however, that the detailed description and specific embodiment are provided by way of illustration only since various changes and modifications within the spirit and scope of the invention will become apparent to those skilled in the art from the following detailed description.

BRIEF DESCRIPTION OF THE DRAWINGS

In all of the figures, elements which are the same or substantially the same are labeled and referred to by the same reference numerals.

DESCRIPTION OF THE PREFERRED EMBODIMENTS

Embodiment 1.

Figure 1:
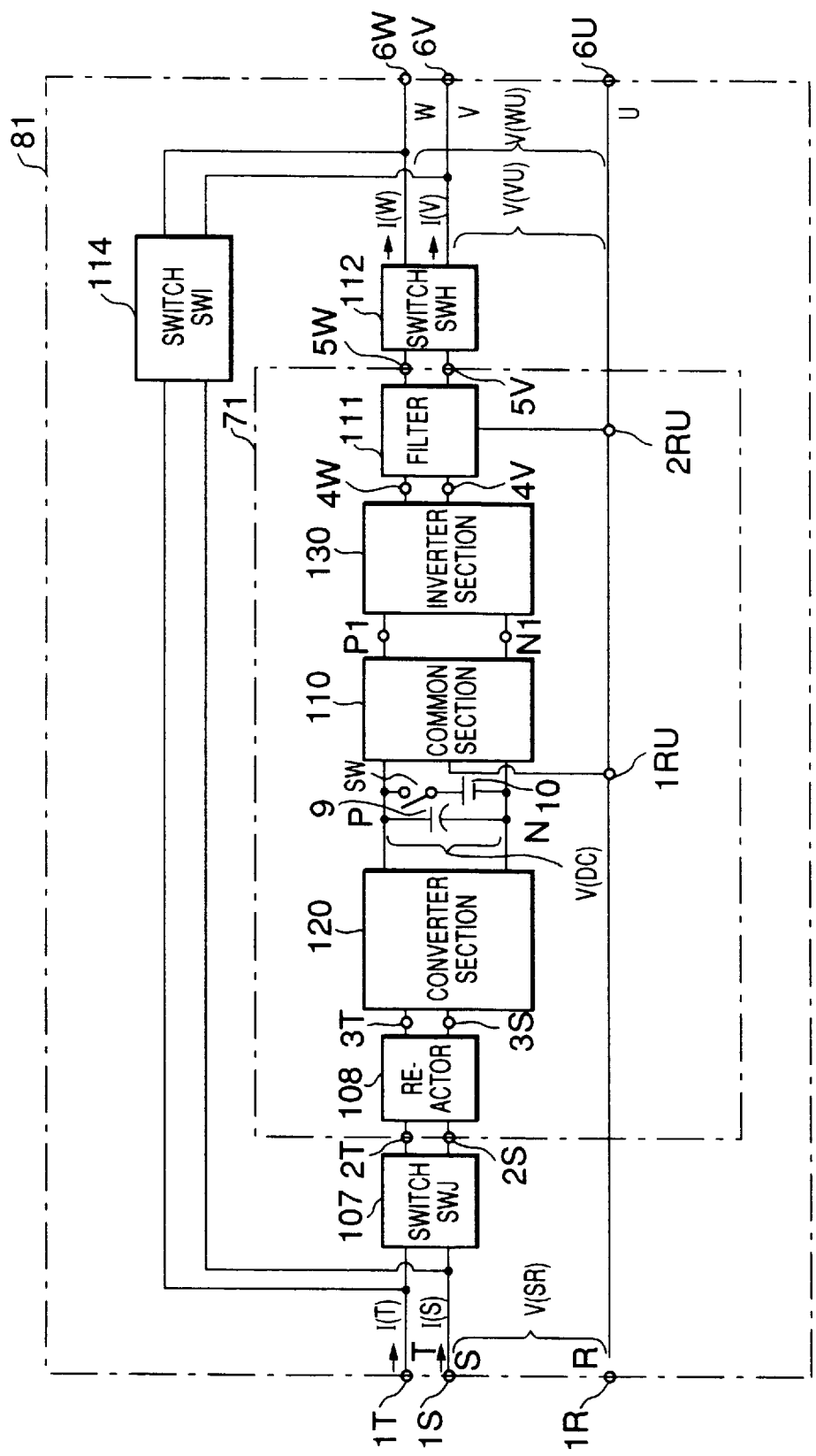
FIG. 1 is a block diagram showing the main circuit arrangement of the three-phase input/three-phase output uninterruptible power supply according to the first embodiment of the invention.
Figure 10:
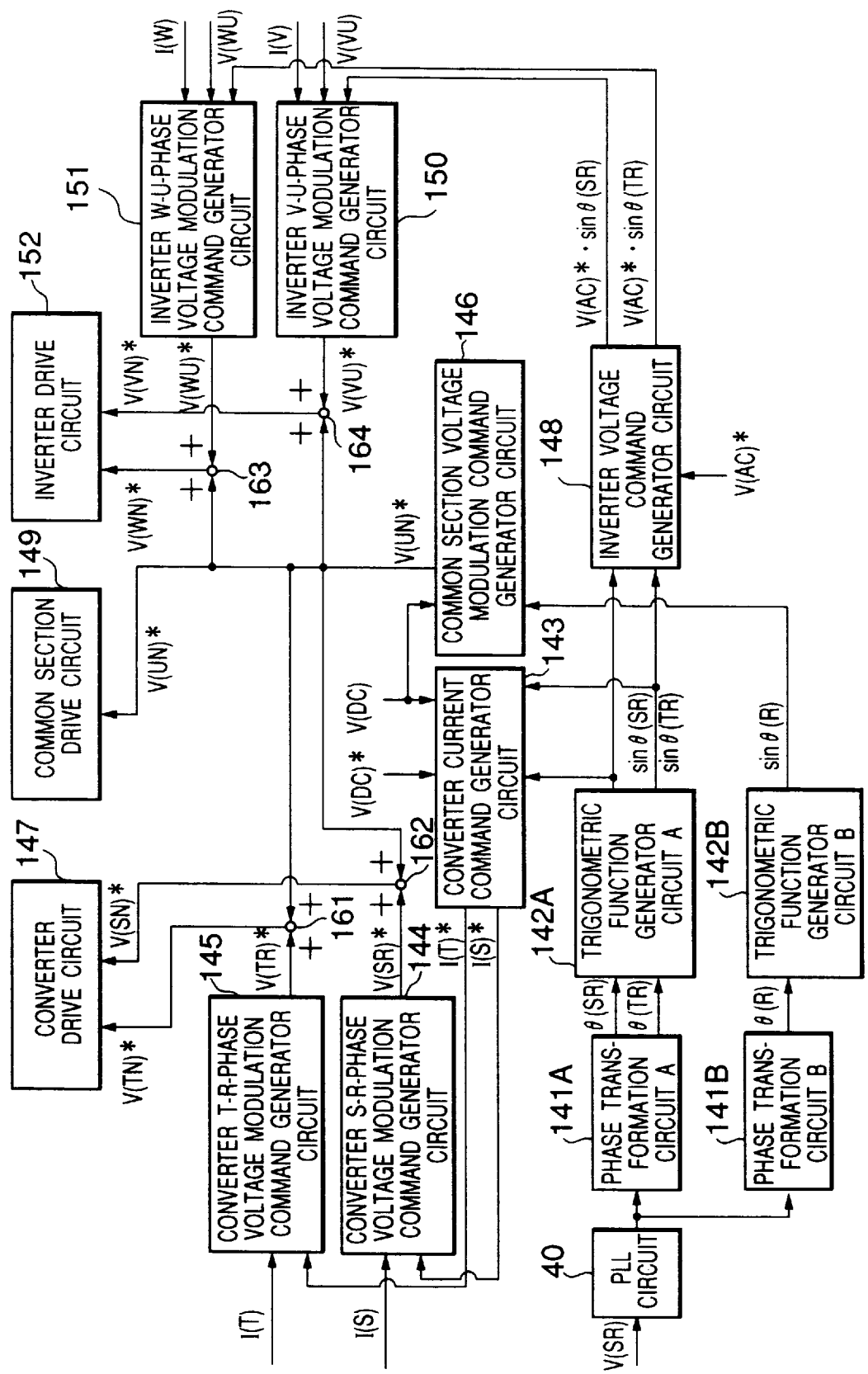
FIG. 10 is a block diagram showing the control circuit arrangement of a three-phase input/three-phase output uninterruptible power supply according to the first embodiment of the invention.
Figure 11:
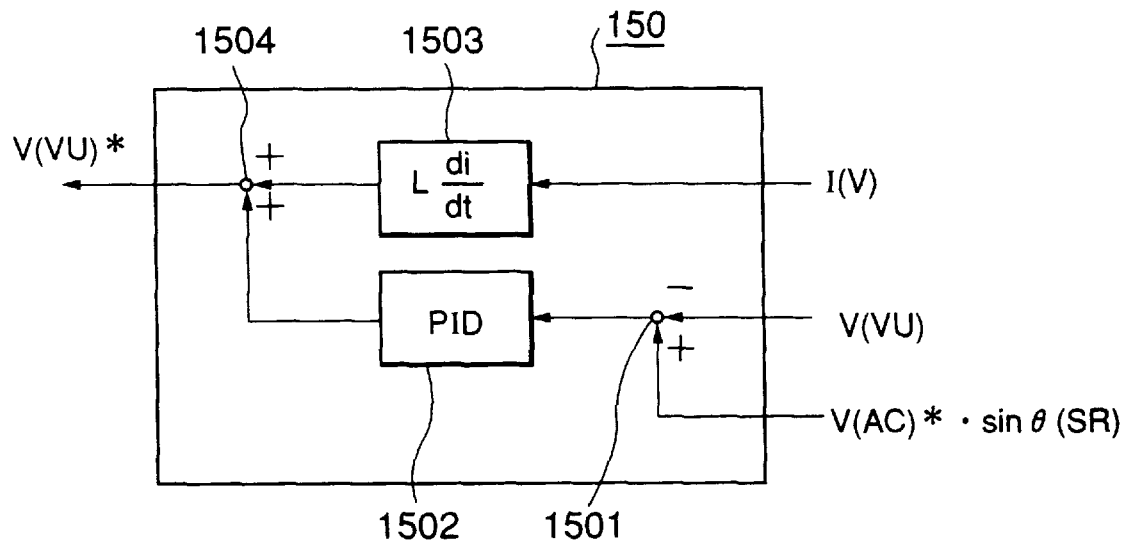
FIG. 11 is a block diagram showing a detailed arrangement of inverter V-U-phase voltage modulation command generator circuit 150 according to the first embodiment of the invention.
Figure 12:
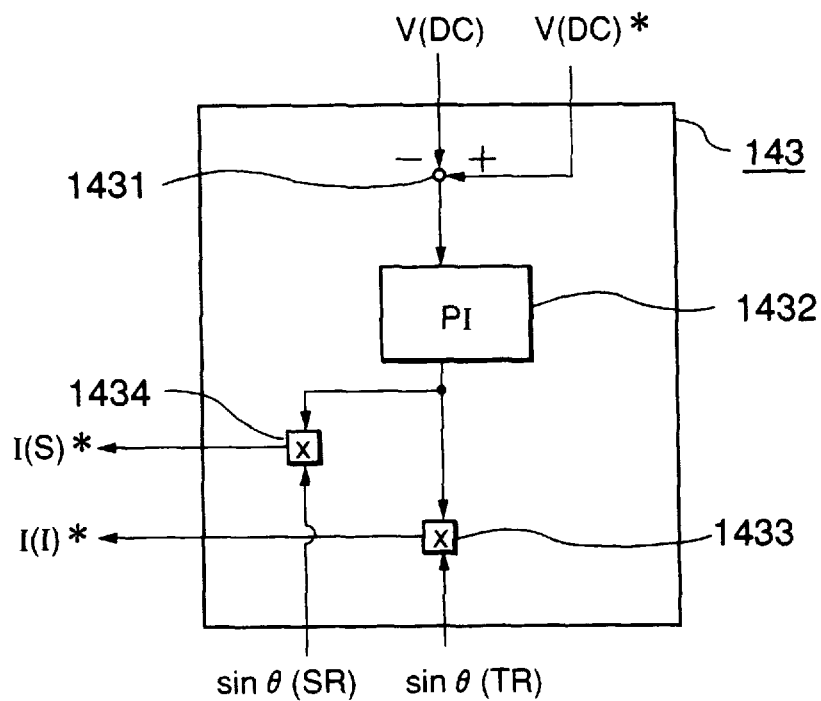
FIG. 12 is a block diagram showing a detailed arrangement of converter current command generator circuit 143 according to the first embodiment of the invention.
Figure 13:
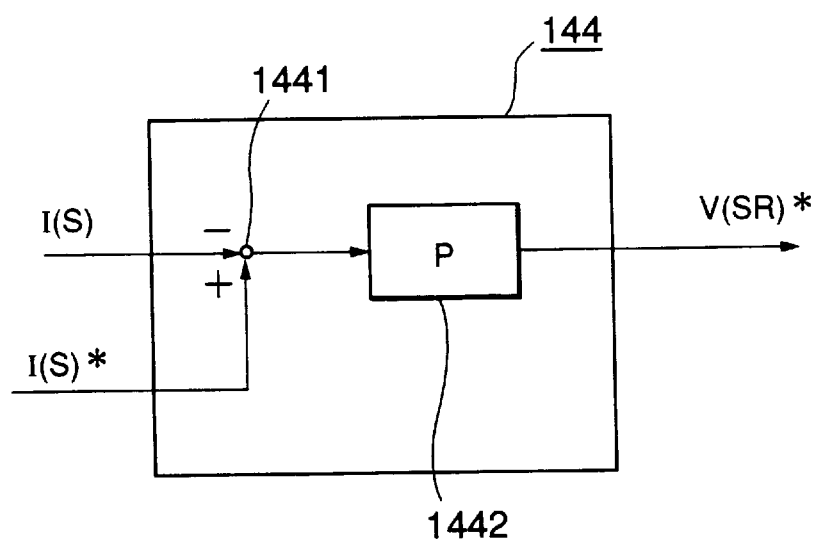
FIG. 13 is a block diagram showing a detailed arrangement of converter S-R-phase voltage modulation command generator circuit 144 according to the first embodiment of the invention.
Figure 14:
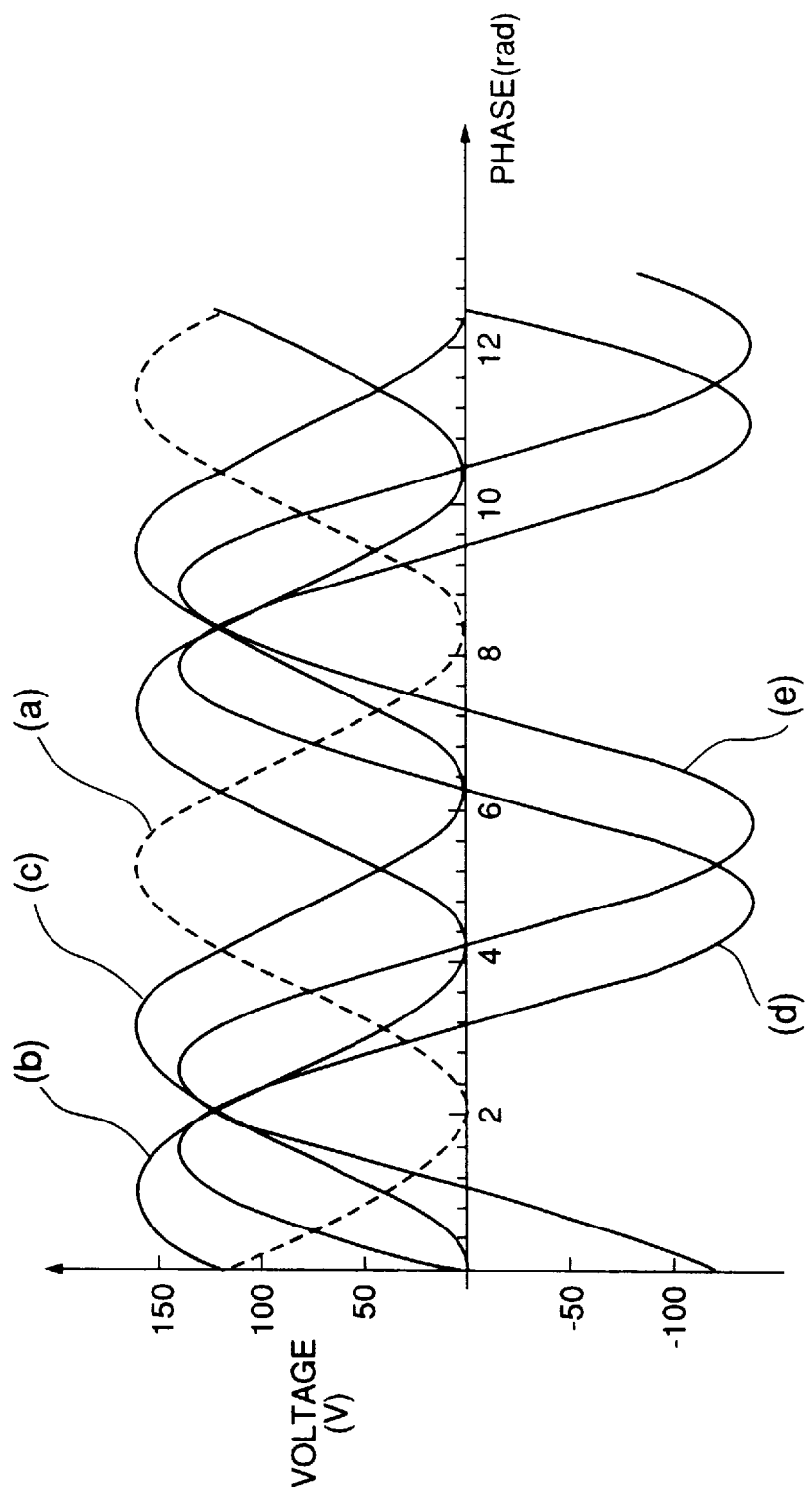
FIG. 14 is a waveform diagram showing a relationship of voltage modulation command signals of the converter and inverter according to the first embodiment of the invention.
Figure 15:
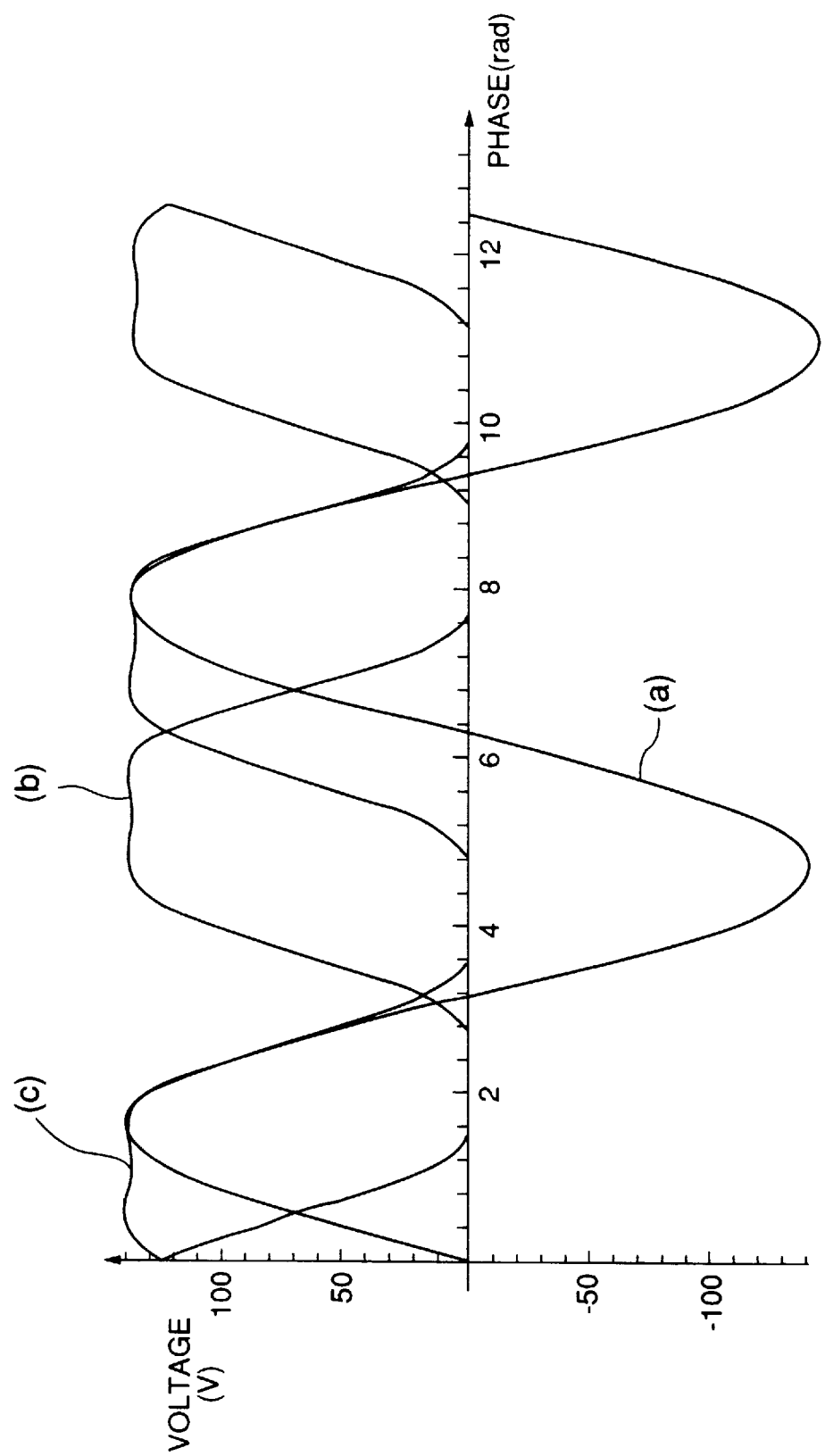
FIG. 15 is a waveform diagram showing a phase voltage modulation command signal containing third harmonics and a relationship between it and line-to-line voltage according to the first embodiment of the invention.

Referring to FIGS. 1 to 15, discussed is the first embodiment of the present invention of an uninterruptible power supply equipped with a power conversion apparatus that receives a three-phase AC input power and outputs a three-phase AC power having the same frequency as the input. FIG. 1 is a block diagram showing a main circuit arrangement of a three-phase input/three-phase output uninterruptible power supply, while FIGS. 2–9 depict the internal details of various elements shown in FIG. 1. FIG. 10 is a block diagram showing a control circuit of the three-phase input/three-phase output uninterruptible power supply, FIG. 11 is a block diagram showing a detailed arrangement of inverter V-U-phase voltage modulation command generator circuit 150, FIG. 12 is a block diagram showing a detailed arrangement of converter current command generator circuit 143, and FIG. 13 is a block diagram showing converter S-R-phase voltage modulation command generator circuit 144. FIG. 14 is a waveform diagram showing voltage modulation command signals in the inverter and the converter, and FIG. 15 is a waveform diagram showing a phase voltage modulation command signal containing third harmonics and the relationship between it and a line-to-line voltage.

With respect to the control circuit of FIG. 10, it may be provided separately from the main circuit of FIG. 1. The control circuit is connected across the input terminals 1T, 1S and 1R and the output terminals 6W, 6V and 6U (FIG. 1). The control circuit is also connected between the positive DC terminal P and the negative DC terminal N (FIG. 1). From the input terminals the control circuit fetches the signals I(T), I(S) and V(SR). Using the signal V(RS) the control circuit determines the reference signals θ(SR), θ(TR) and θ(R). From the DC terminals the control circuit fetches the signal V(DC) and using this signal the control circuit determines the phase current command signals I(T)* and I(S)* in conjunction with the signals θ(SR) and θ(TR). And using the signals I(T) and I(S) the control circuit determines the converter phase voltage modulation command signals V(TR)* and V(SR)* in conjunction with the signals I(T)* and I(S)*. Moreover, using the signals V(DC) and θ(R) the control circuit determines the common section phase voltage modulation command signals V(UN)*.

Similarly, from the output terminals the control circuit fetches the signals I(W), I(V), V(WU) and V(VU). Using the signals V(WU), V(VU),I(W) and I(V) the control circuit determines the line-to-line voltage modulation command signals V(WU)* and V(VU)* in conjunction with the signals θ(SR) and θ(TR).

Throughout the figures, components identical or equivalent to those of the prior art are designated with the same reference numerals.

With reference to FIG. 1, power conversion apparatus 71 is included within uninterruptible power supply 81. The power conversion apparatus 71 includes converter section 120 for converting a two-phase AC input power into a DC power, and inverter section 130 for converting a DC power into a three-phase AC power in corporation with common section 110 to be described later. Common section 110 is constructed of R-phase upper and lower arm switch sections and U-phase upper and lower arm switch sections for use with converter section 120 and inverter section 130.

Switch SWJ107 is made up of switches SWJ1 and SWJ2 (FIG. 2) for two phases, and reactor 108 made up of reactors L11 and L12 (FIG. 3) for two phases. A smoothing capacitor 9 is provided for smoothing the DC power of converter section 120 (to be described later) and common section 110. Filter 111 is made up of reactors L21 and L22 (FIG. 4) for two phases, and capacitors C1 and C2 for two phases. Switch SWH112 is made up of switches SWH1 and SWH2 (FIG. 5) for two phases, and switch SWI114 is made up of switches SWI1 and SWI2 (FIG. 6) for two phases.

There are also shown (FIG. 7) T-phase and S-phase upper and lower arm switch sections 121 and 122 having, respectively, upper arm switch section 121a and lower arm switch section 121b, and upper arm switch section 122a, and lower arm switch section 122b. Each of the upper or lower arm switch section 121a, 121b, 122a and 122b is constructed of a switching element such as a transistor, an FET or an IGBT and a diode in an inverse-parallel connection.

There are further shown (FIG. 8) W-phase upper and lower switch sections 131 and V-phase upper and lower switch sections 132 having, respectively, upper arm switch section 131a and lower arm switch section 131b, and upper arm switch section 132a and lower arm switch section 132b. Each of the upper or lower arm switch section 131a, 131b, 132a and 132b is constructed of a switching element such as a transistor, an FET or an IGBT and a diode in an inverse-parallel connection.

Also shown are (FIG. 9) upper arm switch section 110a of R-phase or U-phase upper and lower switch sections of common section 110, and lower arm switch section 110b of R-phase or U-phase upper and lower switch sections of common section 110.

In FIG. 1, elements 1R, 1S and 1T are input terminals to which R-phase, S-phase and T-phase of a three-phase AC input power are respectively supplied, and 6U, 6V and 6W are three-phase output terminals from which a three-phase AC power is output to a load (not shown) to be driven. Terminal 1R and terminal 6U are directly connected. Terminals 1T and 1S are connected to the terminals 2T and 2S via SWJ1 and SWJ2 of switch SWJ107 respectively, and terminals 2T and 2S are connected to terminals 3T and 3S via L11 and L12 of reactor 108 respectively. Terminal 3T is connected to a connecting point of upper arm switch section 121a and lower arm switch section 121b of the T phase, and terminal 3S is connected to a connecting point of upper arm switch section 122a and lower arm switch section 122b of the S phase.

Figure 9:
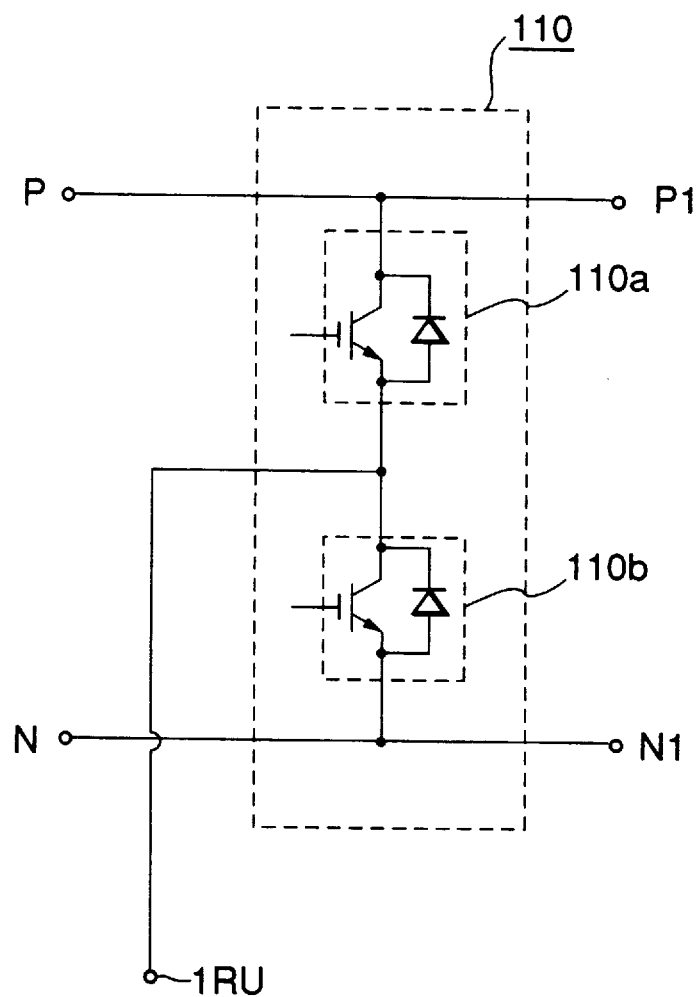
FIG. 9 depicts the internal details of common section 110 according to the first embodiment of the invention.

Terminal 1RU is connected to a connecting point of the upper arm switch section 110a and lower arm switch section 110b of common section 110 (FIG. 9). Nodes P1 and N1 are a DC positive terminal and a DC negative terminal respectively between common section 110 and inverter section 130, and are at the same potential level as DC positive terminal P and DC negative terminal N respectively.

Figure 6:
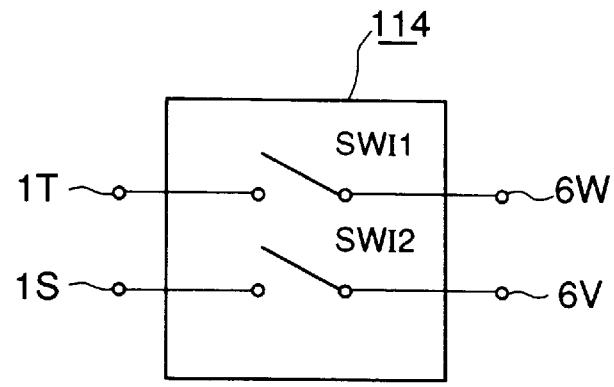
FIG. 6 depicts the internal details of switch SWI114 according to the first embodiment of the invention.
Figure 7:
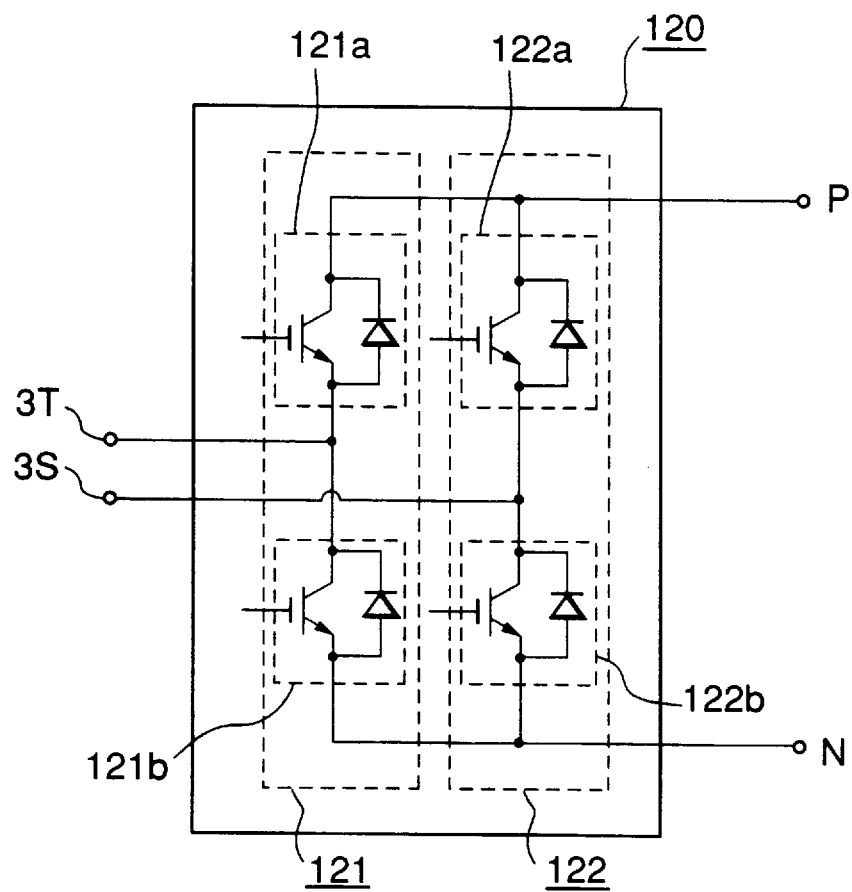
FIG. 7 depicts the internal details of converter section 120 according to the first embodiment of the invention.
Figure 8:
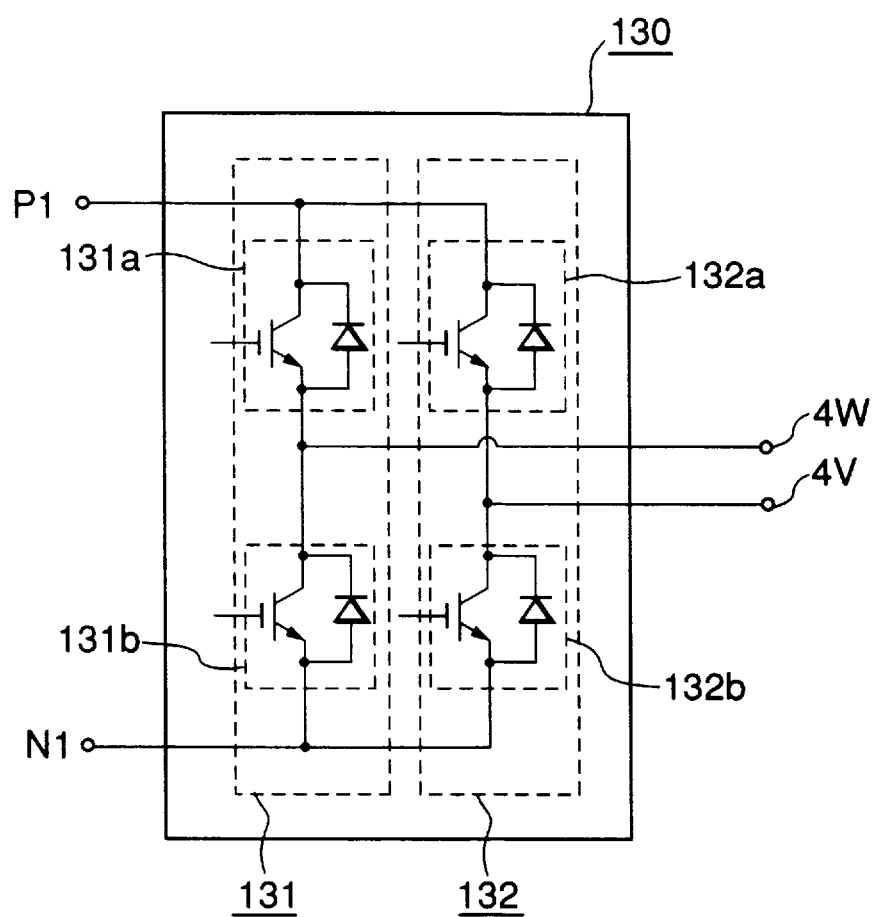
FIG. 8 depicts the internal details of inverter section 130 according to the first embodiment of the invention.

Terminals 4W and 4V are connected, respectively, to a connecting point of upper arm switch section 131a and lower arm switch section 131b of W phase and a connecting point of upper arm switch section 132a and lower arm section 132b of V phase of inverter section 130 (FIG. 8). The other sides of terminals 4W and 4V are connected to terminals 5W and 5V, respectively, through reactors L21 and L22 of filter 111 (FIG. 4), and terminal 2RU is connected to a common node of capacitors C1 and C2 of filter 111. Terminals 5W and 5V are connected to terminals 6W and 6V, respectively, through switch SWH1 and switch SWH2 of switch SWH112 (FIG. 5), and terminals 1T and 1S are connected to terminals 6W and 6V, respectively, through switch SWI1 and switch SWI2 of switch SWI114 (FIG. 6).

A control circuit according to the first embodiment is shown in FIG. 10. While not shown in the drawings, converter drive circuit 147 is connected to the AC/DC converter section 120 to provide the control signals to the converter section 120. Similarly, inverter drive circuit 152 is connected to the DC/AC inverter section 130 of the main circuit to provide the drive signals to the inverter section 130. The common section drive circuit 149 is connected to the common section 110 to provide the drive signals to the common section 110.

PLL circuit 40 generates a reference signal in response to input V(SR) that is one of the line-to-line voltages of the three-phase AC input power. Phase transformation circuit A 141A is for generating two different phase signals (SR) and (TR) having predetermined phase differences in response to the output signal of the PLL circuit 40. Phase transformation circuit B 141B is for generating a phase signal (R) having a predetermined different phase difference in response to the output signal of the PLL circuit 40. Trigonometric function generator circuit A 142A is for generating sinusoidal wave signals corresponding to two different phase signals (SR) and (TR) of phase transformation circuit A 141A, and trigonometric function generator circuit B 142B is for generating a sinusoidal wave signal corresponding to phase signal (R) of phase transformation circuit B 141B.

Converter current command generator circuit 143 outputs converter S-phase current command signal I(S)* and converter T-phase current command signal I(T)* of converter section 120, based on measured voltage signal V(DC) measured across the smoothing capacitor 9, DC voltage command signal V(DC)* and two sinusoidal wave signals sinθ(SR) and sinθ(TR) of the trigonometric function generator circuit A 142A.

As shown in FIG. 12, converter current command generator circuit 143 comprises subtracter 1431 for computing the difference between measured voltage signal V(DC) measured across the smoothing capacitor 9 and DC voltage command signal V(DC)*, PI circuit 1432 for amplifying the output signal of subtracter 1431 by PI (Proportional plus Integral) control, multiplier 1433 for multiplying sinusoidal wave signal sinθ(TR) of trigonometric function generator circuit A 142A by output signal of PI circuit 1432 to generate T-phase current command signal I(T)*, and multiplier 1434 for multiplying sinusoidal wave signal sinθ(SR) of trigonometric function generator circuit A 142A by output signal of PI circuit 1432 to generate S-phase current command signal I(S)*.

Converter S-R-phase voltage modulation command generator circuit 144 (FIG. 10) outputs converter S-R-phase voltage modulation command signal V(SR)*, while receiving measured value signal I(S) of the S-phase current of the three-phase AC input power and the S-phase current command signal I(S)* of converter current command generator circuit 143. Converter T-R-phase voltage modulation command generator circuit 145 outputs converter T-R-phase voltage modulation command signal V(TR)* while receiving measured value signal I(T) of the T-phase current of the three-phase AC input power and T-phase current command signal I(T)* of converter current command generator circuit 143.

As shown in FIG. 13, converter S-R-phase voltage modulation command generator circuit 144 comprises subtracter 1441 for computing the difference between measured signal I(S) of the S-phase current and S-phase current command signal I(S)* of converter current command generator circuit 143. Downstream is P circuit 1442 for amplifying the output signal of subtracter 1441 by P (Proportional) control to generate converter S-R-phase voltage modulation command signal V(SR)*. Converter T-R-phase voltage modulation command generator circuit 145 has a construction similar to that of converter S-R-phase voltage modulation command generator circuit 144.

Returning to FIG. 10, common section voltage modulation command generator circuit 146 outputs U-phase voltage modulation command signal V(UN)* of the U-phase voltage that is the voltage for the common section, while receiving sinusoidal wave signal sinθ(R) of the trigonometric function generator circuit B 142B and measured voltage signal V(DC) measured across the smoothing capacitor 9. Adder 161 adds converter T-R-phase voltage modulation command signal V(TR)* of converter T-R-phase voltage modulation command generator circuit 145 to U-phase voltage modulation command signal V(UN)* of common section voltage modulation command generator circuit 146, to thereby generate converter T-phase voltage modulation command signal V(TN)*. Similarly, adder 162 adds converter S-R-phase voltage modulation command signal V(SR)* of converter S-R-phase voltage modulation command generator circuit 144 to U-phase voltage modulation command signal V(UN)* of common section voltage modulation command generator circuit 146, to thereby generate converter S-phase voltage modulation command signal V(SN)*.

Converter drive circuit 147 PWM-controls upper and lower arm switch sections 121a, 121b, 122a, and 122b corresponding to the T and S phases of converter section 120, while receiving converter T-phase voltage modulation command signal V(TN)* of adder 161 and converter S-phase voltage modulation command signal V(SN)* of adder 162. Similarly, common section drive circuit 149 PWM-controls upper and lower arm switch sections 110a and 110b corresponding to the U phase of common section 110, while receiving U-phase voltage modulation command signal V(UN)* of common section voltage modulation command generator circuit 146.

Inverter voltage command generator circuit 148 produces two kinds of inverter voltage command signals V(AC)*sinθ(SR) and V(AC)*sinθ(TR) while receiving inverter voltage amplitude command signal V(AC)* and two sinusoidal wave signals sinθ(SR) and sinθ(TR) of the trigonometric function generator circuit A 142A. A V-U-phase voltage modulation command generator circuit 150 outputs inverter V-U-phase voltage modulation command signal V(VU)*, while receiving inverter voltage command signal V(AC)*sinθ(SR) of inverter voltage command generator circuit 148, V-phase current measured value I(V), and V-U-phase line-to-line voltage measured value V(VU). Inverter W-U-phase voltage modulation command generator circuit 151 outputs inverter W-U-phase voltage modulation command signal V(WU)*, while receiving inverter voltage command signal V(AC)*sinθ(TR) of inverter voltage command generator circuit 148, W-phase current measured value I(W), and W-U-phase line-to-line voltage measured value V(WU).

As shown in FIG. 11, inverter V-U-phase voltage modulation command generator circuit 150 comprises subtracter 1501 for computing the difference between inverter voltage command signal $V(AC)*\sin\theta(R)$ and V-U-phase line-to-line voltage measured value V(VU), PID circuit 1502 for amplifying an error signal by PID controlling the difference signal of subtracter 1501, reactor voltage drop generator circuit 1503 for generating the voltage drop component through reactor L22 by differentiating the V-phase current measured value I(V) received, and adder 1504 for adding the signal from reactor voltage drop generator circuit 1503 to the signal of PID circuit 1502 to generate inverter V-U-phase voltage modulation command signal V(VU)*. Inverter W-U-phase voltage modulation command generator circuit 151 has a construction similar to inverter V-U voltage modulation command generator circuit 150.

Adder 163 produces inverter W-phase voltage modulation command signal V(WN)* by adding inverter W-U-phase voltage modulation command signal V(WU)* of inverter W-U-phase voltage modulation command generator circuit 151 to U-phase voltage modulation command signal V(UN)* of common section voltage modulation command generator circuit 146, and adder 164 produces inverter V-phase voltage modulation command signal V(VN)* by adding inverter V-U-phase voltage modulation command signal V(VU)* of inverter V-U-phase voltage modulation command generator circuit 150 to U-phase voltage modulation command signal V(UN)* of common section voltage modulation command generator circuit 146.

Inverter drive circuit 152 PWM-controls upper and lower arm switch sections 131a, 131b, 132a, and 132b corresponding to the W and V phases of inverter section 130 while receiving inverter W-phase voltage modulation command signal V(WN)* of adder 163 and inverter V-phase voltage modulation command signal V(VN)* of adder 164.

The operation of the uninterruptible power supply of this embodiment is now discussed. During normal operation switch SWJ107 and switch SWH112 are closed and switch SWI114 is open. In the basic control operation of the uninterruptible power supply, a three-phase AC input power from a three-phase AC power source is converted into a DC power through converter section 120, common section 110 and reactor 108, while switch sections constituting converter section 120 and common section 110 are PWM-controlled by predetermined commands so that the input current waveform of each of the R-phase, S-phase and T-phase of the three-phase AC input power is made sinusoidal wave, so that the R-phase, S-phase and T-phase voltages are set be in phase with the R-phase, S-phase and T-phase currents respectively. Thus, the voltage across the smoothing capacitor 9 is controlled to a predetermined DC voltage value with an input power factor of approximately 1.

Switch sections constituting inverter-section 130 and common section 110 are PWM-controlled by predetermined commands so that U-phase, V-phase and W-phase output voltages have a sinusoidal wave at a constant voltage value and a predetermined frequency, so that the three-phase AC output power of the predetermined frequency and voltage amplitude is obtained at output terminals 6W, 6V and 6U.

Battery unit 10 is normally charged by an unshown charger circuit or is charged by smoothing capacitor 9, and is discharged when the three-phase AC power input is abnormal. Specifically, battery discharge occurs when a power interruption or an instantaneous voltage drop takes place, so that an uninterrupted output power is provided at output terminals 6W, 6V and 6U via inverter section 130, common section 110 and filter 111.

When any of converter section 120, inverter section 130, and common section 110 malfunctions, switch SWJ107 and switch SWH112 are opened and switch SWI114 is closed, so that the AC power from the three-phase AC power source is directly output at terminals 6W, 6V, and 6U via switch SWI114. In the event of such a malfunction, it is important to switch in an uninterruptible fashion between the AC output provided by the inverter section 130 and the AC output that is obtained from the three-phase AC power source with inverter section 130 bypassed. To this end, there has to be a duration during which switch SWH112 and switch SWI114 are closed concurrently.

In the event of such a malfunction, as will be described later, one terminal 1R of the input side is commonly connected to one terminal 6U of the output side in the main circuit system of this embodiment, and thus, converter section 120 and inverter section 130 are at the same reference level with no potential difference caused therebetween. Therefore, the isolating transformer 13 described in connection with the prior art is not needed. Since both converter section 120 and inverter section 130 are PWM-controlled through common section 110, the AC output power from the bypass circuit and the AC output power of inverter section 130 are synchronized and are at the same potential level even when switch SWJ107, switch SWH112 and switch SWI114 are closed concurrently to switch to the bypass circuit. Thus, any trouble such as an output shorting is avoided.

Since one line is common to the input side and the output side in the main circuit system of this embodiment, the three-phase circuit is asymmetrical and thus it is difficult to control phase voltages. To PWM-control converter section 120 and inverter section 130, line-to-line voltage modulation command signals are produced and then converted into the voltage command signal of each phase relative to DC negative terminal N.

For example, let V(SR) represent the S-R-phase line-to-line voltage, V(TR) the T-R-phase line-to-line voltage, V(VU) the V-U-phase line-to-line voltage, V(WU) the W-U-phase line-to-line voltage, V(UN) the voltage between U phase and point N (assuming that U and R phases are at the same potential level), V(VN) the voltage between V phase and point N, V(WN) the voltage between W phase and point N, V(SN) the voltage between S phase and point N, and V(TN) the voltage between T phase and point N. The following equations hold true:

$$V(RN)=V(UN)$$

$$V(SN)=V(SR)+V(RN)$$

$$V(TN)=V(TR)+V(RN)$$

$$V(VN)=V(VU)+V(UN)$$

$$V(WN)=V(WU)+V(UN)$$

In FIG. 10, produced are U-phase voltage modulation command signal V(UN)* by common section voltage modulation command generator circuit 146, converter S-R-phase voltage modulation command signal V(SR)* by converter S-R-phase voltage modulation command generator circuit 144, converter T-R-phase voltage modulation command signal V(TR)* by converter T-R-phase voltage modulation command generator circuit 145, inverter V-U voltage modulation command signal V(VU)* by inverter U-V-phase voltage modulation command generator circuit 150, and inverter W-U-phase voltage modulation command signal V(WU)* by inverter W-U-phase voltage modulation command generator circuit 151. Adders 162, 161, 164, and 163 output, respectively, converter S-phase voltage modulation command signal V(SN)*, converter T-phase voltage modulation command signal V(TN)*, inverter V-phase voltage modulation command signal V(VN)* and inverter W-phase voltage modulation command signal V(WN)* according to the above equations.

To maintain the power factor of converter section 120 at 1, the converter currents need to be controlled. The operation of controlling the power factor of converter section 120 at 1 is now discussed. Line-to-line voltage V(SR) between terminals 1S and 1R is first detected and fed to PLL circuit 40, and line-to-line voltage V(SR) is used as a reference signal. Line-to-line voltage signal V(SR) is input to phase transformation circuit A 141A, and then trigonometric function generator circuit A 142A generates two types of sinusoidal wave signals having, the same period and the same amplitude as line-to-line voltage signal V(SR) and having phase difference therebetween. One is a sinusoidal wave sinθ(SR) in synchronism with (of the same phase as) line-to-line voltage, signal V(SR), and the other is a sinusoidal wave signal sinθ(TR) having the same phase relationship with line-to-line voltage V(TR). For example, the sinusoidal wave sinθ(TR) lags in phase by $\pi/3$ behind the sinusoidal wave signal sinθ(SR).

Let 141v represent the amplitude of the line-to-line voltage, the sinusoidal wave signals are expressed as follows:

$$V(SR) = \sin\theta(SR)$$
$$= 141\sin(\theta)$$
$$V(TR) = \sin\theta(TR)$$
$$= 141\sin(\theta-\pi/3)$$

FIG. 14 shows these sinusoidal wave signals, wherein V(SR) is represented by (d) and V(TR) is represented by (e).

Converter current command generator circuit 143 produces a difference signal or an error signal between the voltage signal V(DC) measured across the smoothing capacitor 9 and DC voltage command signal V(DC)*, performs PI controlling to amplify the error signal, and produces products of the error signal and each of sinθ(SR) and sinθ(TR) to generate converter S-phase current command signal I(S)* and converter T-phase current command signal I(T)*.

On the other hand, phase transformation circuit B 141B and trigonometric function generator circuit B 142B generate a sinusoidal wave signal sinθ(R) leading the input line-to-line voltage signal V(SR) by $5\pi/6$. This sinusoidal-wave signal is a signal in phase with the common section voltage command signal relative to DC negative terminal N. Common section voltage modulation command generator circuit 146 generates U-phase voltage modulation command signal V(UN)* of the U-phase (or R-phase) voltage, which is the common section voltage, while receiving sinusoidal wave signal sinθ(R) from trigonometric function generator circuit B 142B and measured voltage signal V(DC) measured across smoothing capacitor 9. U-phase voltage modulation command signal V(UN)* is expressed by the following equation:

$$V(UN)^* = (V(DC)/2)(1+\sin(\theta+5\pi/6))$$

Converter S-R-phase voltage modulation command generator circuit 144 amplifies in proportional control the difference between S-phase current command signal I(S)* of converter current command generator circuit 143 and measured signal I(S) of the S-phase current to generate converter S-R-phase voltage modulation command signal V(SR)*. In the same way, converter T-phase voltage modulation command generator circuit 145 generates converter T-R-phase voltage modulation command signal V(TR)* by amplifying in proportional control the difference between T-phase current command signal I(T)* of converter current command generator circuit 143 and T-phase current measured value signal I(T).

Adders 162 and 161 add U-phase voltage modulation command signal V(UN)* to converter line-to-line voltage modulation command signals V(SR)* and V(TR)*, respectively, to generate converter S-phase voltage modulation command signal V(SN)* and converter T-phase voltage modulation command signal V(TN)*. These signals are fed to converter drive circuit 149 that PWM-controls upper and lower arm switch sections 122a, 122b, 121a, and 121b corresponding to T and S phases of converter section 120.

To control the R-phase voltage of the converter section, common section 110 works as the main circuit, and U-phase voltage modulation command signal V(UN)* fed to common section drive circuit 149 works as converter R-phase voltage modulation command signal V(RN)*, and the converter is PWM-controlled at a power factor of 1 by using converter S-phase voltage modulation command signal V(SN)* and converter T-phase voltage modulation command signal V(TN)* for converter section 120.

In FIG. 14, (a) represents U-phase voltage modulation command signal V(UN)* corresponding to converter R-phase voltage modulation command signal V(RN)*, (b) represents converter S-phase voltage modulation command signal V(SN)*, (c) represents converter T-phase voltage modulation command signal V(TN)* in a manner that clarifies the amplitudes and mutual phase relationships. As for the amplitudes of the signals, the value of V(DC) is set low in consideration of V(SR) represented by (d) and V(TR) represented by (c).

$$(V(DC)/2)\ 31/2 = 141\ v$$

Thus, $$V(DC) = 163\ v$$

The control operation of the inverter section is now discussed. Inverter voltage command generator circuit 148 generates two kinds of inverter voltage command signals V(AC)*sinθ(SR) and V(AC)*sinθ(TR), while receiving inverter voltage amplitude command signal V(AC)* and two sinusoidal wave signals sinθ(SR) and sinθ(TR) from trigonometric function generator circuit A 142A. Inverter V-U-phase voltage modulation command generator circuit 150 produces the difference signal or the error signal between inverter voltage command signal V(AC)*sinθ(SR) and the V-U-phase line-to-line voltage V(VU), amplifies the error signal by PID control, and adds to the resulting error signal the signal of reactor voltage drop generator circuit 1503 (FIG. 11) that generates the voltage drop component due to reactor L22 by differentiating V-phase current measured value I(V) thereby generating inverter V-U-phase voltage modulation command signal V(VU)*.

In a similar way, inverter W-U-phase voltage modulation command generator circuit 151 produces the difference signal or the error signal between inverter voltage command signal V(AC)*sinθ(TR) and W-U-phase line-to-line voltage modulation command signal V(WU), amplifies the error signal by PID control, and adds to the resulting error signal the signal for the voltage drop of reactor L21 that is obtained by differentiating W-phase current measured value I(W).

Adders 164 and 163 add U-phase voltage modulation command signal V(UN)* to inverter line-to-line voltage modulation command signals V(VU)* and V(WU)*, respectively, to generate inverter V-phase voltage modulation command signal V(VN)* and inverter W-phase voltage modulation command signal V(WN)*. These signals are fed to inverter drive circuit 152 that PWM-controls upper and lower arm switch sections 132a, 132b, 131a, and 131b corresponding to the V and W phases of inverter section 130.

To control the U-phase voltage of the inverter section, common section 110 works as the main circuit, and U-phase voltage modulation command signal V(UN)* fed to common section drive circuit 149 works as inverter U-phase voltage modulation command signal V(UN)*, and the inverter is PWM-controlled by using inverter V-phase voltage modulation command signal V(VN)* and inverter W-phase voltage modulation command signal V(WN)* for inverter section 130 so that the inverter section outputs an AC voltage that agrees with the AC voltage of the input power in terms of frequency, phase and amplitude.

In FIG. 14, (a) represents inverter U-phase voltage modulation command signal V(UN)*, (b) represents inverter V-phase voltage modulation command signal V(VN)*, (c) represents inverter W-phase voltage modulation command signal V(WN)*, (d) represents inverter V-U voltage modulation command signal V(VU)*, and (e) represents inverter W-U voltage modulation command signal V(WU)*, in a manner that clarifies the amplitudes and phase relationships of the signals.

In the control operation, as described above, as seen from FIG. 14, it is learned that peak values of converter line-to-line voltage modulation commands V(SR)* (equal to V(SU)*), and V(TR)*, and of inverter line-to-line voltage modulation commands V(VU)* and V(WU)* are smaller than peak-to-peak voltage values of converter voltage modulation command signals V(RN)* (equal to V(UN)*), V(SN)*, and V(TN)* and of inverter voltage modulation command signals V(UN)*, V(VN)*, and V(WN)*.

Since the timings of the peaks of the phase voltages of the converter section and inverter section are 30 degrees of in phase from the timings of the peaks of the line-to-line voltages, the peak value of the line-to-line voltage is not equal to the peak-to-peak voltage (in this case V(DC)) of each phase but is as small as the peak-to-peak voltage times 31/2/2 (in this case, (V(DC)/2)×31/2). Therefore, the peak value of the line-to-line voltage cannot be set to be equal to the voltage V(DC) across the smoothing capacitor 9, and the efficiency of utilization of voltage V(DC) across smoothing capacitor 9 is degraded.

To increase the utilization of voltage V(DC), the third harmonics of an appropriate amplitude is superimposed on inverter V-phase voltage modulation command signal V(VN)* and inverter U-phase voltage modulation command signal V(UN)* and thus the peak value of the voltage modulation command signal of each phase is decreased, as shown in FIG. 15. In this way, the peak value of the inverter V-U-phase line-to-line voltage is set to be equal to voltage V(DC) across the smoothing capacitor 9. In this case, the superimposition of the third harmonics onto each phase voltage does not affect each line-to-line voltage.

In FIG. 15, (a) represents the inverter V-U-phase line-to-line voltage having the peak value equal to voltage V(DC), and is denoted by V(VU), $$V(VU)=V(DC)\sin\theta$$

(b) is inverter U-phase voltage modulation command signal V(UN)3* containing a third harmonic having an appropriate amplitude, and is expressed as follows:

$$V(UN)3^*=(V(DC)/2)(1+\sin(\theta+5\pi/6))+\alpha\sin(3\theta+5\pi/6)$$

In a similar fashion, (c) is inverter V-phase voltage modulation command signal V(VN)3* containing a third harmonic having an appropriate amplitude, and is expressed as follows:

$$V(VN)3^*=(V(DC)/2)(1+\sin(\theta+\pi/6))+\alpha\sin(3\theta+\pi/6)$$

By combining inverter U-phase voltage modulation command signal V(UN)3* and inverter V-phase voltage modulation command signal V(VN)3*, inverter V-U-phase line-to-line voltage V(VU) having the peak value of voltage V(DC) is obtained.

In the above discussion, although sinusoidal wave signal sinθ(R) of trigonometric function generator circuit B 142B is the function signal fed to common section voltage modulation command generator circuit 146 that produces the U-phase voltage modulation command signal V(UN)* of the U phase (or R phase), a trapezoidal wave or a triangular wave equally works as the waveform of the function signal in the above control operation.

As discussed in detail above, according to this embodiment, the converter is constituted by converter section 120 and common section 110, the inverter is constituted by inverter section 130 and common section 110, the switch sections common to the converter section and the inverter section are arranged, and the switch section of each of converter section 120, common section 110, and inverter section 130 is PWM-controlled according to the respective voltage modulation command signal having the predetermined amplitude and phase relationship among the phases. Thus, the number of pairs of upper and lower arm switch sections constituting the main circuit is reduced by one pair, and along with the reduction, the component count of the control circuit is reduced as well. The reduced component count permits a lightweight and compact design. Furthermore, the reduction of switch sections that are source of loss and heat generation allows the efficiency of the apparatus to be increased and a cooling method of the apparatus to be simplified.

When the switching is made in an uninterruptible fashion between the AC output generated by inverter section 130 and the AC output obtained from the three-phase AC power source with inverter section 130 bypassed, both converter section 120 and inverter section 130 are controlled on the common reference level because one phase of the three-phase AC input, for example R phase, is commonly connected to one phase of the three-phase AC output, for example U phase, with the switch sections common to both converter section 120 and inverter section 130 arranged. Therefore, even when switch SWJ107, switch SWH112 and switch SWI114 are concurrently closed during the switch to the bypass circuit, the AC output from the bypass circuit and the AC output from inverter section 130 are synchronous and at the same potential level, and any trouble such as an output shorting is precluded. Furthermore, since no potential difference takes place between converter section 120 and inverter section 130, isolating transformer 13 required in the prior art is dispensed with.

Since the voltage modulation command signal of each phase fed to each of converter drive circuit 147, common section drive circuit 149 and inverter drive circuit 152 is produced by adding each line-to-line voltage modulation command signal to U-phase voltage modulation command signal V(UN)* generated by common section voltage modulation command generator circuit 146, each easily measured line-to-line voltage measured value is used as it is to generate each line-to-line voltage modulation command signal, and unlike the prior art, the present invention dispenses with voltage converter circuit 49 that is needed to convert each line-to-line voltage measured value into a phase voltage. Thus a highly reliable control circuit having a simplified circuit arrangement results.

Embodiment 2.

In the second embodiment of the present invention, an AC output power has the same frequency as an AC input power, while the number of phases is different between the AC input power and the AC output power. In particular, an uninterruptible power supply employing a single-phase/three-phase power conversion apparatus is discussed. FIGS. 16 to 21 illustrate a three-phase input/single-phase output apparatus, and FIGS. 22 to 26 illustrate a single-phase input/three-phase output apparatus. Referring to FIGS. 16 to 21, an uninterruptible power supply employing a three-phase input/single phase output apparatus is discussed.

Figure 16:
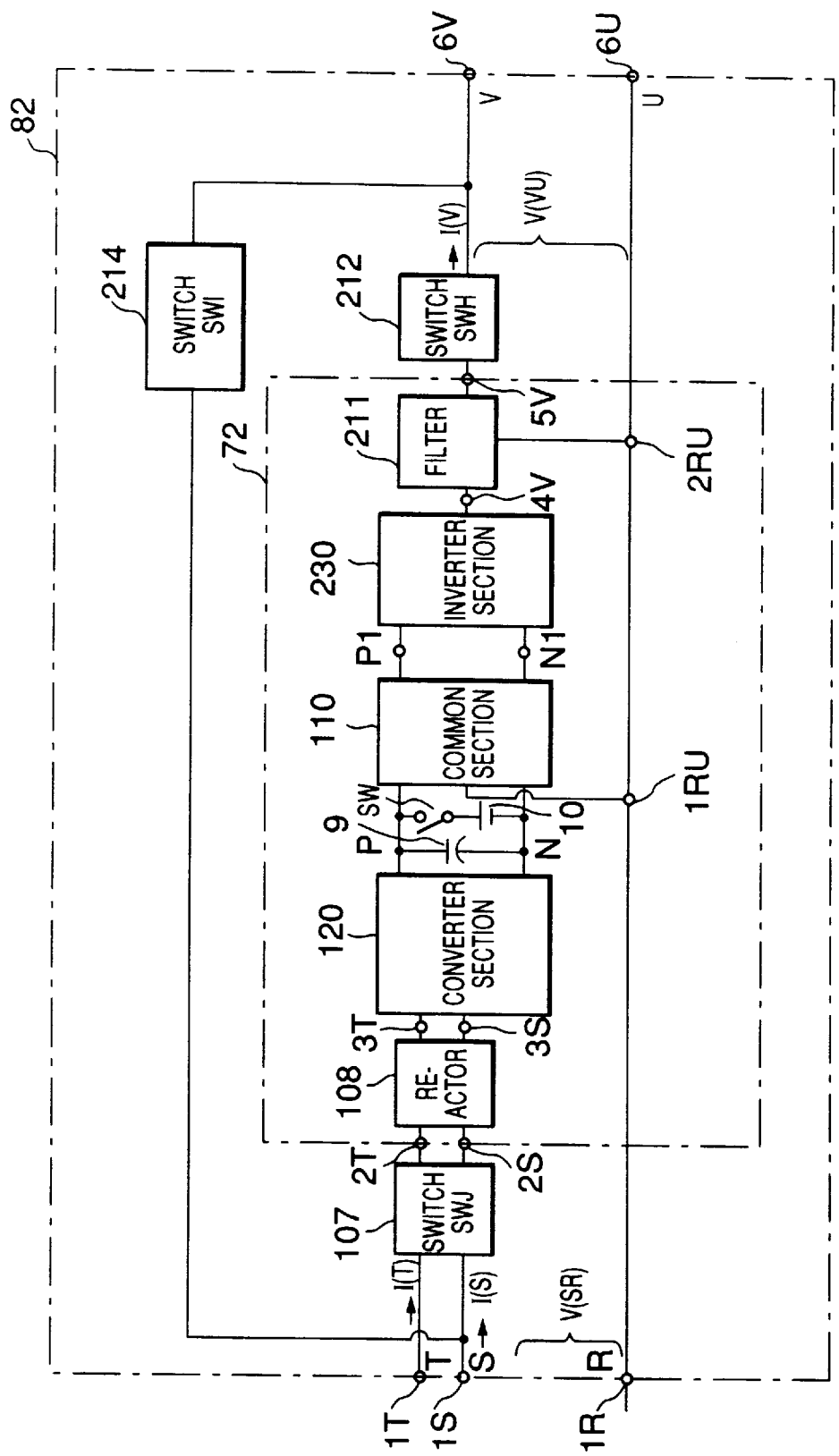
FIG. 16 is a block diagram showing a main circuit arrangement of an uninterruptible power supply employing a three-phase input/single-phase output power conversion apparatus according to the second embodiment of the invention.
Figure 17:
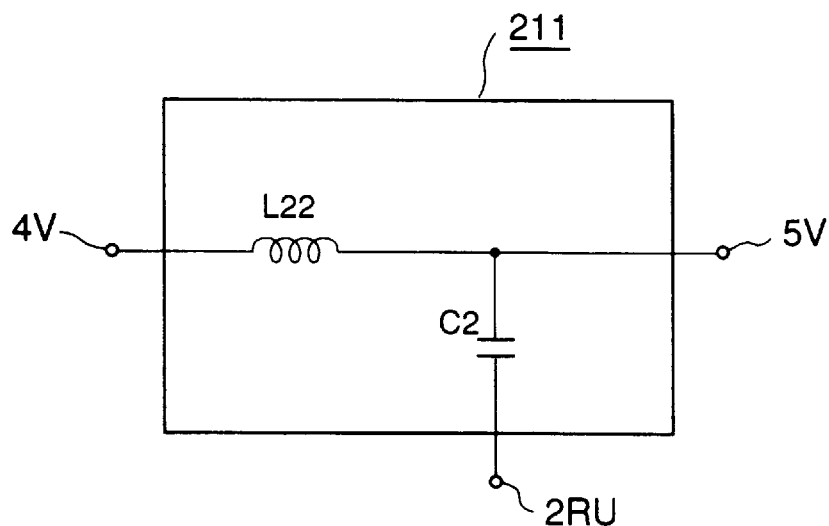
FIG. 17 depicts the internal details of filter 211 according to the second embodiment of the invention.
Figure 18:
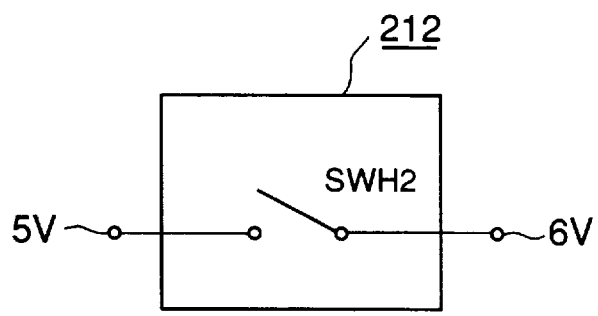
FIG. 18 depicts the internal details of switch SWH212 according to the second embodiment of the invention.
Figure 19:
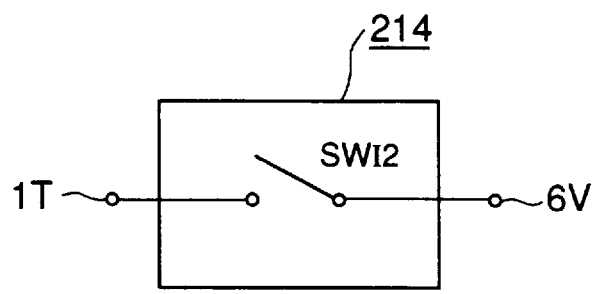
FIG. 19 depicts the internal details of switch SWI214 according to the second embodiment of the invention.
Figure 20:
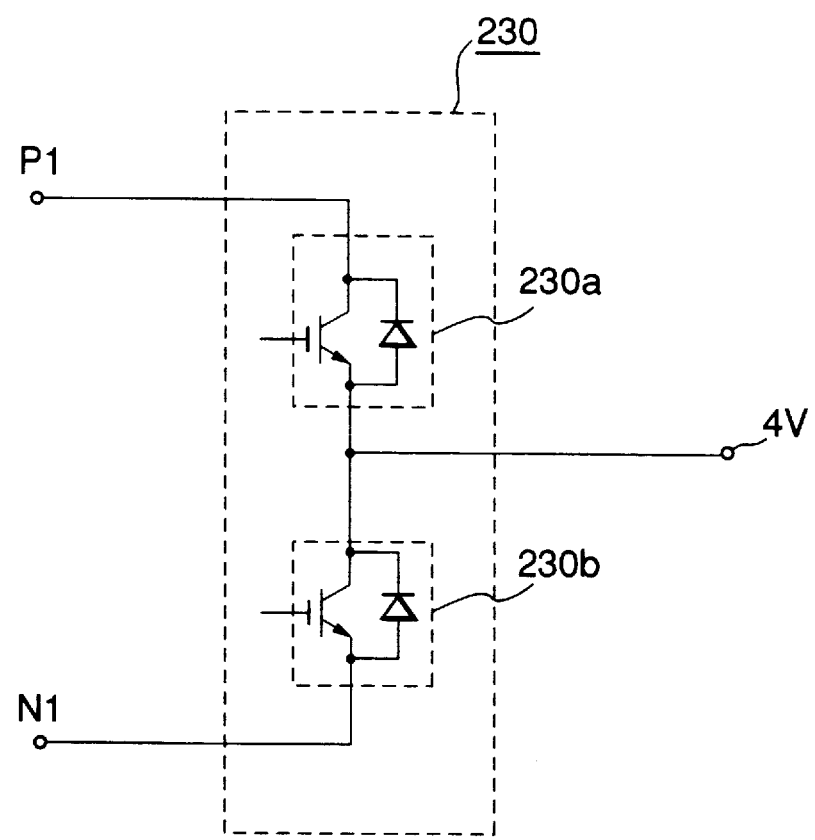
FIG. 20 depicts the internal details of inverter section 230 according to the second embodiment of the invention.
Figure 21:
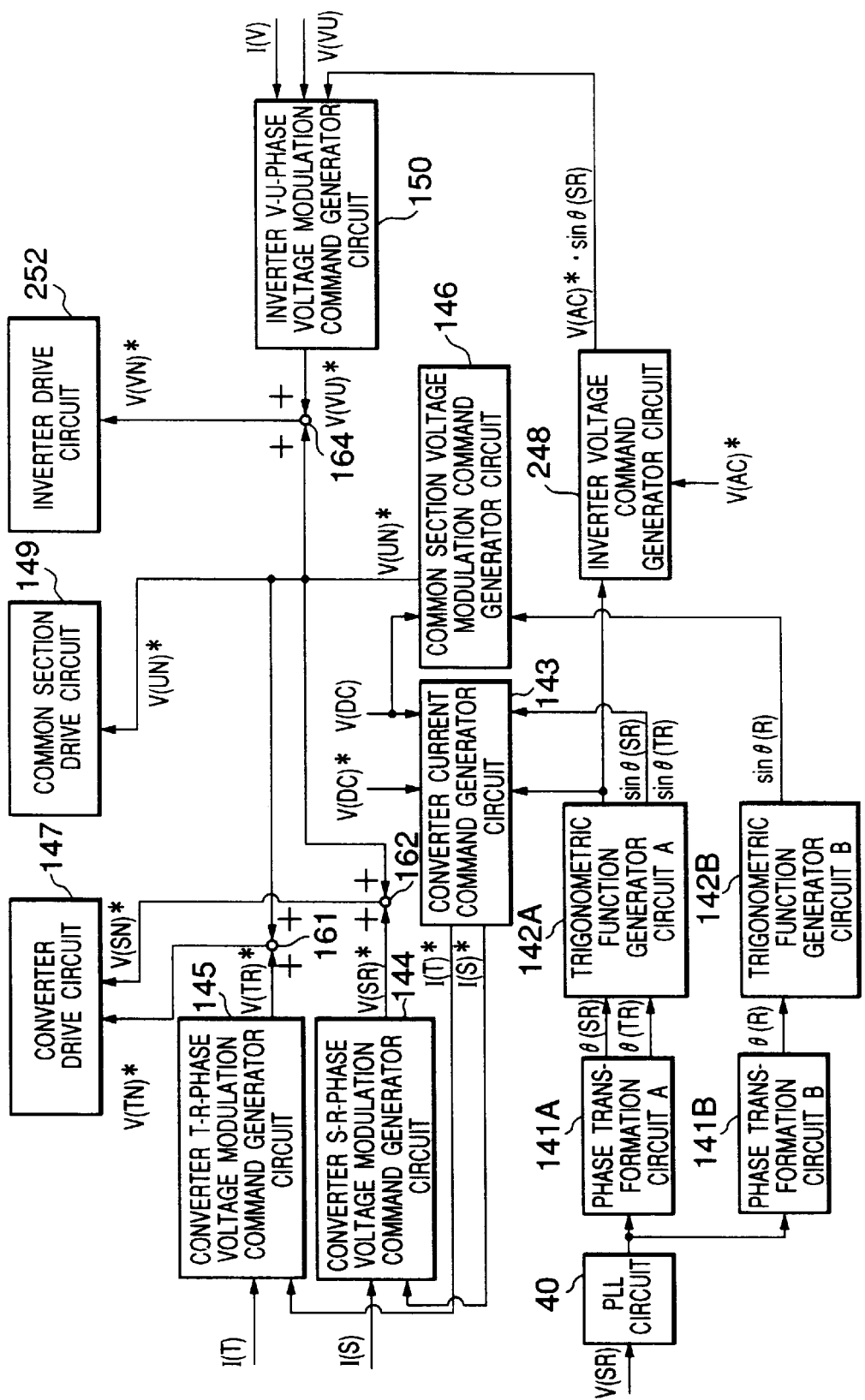
FIG. 21 is a block diagram showing a control circuit arrangement of an uninterruptible power supply employing a three-phase input/single-phase output power conversion apparatus according to the second embodiment of the invention.

FIG. 16 is a block diagram showing a main circuit arrangement of the uninterruptible power supply employing the three-phase input/single-phase output power conversion apparatus, and FIGS. 17–20 show the internal details of certain elements within the main circuit. FIG. 21 is a block diagram showing a control circuit arrangement for the uninterruptible power supply of three-phase input/single-phase output. In the figures, components equivalent or identical to those in the prior art and Embodiment 1 are designated with the same reference numerals. With reference to FIG. 16, power conversion apparatus 72 is included within uninterruptible power supply 82. Shown in FIG. 17 is filter 211 which is made up of reactor L22 and capacitor C2 for a single phase. Switch SWH212 is made up of single-phase switch SWH2 and switch SWI214 is made up of single-phase switch SWI2. Inverter section 230 is for converting a DC power into a single-phase AC power in cooperation with common section 110, and includes upper arm switch section 230*a* and lower arm switch section 230*b*.

The control operation of this embodiment is now discussed. The control operation of converter section 120 and common section 110 remains the same as that for Embodiment 1, and the inverting operation performed by inverter section 230 and common section 110 in cooperation is now discussed. Inverter voltage command generator circuit 248 receives only one of the two sinusoidal wave signals generated in trigonometric function generator circuit A 142A, synchronized with (having the same phase as) line-to-line voltage signal V(SR), namely the sinusoidal wave signal sinθ(SR).

With inverter voltage amplitude command signal V(AC)* input at the same time, inverter voltage command generator circuit 284 venerates inverter voltage command signal V(AC)*sinθ(SR). Next, inverter V-U voltage modulation command generator circuit 150 produces the difference signal or the error signal between inverter voltage command signal V(AC)*sinθ(SR) and inverter V-U-phase line-to-line voltage measured value signal V(VU), amplifies the error signal by PID control, and adds, to the resulting error signal, the signal of reactor voltage drop generator circuit 1503 that generates the voltage drop component due to reactor L22 by differentiating V-phase current measured value I(V), thereby generating inverter V-U voltage modulation command signal V(VU)*.

Adder 164 adds U-phase voltage modulation command signal V(UN)* to inverter V-U-phase line-to-line voltage modulation command signal V(VU)* to generate inverter V-phase voltage modulation command signal V(VN)*. Designated as 252 is an inverter drive circuit for PWM-controlling V-phase upper and lower arm switch sections 230*a* and 230*b* of inverter section 230, and receiving inverter V-phase voltage modulation command signal V(VN)*, inverter drive circuit 252 PWM-controls inverter section 230.

To control the U-phase voltage of the inverter section, common section 110 works as the main circuit, and U-phase voltage modulation command signal V(UN)* fed to common section drive circuit 149 works as inverter U-phase voltage modulation command signal V(UN)*, and the inverter is PWM-controlled by using inverter V-phase voltage modulation command signal V(VN)* for inverter section 230 so that the inverter outputs the V-U-phase line-to-line single-phase AC voltage that is synchronized with the S-R-phase AC input power in terms of frequency, phase and amplitude.

Figure 22:
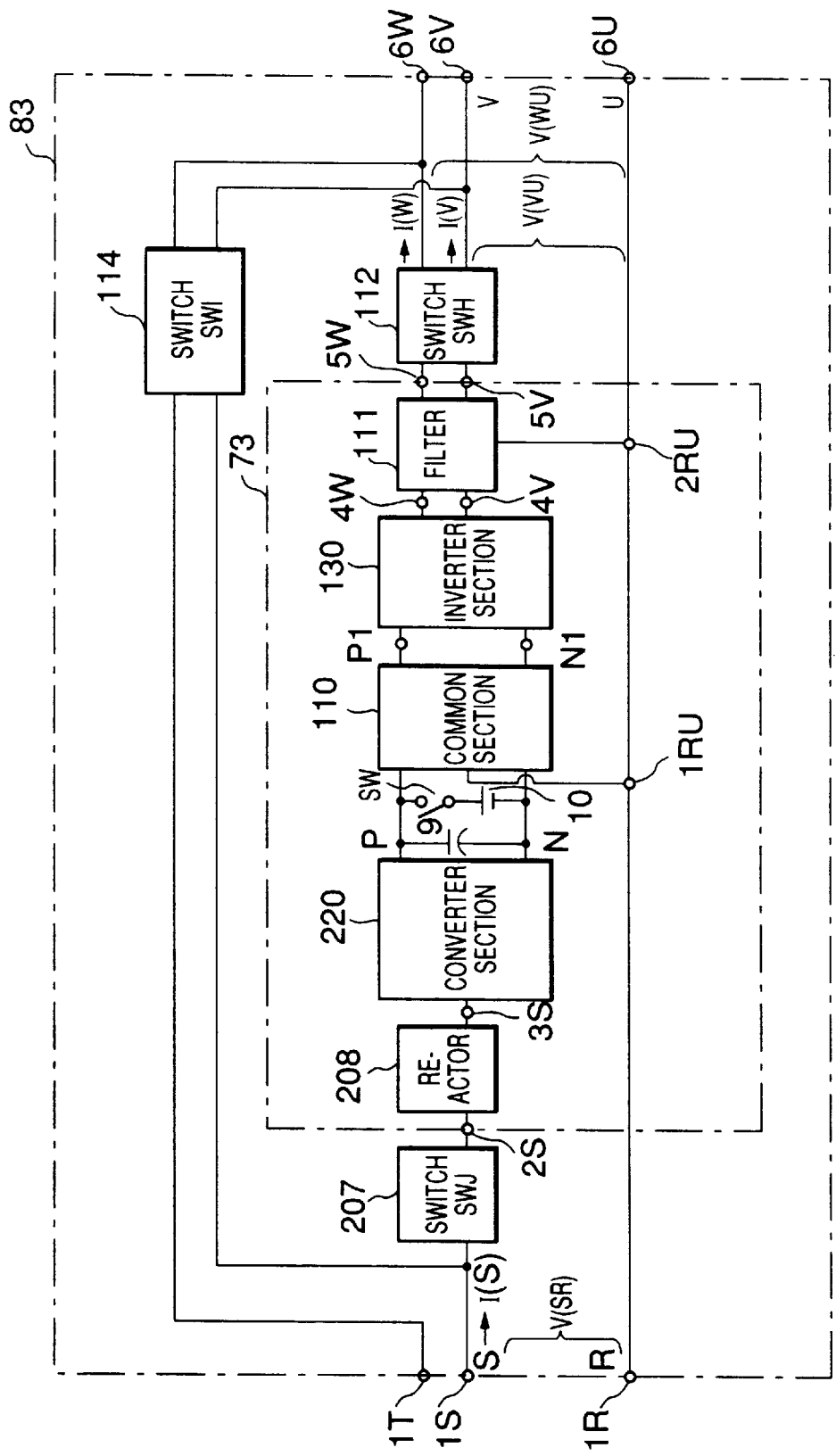
FIG. 22 is a block diagram showing a main circuit arrangement of an uninterruptible power supply employing a single-phase input/three-phase output power conversion apparatus according to the second embodiment of the invention.
Figure 23:
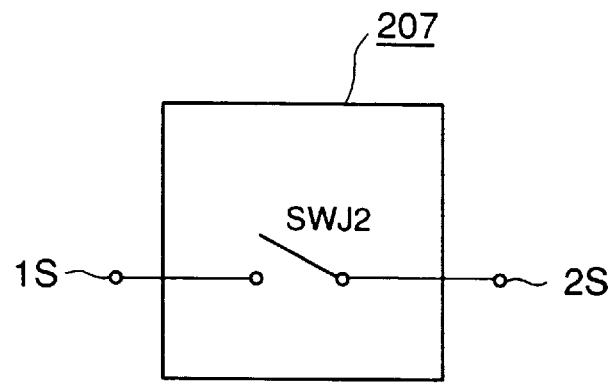
FIG. 23 depicts the internal details of switch SWJ207 according to the second embodiment of the invention.
Figure 24:
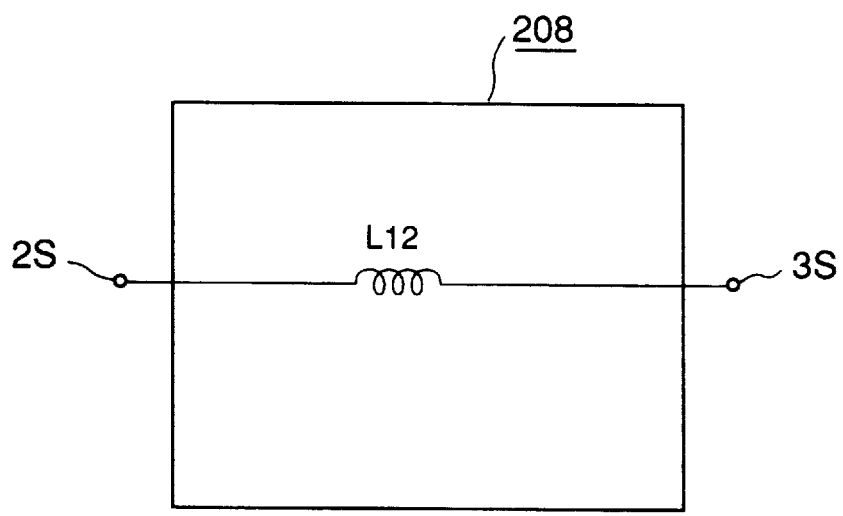
FIG. 24 depicts the internal details of reactor 208 according to the second embodiment of the invention.
Figure 25:
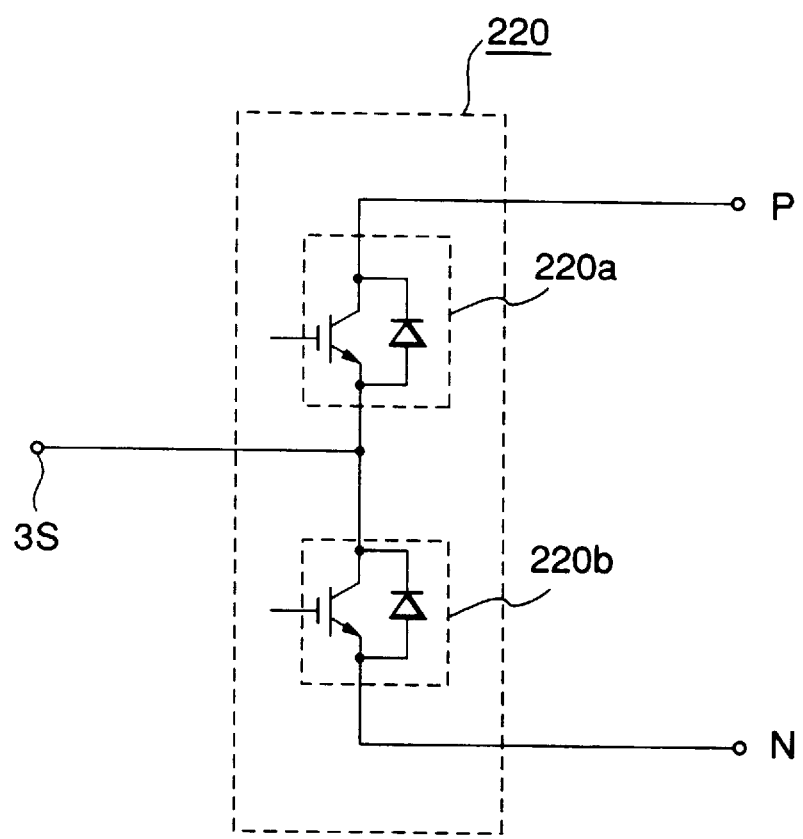
FIG. 25 depicts the internal details of converter section 220 according to the second embodiment of the invention.
Figure 26:
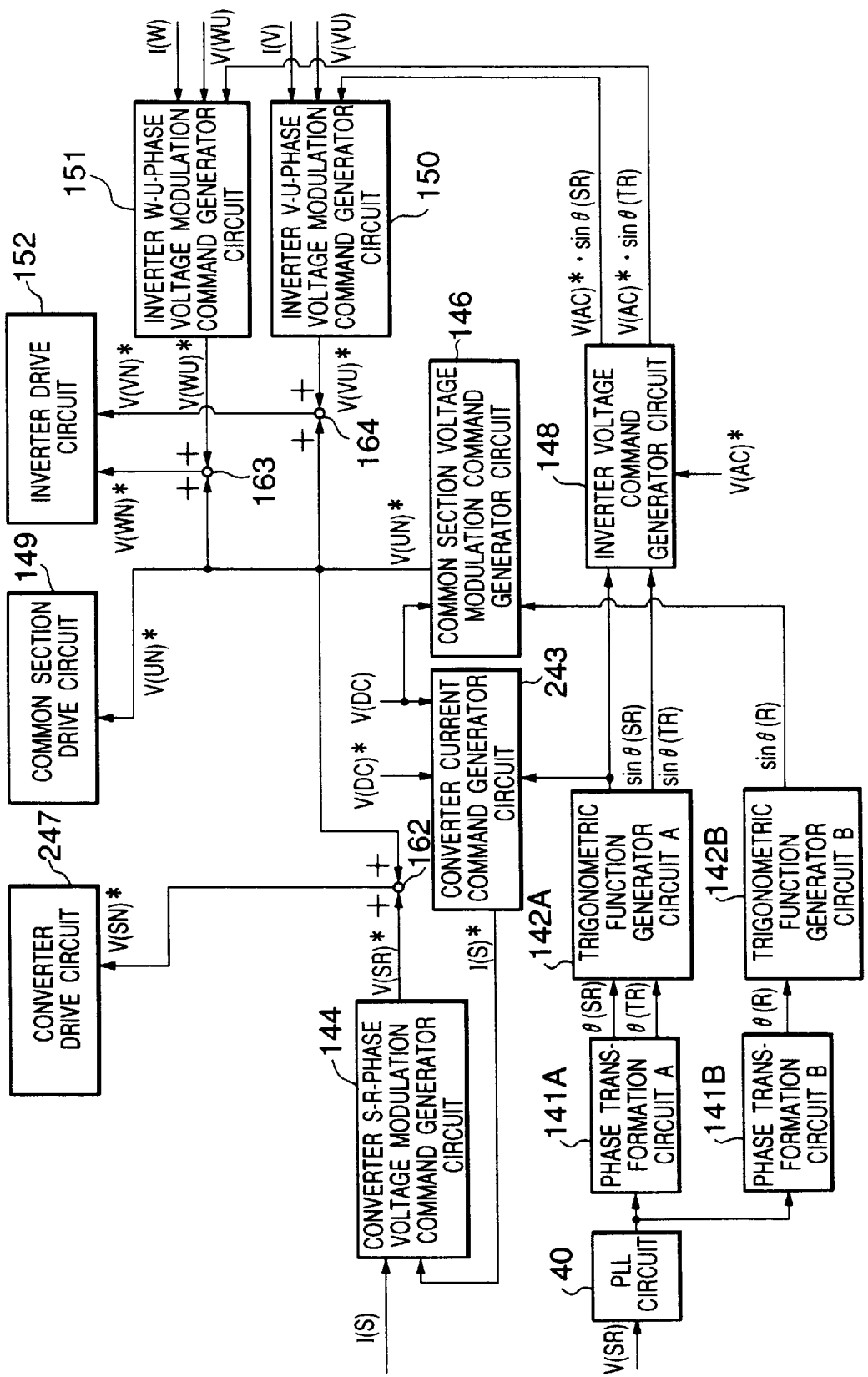
FIG. 26 is a block diagram showing a control circuit arrangement of an uninterruptible power supply employing a single-phase input/three-phase output power conversion apparatus according to the second embodiment of the invention.

Referring to FIGS. 22 to 26, an uninterruptible power supply employing a single-phase input/three-phase output power conversion apparatus is discussed. FIG. 22 is a block diagram showing the main circuit arrangement of the uninterruptible power supply, and FIGS. 23–26 show the internal details of certain elements within the main circuits FIG. 26 is a block diagram of a control circuit for the uninterruptible power supply. In the figures, components equivalent or identical to those in the prior art and Embodiment 1 are designated with the same reference numerals.

Shown in FIG. 22 is power conversion apparatus 73 within uninterruptible power supply 83. Switch SWJ207 is made up of single-phase switch SWJ2 and reactor 208 made up of single-phase reactor L12. Converter section 220 is for converting a single-phase AC power into a DC power in cooperation with common section 110, and includes upper arm switch section 220*a* and lower arm switch section 220*b*.

The control operation of this embodiment is now discussed. The control operation of inverter section 130 and common section 110 remains the same as that for Embodiment 1, and the converting operation performed by converter section 220 and common section 110 in cooperation is now discussed. Converter current command generator circuit 243 (FIG. 26) receives only one of the two sinusoidal-wave signals generated in trigonometric function generator circuit A 142A, synchronized with (having the same phase as) line-to-line voltage signal V(SR), namely sinusoidal wave signal sinθ(SR).

Converter current command generator 243 produces the difference signal or the error signal between measured voltage signal V(DC) across the smoothing capacitor 9 and DC voltage command signal V(DC)*, performs PI control to amplify the error signal, and computes the product of the error signal and sinθ(SR) to produce converter S-phase current command signal I(S)*. The converter S-R-phase voltage modulation command generator circuit 144 amplifies by proportional control the difference between S-phase current command signal I(S)* of the converter current command generator 243 and S-phase current measured value signal I(S) to generate converter S-R-phase voltage modulation command signal V(SR)*.

Adder 162 adds U-phase voltage modulation command signal V(UN)* to converter S-R-phase voltage modulation command signal V(SR)* to generate converter S-phase voltage modulation command signal V(SN)*. Designated as 247 is a converter drive circuit for PWM-controlling S-phase upper and lower arm switch sections 220*a* and 220*b* of converter 220, and receiving converter S-phase voltage modulation command signal V(SN)*, converter drive circuit 247 PWM-controls converter section 220.

To control the R-phase voltage of the converter section, common section 110 works as the main circuit, and U-phase voltage modulation command signal V(UN)* fed to common section drive circuit 149 works as converter R-phase voltage modulation command signal V(RN)*. With converter S-phase voltage modulation command signal V(SN)* applied to converter section 220, a single phase power across two phases of the three-phase AC power source is converted into a DC power, and PWM controlling is performed according to a predetermined command so that an input current from the three-phase AC source is made sinusoidal and the input voltage is set to agree with the input current in phase, and thereby the input power factor is set to be approximately 1, and a voltage across the smoothing capacitor 9 is set to be a predetermined DC voltage value.

As discussed in detail above, according to this embodiment, the converter is constituted by converter section 120 and common section 110, or by converter section 220 and common section 110. The inverter is constituted by inverter section 230 and common section 110 or by inverter section 130 and common section 110. The common switch sections common to the converter section and the inverter section are arranged, and the switch section of each of converter section 120, common section 110, and inverter section 230 or the switch section of each of converter section 220, common section 110 and inverter section 130 is PWM-controlled according to the respective voltage modulation command signal having the predetermined amplitude and phase relationship among the phases. Thus, the number of pairs of upper and lower arm switches constituting the main circuit is reduced by one pair, and along with the reduction, the component count of the control circuit is reduced as well. The reduced component count permits a lightweight and compact design. Furthermore, the reduction of switch sections that are source of loss and heat generation allows the efficiency of the apparatus to be increased and the cooling of the apparatus to be simplified.

When switching is made in an uninterruptible fashion between the AC output generated by inverter section 230 or 130 and the AC output obtained directly from the three-phase AC power source with inverter section 230 or 130 bypassed, both converter section 120 and inverter section 130 are controlled on the common reference level because one phase of the three-phase AC input, for example R phase, is commonly connected to one phase of the three-phase AC output, for example U phase, or the single phase AC output. Even when switch SWJ107, switch SWH212 and switch SWI214 are concurrently closed for switching to the bypass circuit or even when switch SWJ207, switch SWH112 and SWI114 are concurrently closed for switching to the bypass circuit, the AC output of the bypass circuit and the AC output of inverter section 230 or 130 are synchronous and at the same potential level, and any trouble such as an output shorting is precluded. Furthermore, since no potential difference takes place between the converter section and the inverter section, the isolating transformer 13 required in the prior art is dispensed with.

Since the voltage modulation command signal of each phase fed to each of converter drive circuit 147 or 247, common section drive circuit 149, and inverter drive circuit 252 or 152 is produced by adding each line-to-line voltage modulation command signal to U-phase voltage modulation command signal V(UN)* generated by common section voltage modulation command generator circuit 146, each easily measured line-to-line voltage is used, as it is, to generate each line-to-line voltage modulation command signal, and unlike the prior art, the present invention dispenses with voltage converter circuit 49 that is needed to convert each line-to-line voltage measured value into a phase voltage. Thus, a highly reliable control circuit having a simplified circuit arrangement results.

Embodiment 3.

Figure 27:
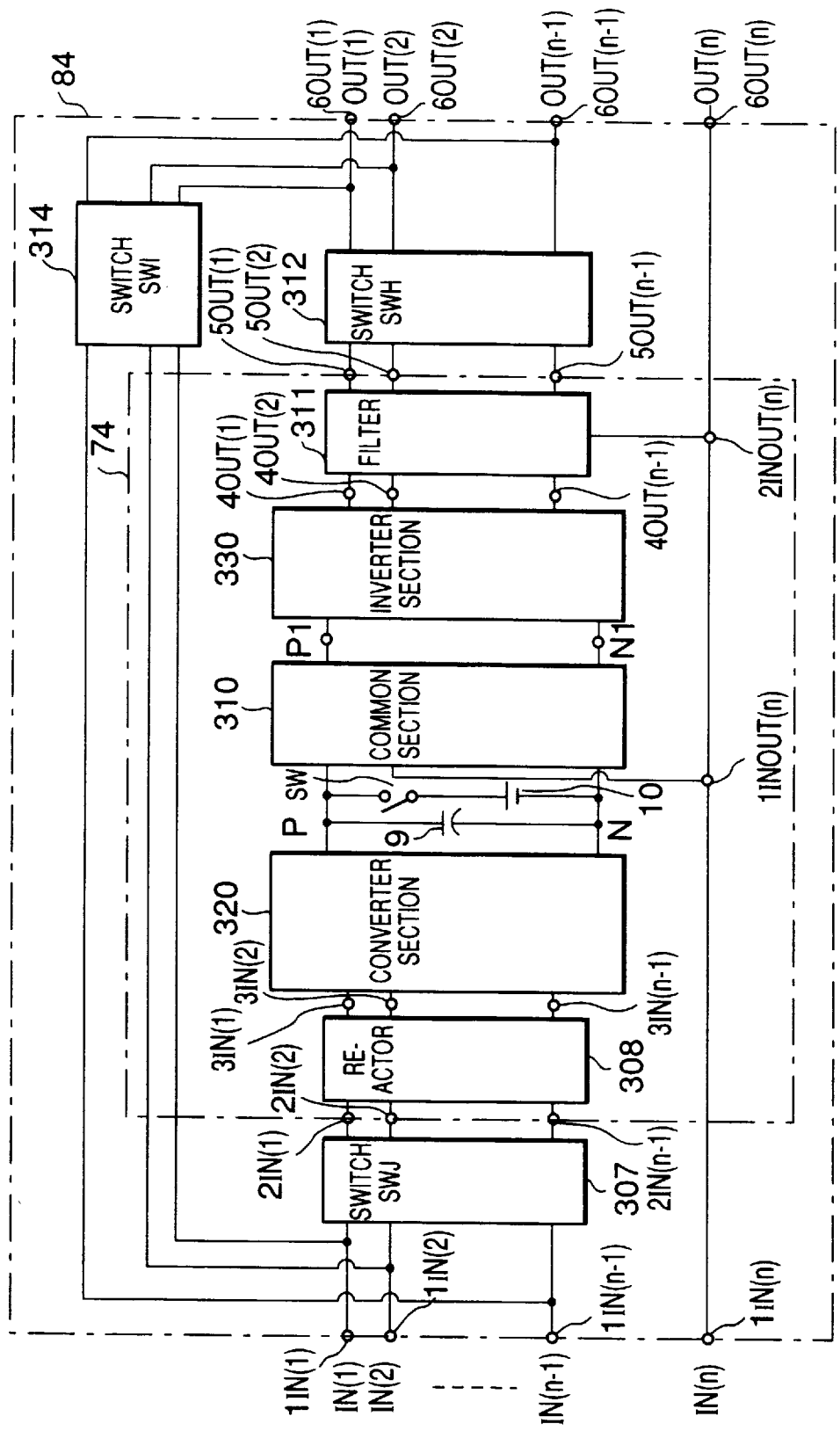
FIG. 27 is a block diagram showing a main circuit arrangement of an uninterruptible power supply employing an n-phase input/n-phase output power conversion apparatus according to the third embodiment of the invention.
Figure 28:
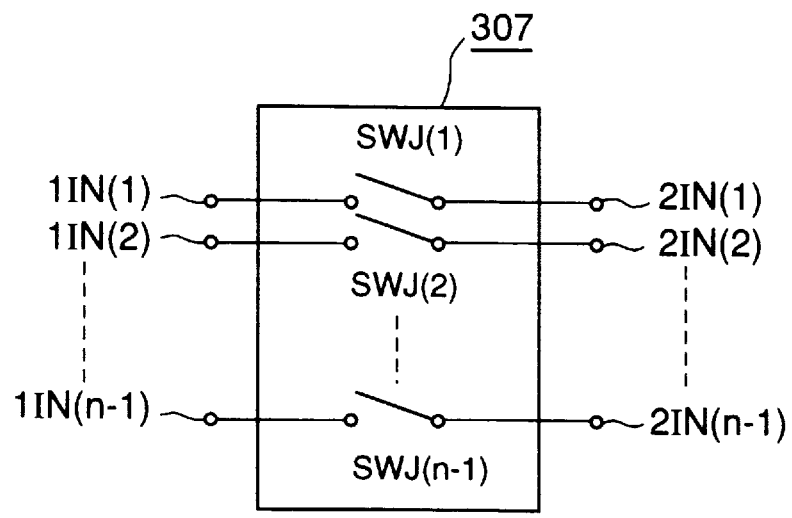
FIG. 28 depicts the internal details of switch SWJ307 according to the third embodiment of the invention.
Figure 29:
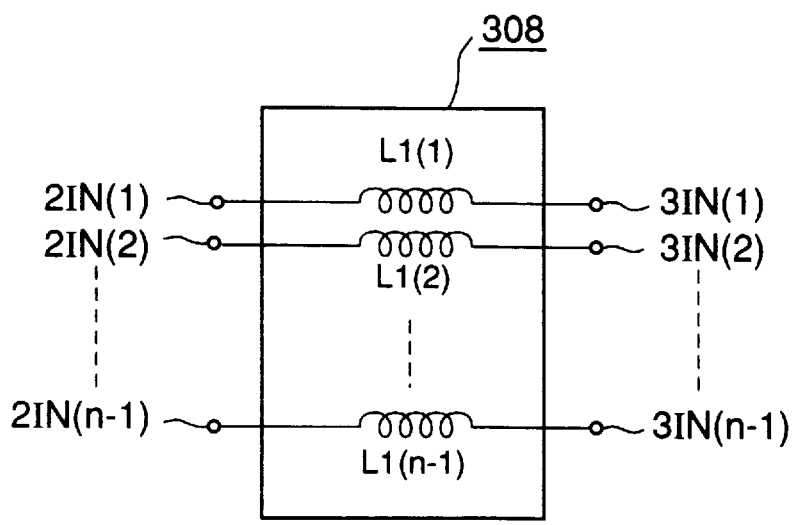
FIG. 29 depicts the internal details of reactor 308 according to the third embodiment of the invention.
Figure 30:
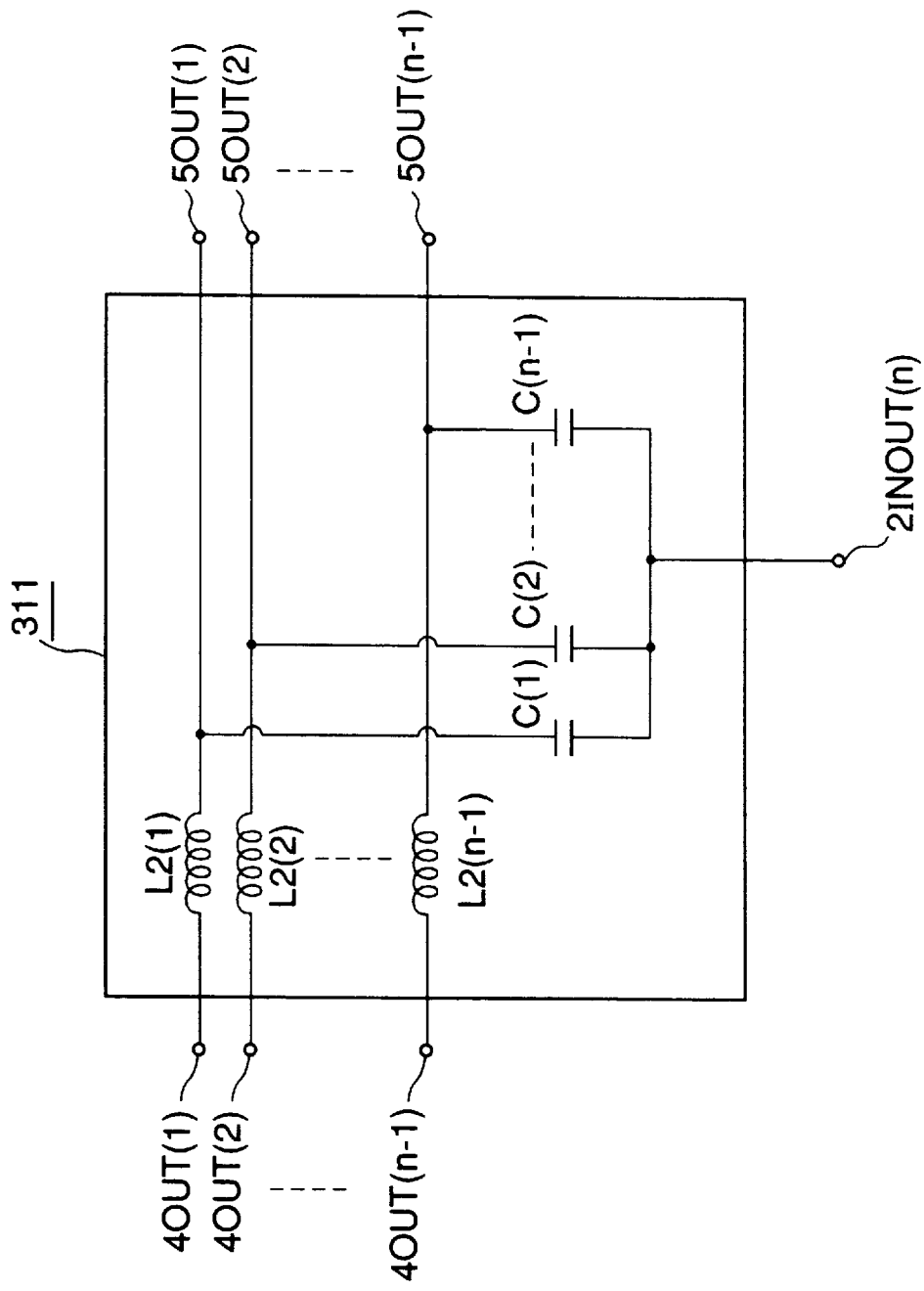
FIG. 30 depicts the internal details of filter 311 according to the third embodiment of the invention.
Figure 31:
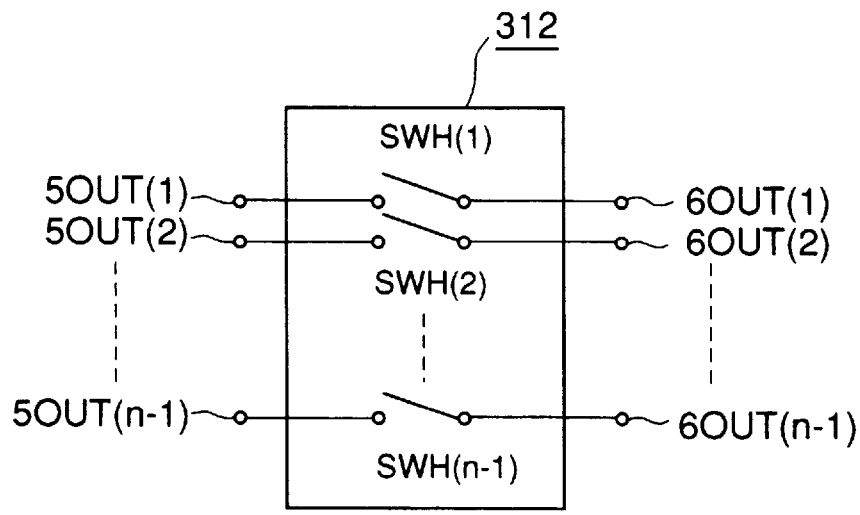
FIG. 31 depicts the internal details of switch SWH312 according to the third embodiment of the invention.
Figure 32:
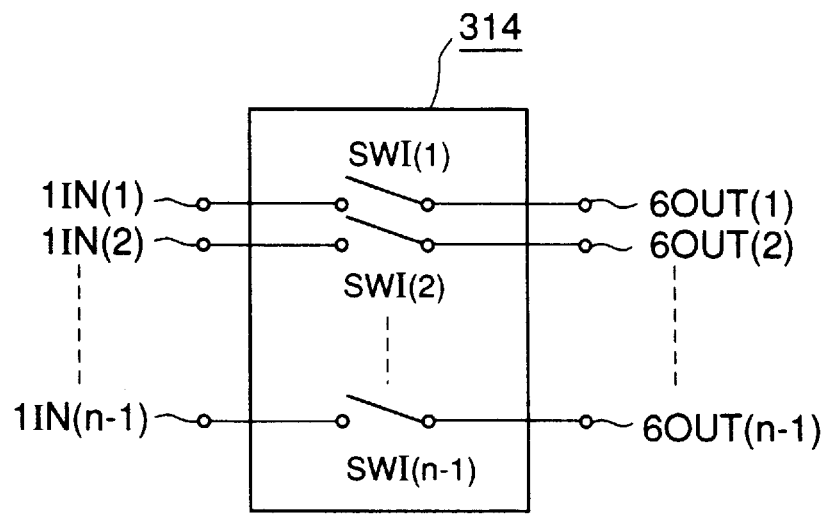
FIG. 32 depicts the internal details of switch SWI314 according to the third embodiment of the invention.
Figure 33:
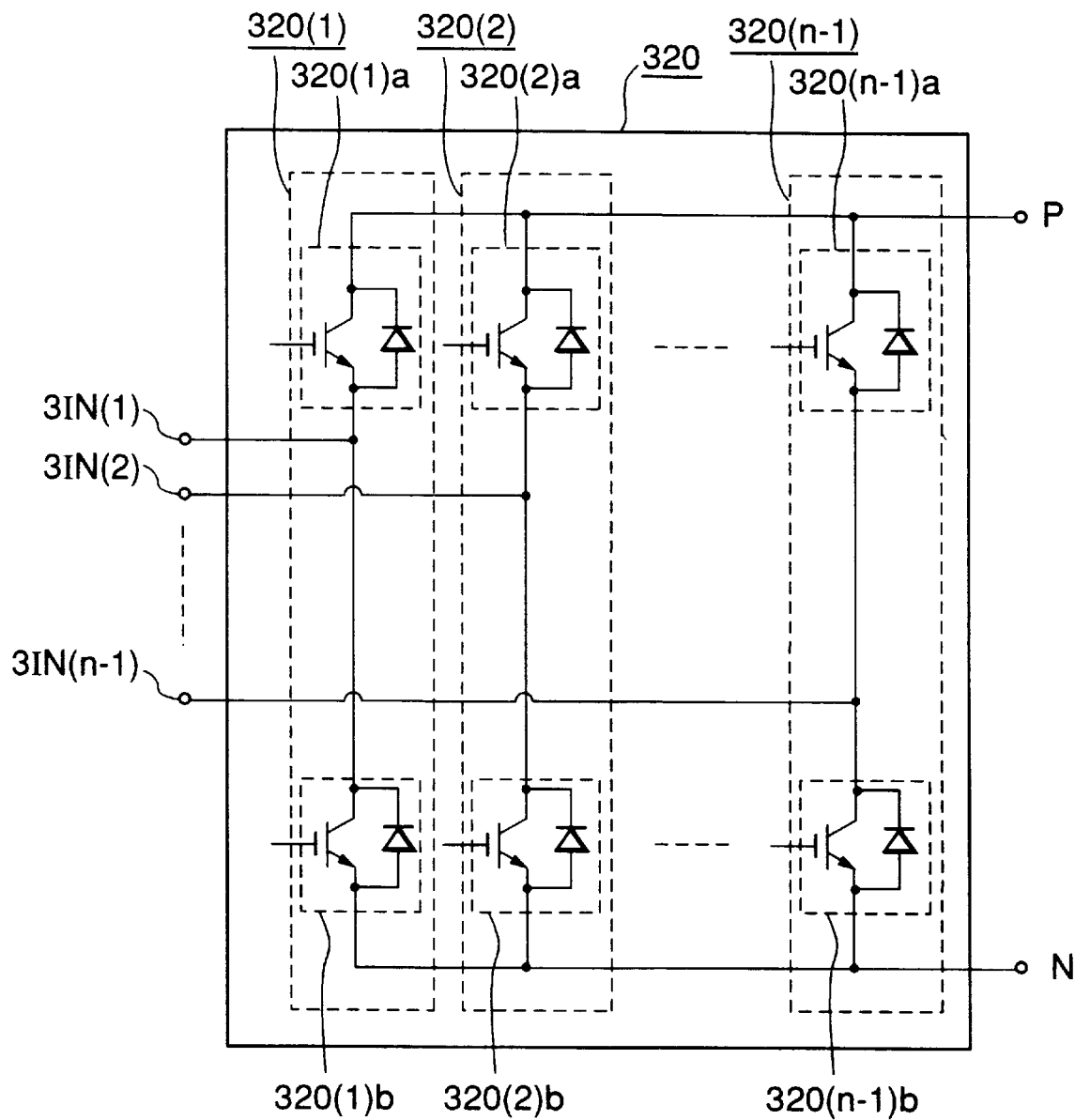
FIG. 33 depicts the internal details of converter section 320 according to the third embodiment of the invention.
Figure 34:
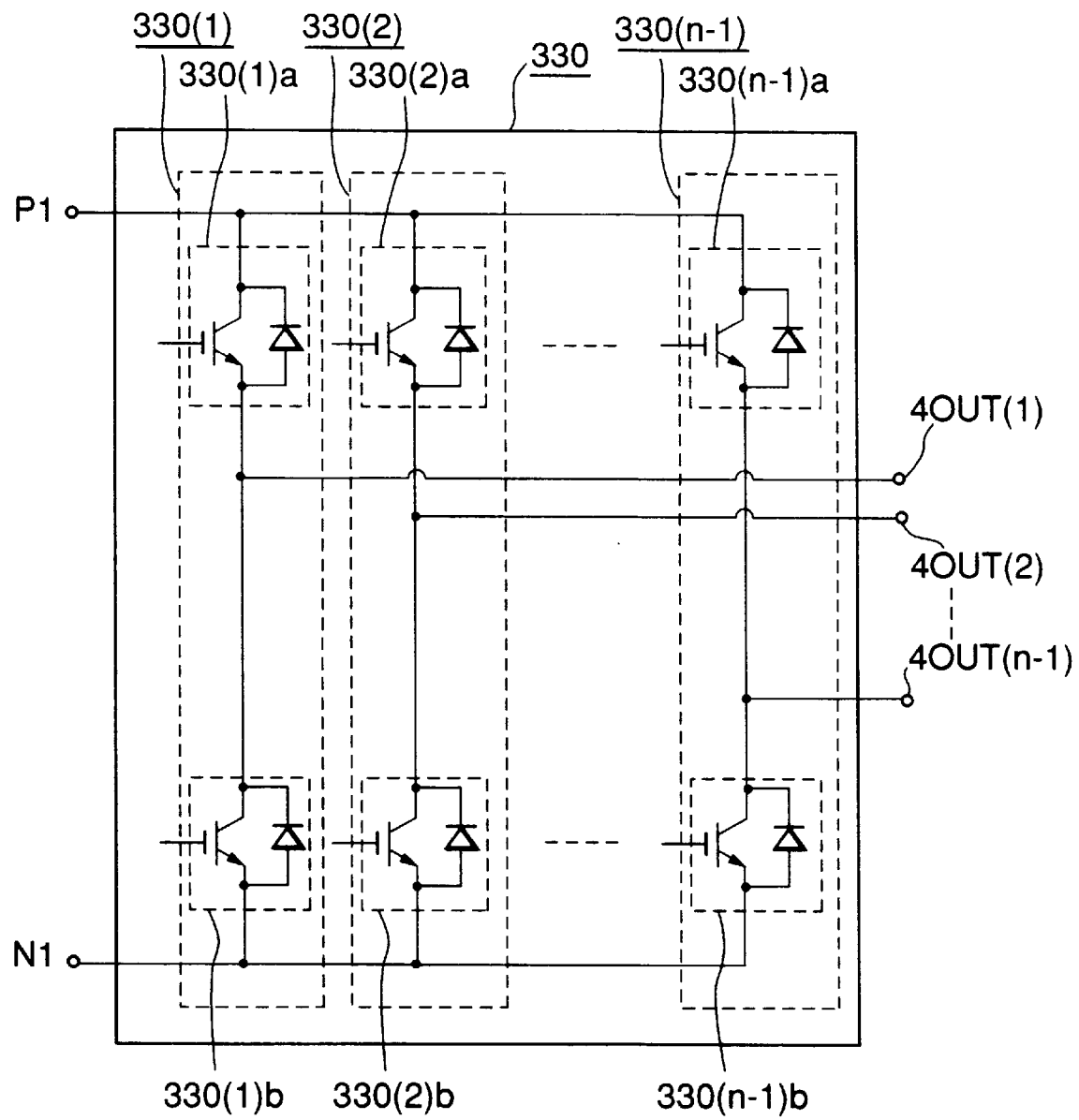
FIG. 34 depicts the internal details of inverter section 330 according to the third embodiment of the invention.
Figure 35:
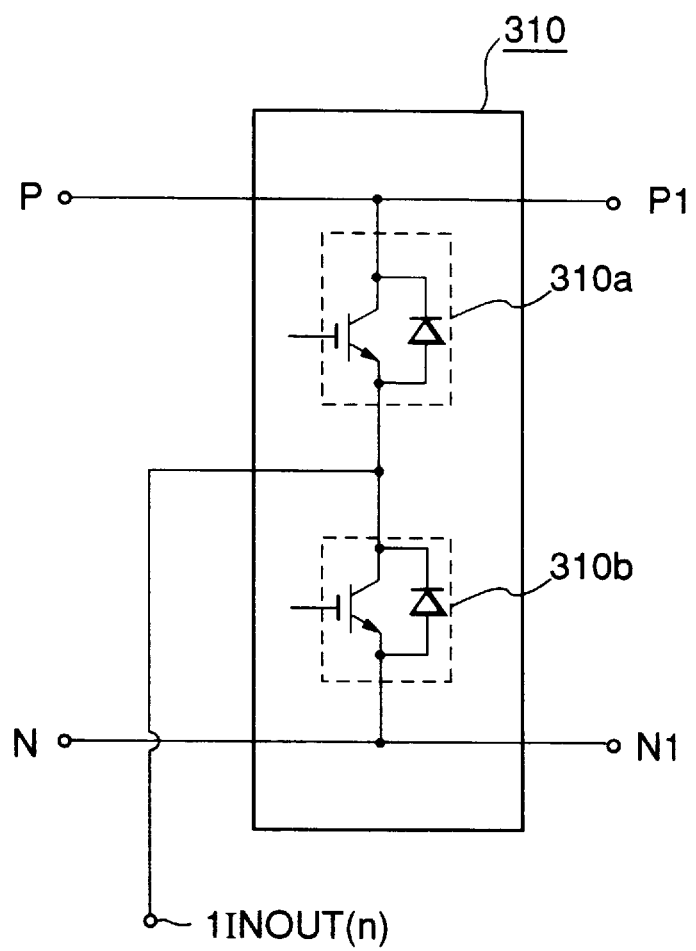
FIG. 35 depicts the internal details of common section 310 according to the third embodiment of the invention.

In the third embodiment of the present invention, an uninterruptible power supply employing a power conversion apparatus receives n-phase AC input power and outputs n-phase AC output power of the same frequency as the n-phase AC input power. The third embodiment is discussed referring to FIGS. 27 to 35. FIG. 27 is a block diagram showing the main circuit arrangement and FIGS. 28–35 show internal details of certain elements shown in FIG. 27. In the figures, components identical or equivalent to those in the prior art and Embodiments 1 and 2 are designated with the same reference numerals.

Figure 2:
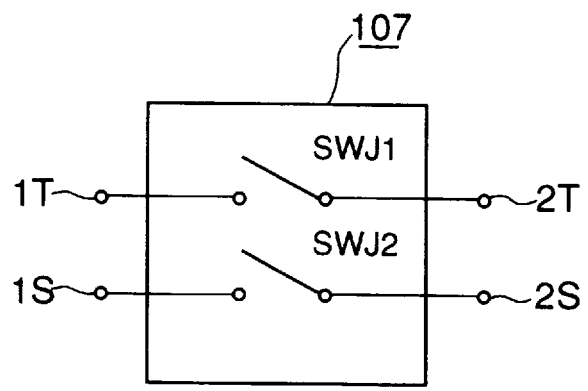
FIG. 2 depicts the internal details of switch SWJ107 according to the first embodiment of the invention.
Figure 3:
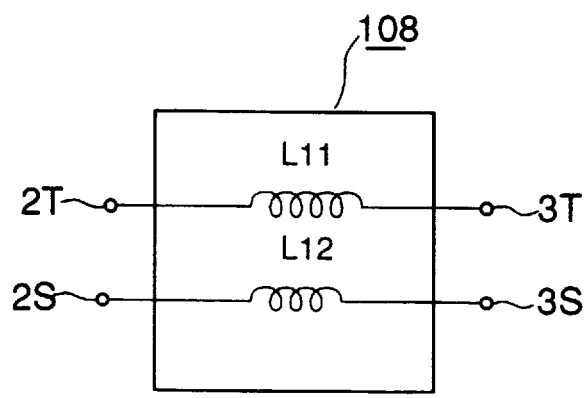
FIG. 3 depicts the internal details of reactor 108 according to the first embodiment of the invention.
Figure 4:
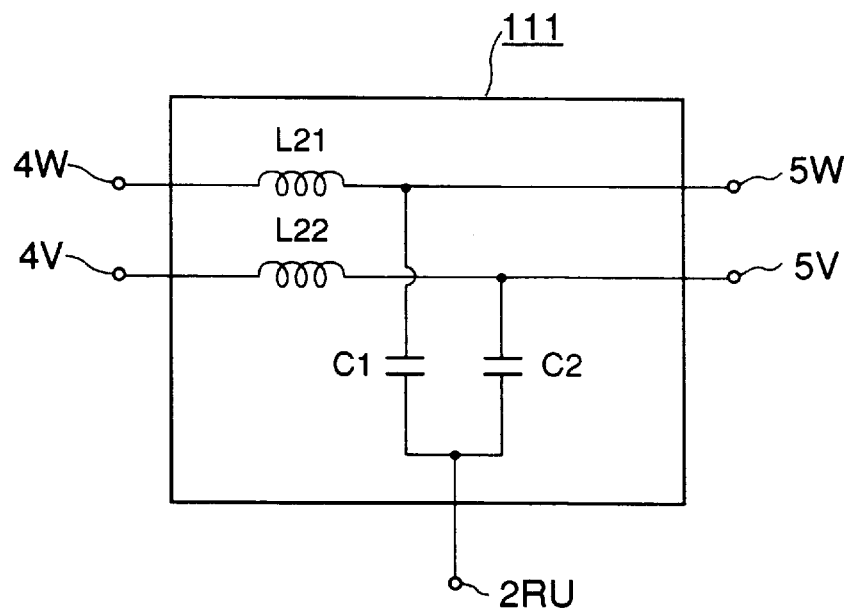
FIG. 4 depicts the internal details of filter 111 according to the first embodiment of the invention.
Figure 5:
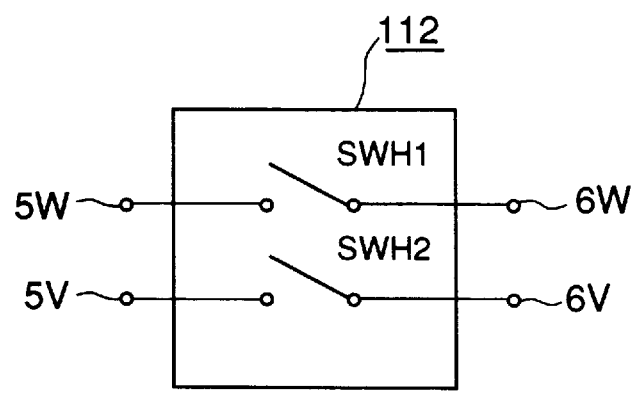
FIG. 5 depicts the internal details of switch SWH112 according to the first embodiment of the invention.

Shown in FIG. 2 as power conversion apparatus 74 within uninterruptible power supply 84. Switch SWJ307 is made up of switches SWJ(1) to SWJ(n-1) for (n-1) phases, and reactor 308 is made up of reactors L1(1) to L1(n-1) for (n-1) phases. Filter 311 is made up of reactors L2(1) to L2(n-1) and capacitors C(1) to C(n-1) for (n-1) phases, switch SWH312 is made up of switches SWH(1) to SWH(n-1) for (n-1) phases, and switch SWI314 is made up of switches SWI(1) to SWI(n-1) for (n-1) phases. Converter section 320 is for converting an (n-1)-phase AC input power into a DC power, and inverter section 330 is for converting the DC power into an n-phase AC power in corporation with common section 310. Common section 310 is constructed of upper and lower arm switch sections for n phases for use with converter section 320 and inverter section 330.

There are also shown upper and lower arm switch sections 320(1) to 320(n-1) for the first to (n-1)th phases, upper arm switch sections 320(1)*a* to 320(n-1)*a* for the first to (n-1)th phases, and lower arm switch sections 320(1)*b* to 320(n-1)*b* for the first to (n-1)th phases. Each of upper and lower arm switch sections 320(1)*a* to 320(n-1)*a* and 320(1)*b* to 320(n-1)*b* is constructed of a switching element such as a transistor, an FET or an IGBT and a diode in an inverse-parallel connection.

There are also shown upper and lower arm switch sections 330(1) to 330(n-1) for the first to (n-1)th phases, the upper arm switch sections 330(1)*a* to 330(n-1)*a* for the first to (n-1)th phases, and the lower arm switch sections 330(1)*b* to 330(n-1)*b* for the first to (n-1)th phases. Each of the upper and lower arm switch sections 330(1)*a* to 330(n-1)*a* and 330(1)*b* to 330(n-1)*b* is constructed of a switching element such as a transistor, an FET or an IGBT and a diode in an inverse-parallel connection.

Also shown are upper arm switch section 310*a* of the n-th phase upper and lower switch sections 310, and lower arm switch section 310*b* of the n-th phase upper and lower switch sections 310.

In FIG. 27, 1IN(1) to 1IN(n) are input terminals to which the first phase to the n-th phase of AC input power source are respectively supplied, and 6OUT(1) to 6OUT(n) are the first phase to the n-th phase AC output terminals from which the n phase outputs are given to a load (not shown). Terminal 1IN(n) and terminal 6OUT(n) are directly connected. Terminals 1IN(1) to 1IN(n-1) are connected to terminals 2IN(1) to 2IN(n-1) via switches SWJ(1) to SWJ(n-1) of switch SWJ307, respectively, and terminals 2IN(1) to 2IN(n-1) are connected to terminals 3IN(n) to 3IN(n-1) via L1(1) to L1(n-1) of reactor 308. Terminal 3IN(1) to 3IN(n-1) are connected to a connecting point of upper arm switch section 320(1)*a* and lower arm switch section 320(1)*b* of the first phase to a connecting point of upper arm switch section 320(n-1)*a* and lower arm switch section 320(n-1)*b* of the (n-1)th phase.

Terminal 1INOUT(n) is connected to a connecting point of upper arm switch section 310a and lower arm switch section 310b of common section 310. P1 and N1 are a DC positive terminal and a DC negative terminal, respectively, between common section 310 and inverter section 330, and are at the same potential level as DC positive terminal P and DC negative terminal N, respectively.

Terminals 4OUT(1) to 4OUT(n-1) are respectively connected to a connecting point of upper arm switch section 330(1)a and lower arm switch section 330(1)b of the first phase to a connecting point of upper arm switch section 330(n-1)a and lower arm switch section 330(n-1)b of the (n-1)th phase of inverter section 330. Terminals 4OUT(1) to 4OUT(n-1) are respectively connected to terminals 5OUT(1) to 5OUT(n-1) via reactors L2(1) to L2(n-1) of filter 311, and 2INOUT(n) is connected to common node of capacitors C(1) to C(n-1) of filter 311.

Terminals 5OUT(1) to 5OUT(n-1) are respectively connected to terminals 6OUT(1) to 6OUT(n-1) via SWH(1) to SWH(n-1) of switch SWH312, and terminals 1IN(1) to 1IN(n-1) are respectively connected to terminals 6OUT(1) to 6OUT(n-1) via SWI(L) to SWI(n-1) of switch SWI314.

Discussed now is the operation of this embodiment in which an uninterruptible power supply employs a power conversion apparatus receiving an n-phase AC input power and outputting an n-phase AC output power having the same frequency as the n-phase AC input power. In the operation of the converter, converter section 320, common section 310, and reactor 308 convert the n-phase AC voltage of an n-phase AC power source into a DC power, while the upper and lower arm switch sections of converter section 320 and common section 310 are PWM-controlled by predetermined commands so that the input current from the n-phase AC power source is made sinusoidal, and the input voltage and current are set to be in phase, thereby achieving an input power factor of approximately 1, and setting the voltage across smoothing capacitor 9 to a predetermined DC voltage value. The operation of this embodiment, if phase number n=3, is identical to that of Embodiment 1, except that the phase difference between phases herein is π/n rather than π/3.

In the operation of the inverter, the upper and lower arm switch sections of inverter section 330 and common section 310 are PWM-controlled according to predetermined commands so that inverter section 330, common section 310 and filter 311 output a sinusoidal n-phase output voltage that has the same voltage value, frequency and phase relationship as the n-phase AC voltage of the input power source. The control operation of this embodiment, if phase number n=3, is identical to the Embodiment 1, except that the phase difference between phases herein is π/n rather than π/3.

As discussed in detail above, according to this embodiment, not only in case of a single phase or a three phase, but also in case of a multiple phase of a four phase or more where the number of input phases is the same as the number of output phases, the converter is constituted by converter section 320 and common section 310, the inverter is constituted by inverter section 330 and common section 310, the switch sections common to the converter section and the inverter section are arranged, and each switch section of converter section 320, common section 310 and inverter section 330 is PWM-controlled according to the respective voltage modulation command signal having a predetermined amplitude and phase relationships among the phases. Thus, the number of pairs of upper and lower arm switches constituting the main circuit is reduced by one pair, and along with the reduction, a component count of the control circuit is reduced as well. The reduced component count permits a lightweight and compact design. Furthermore, the reduction of switch sections that are source of loss and heat generation allows an efficiency of the apparatus to be increased and the cooling of the apparatus to be simplified.

When the switching is made in an uninterruptible fashion between the AC output generated by inverter section 330 and the AC output obtained from the three-phase AC power source with inverter section 330 bypassed, both converter section 320 and inverter section 330 are controlled on the common reference level because one phase of the n-phase AC input, for example the n-th phase, is commonly connected to one phase of the n-phase AC output, for example the n-th phase. Even when switch SWJ307, switch SWH312 and switch SWI314 are concurrently closed for switching to the bypass circuit, the AC output from the bypass circuit and the AC output from inverter section 330 are synchronous and at the same potential level, and any trouble such as an output shorting is precluded. Furthermore, since no potential difference takes place between the converter section and the inverter section, isolating transformer 13 required in the prior art is dispensed with.

Since the voltage modulation command signal of each phase fed to each of the converter drive circuit, the common section drive circuit and the inverter drive circuit is produced in the same manner as in Embodiment 1, namely by adding each line-to-line voltage modulation command signal to the n-th phase voltage modulation command signal generated by the common section voltage modulation command generator circuit, each easily measured line-to-line voltage measured value is used, as it is, to generate each line-to-line voltage modulation command signal, and unlike the prior art, the present invention dispenses with voltage converter circuit 49 that is needed to convert each line-to-line voltage measured value into a phase voltage. Thus, a highly reliable control circuit having a simplified circuit arrangement results, this being particularly advantageous in a multiple-phase application.

Embodiment 4.

Figure 36:
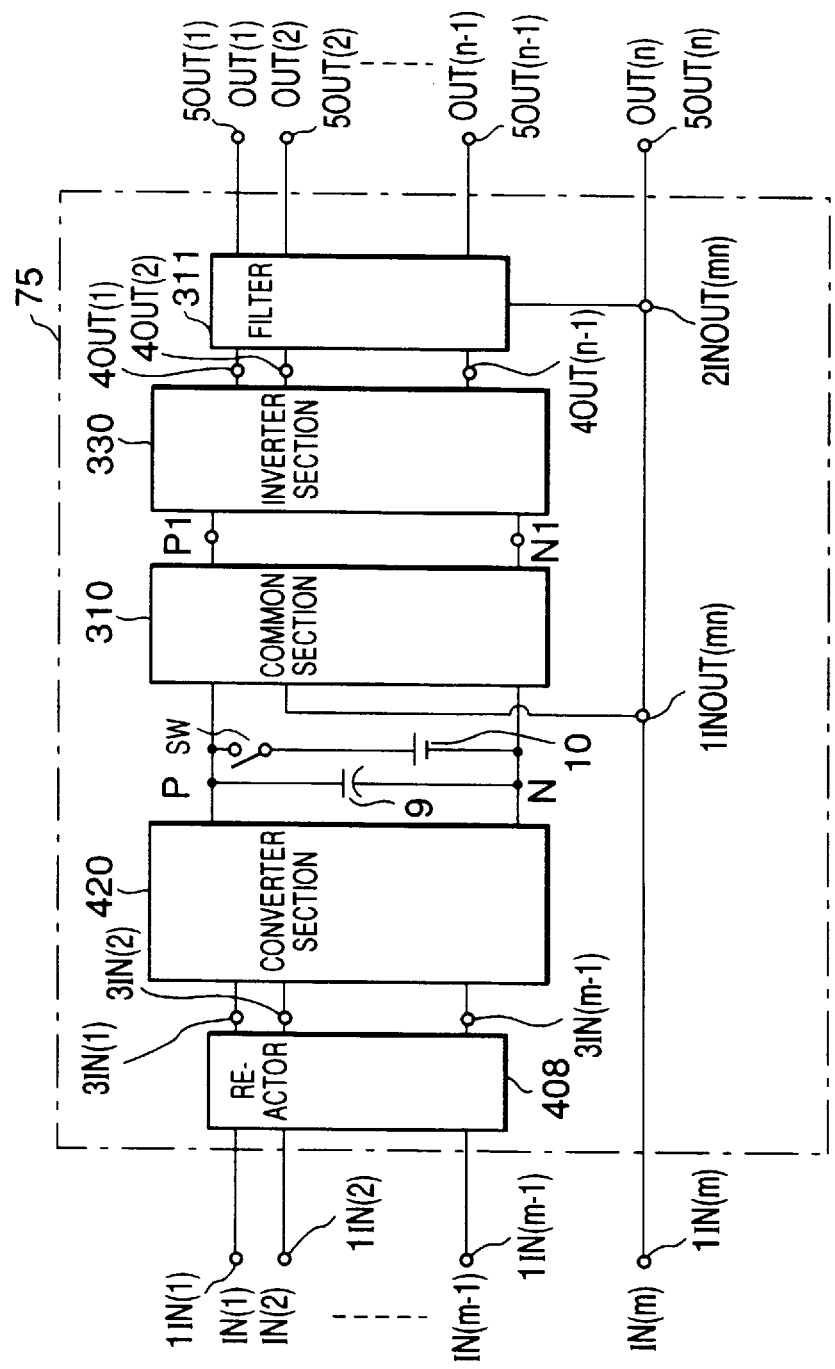
FIG. 36 is a block diagram showing a main circuit arrangement of an uninterruptible power supply of an m-phase input/n-phase output according the fourth embodiment of the invention.
Figure 37:
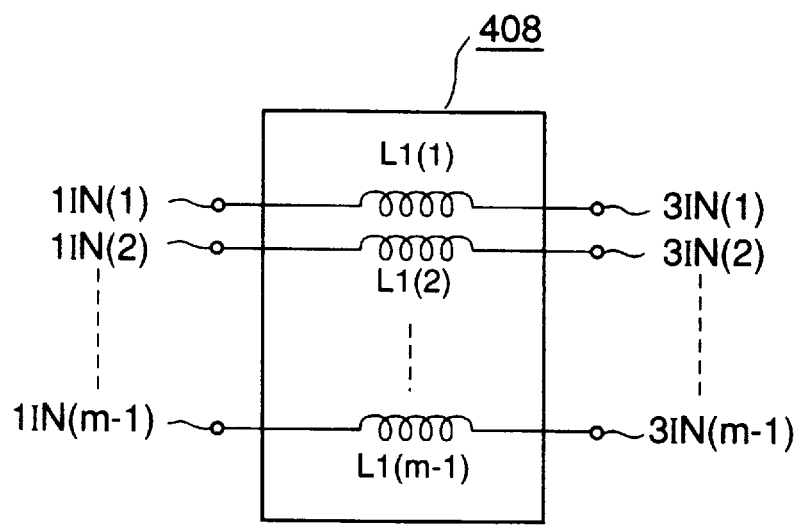
FIG. 37 depicts the internal details of reactor 408 according to the fourth embodiment of the invention.
Figure 38:
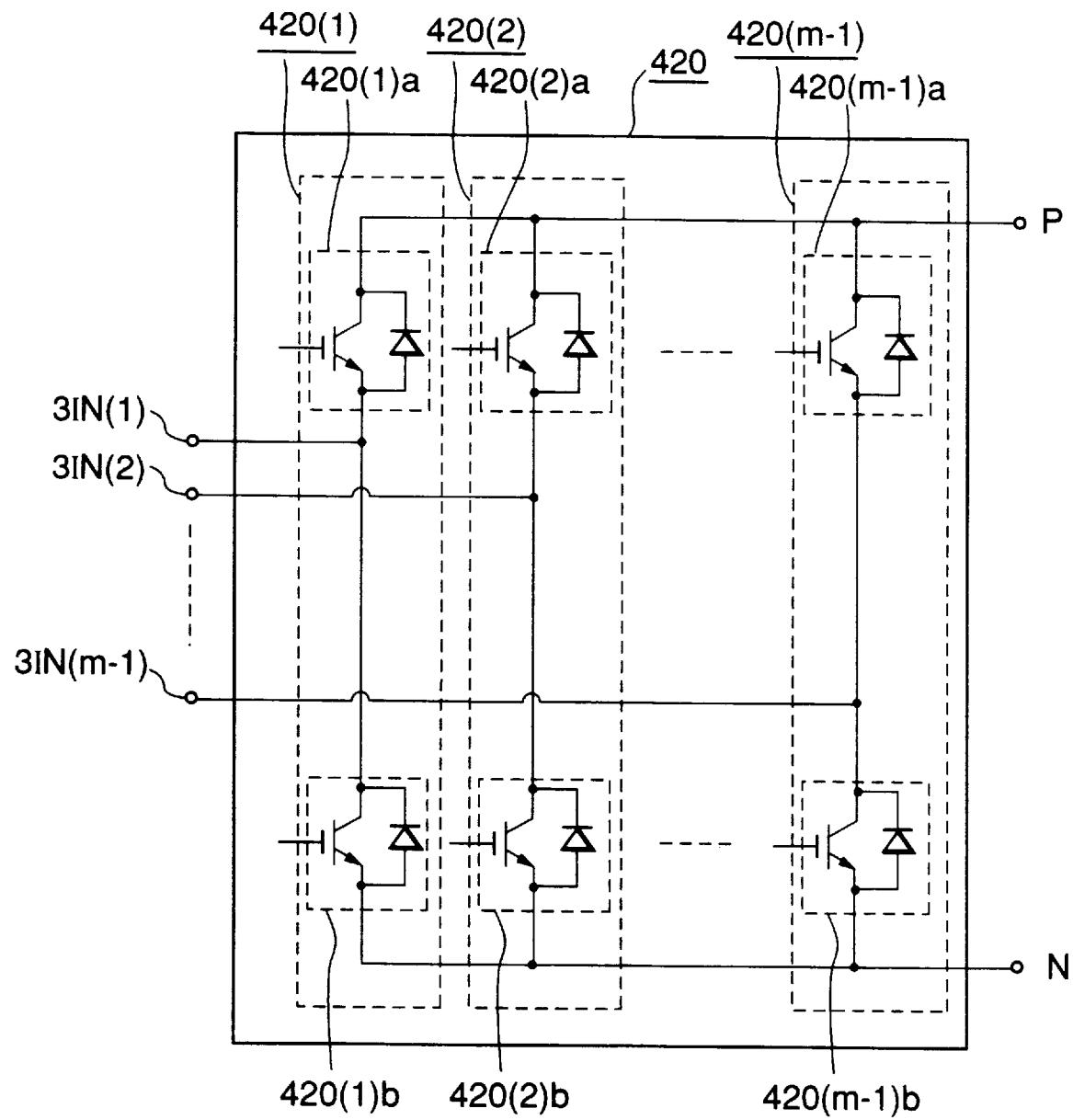
FIG. 38 depicts the internal details of converter 420 according to the fourth embodiment of the invention.
Figure 39:
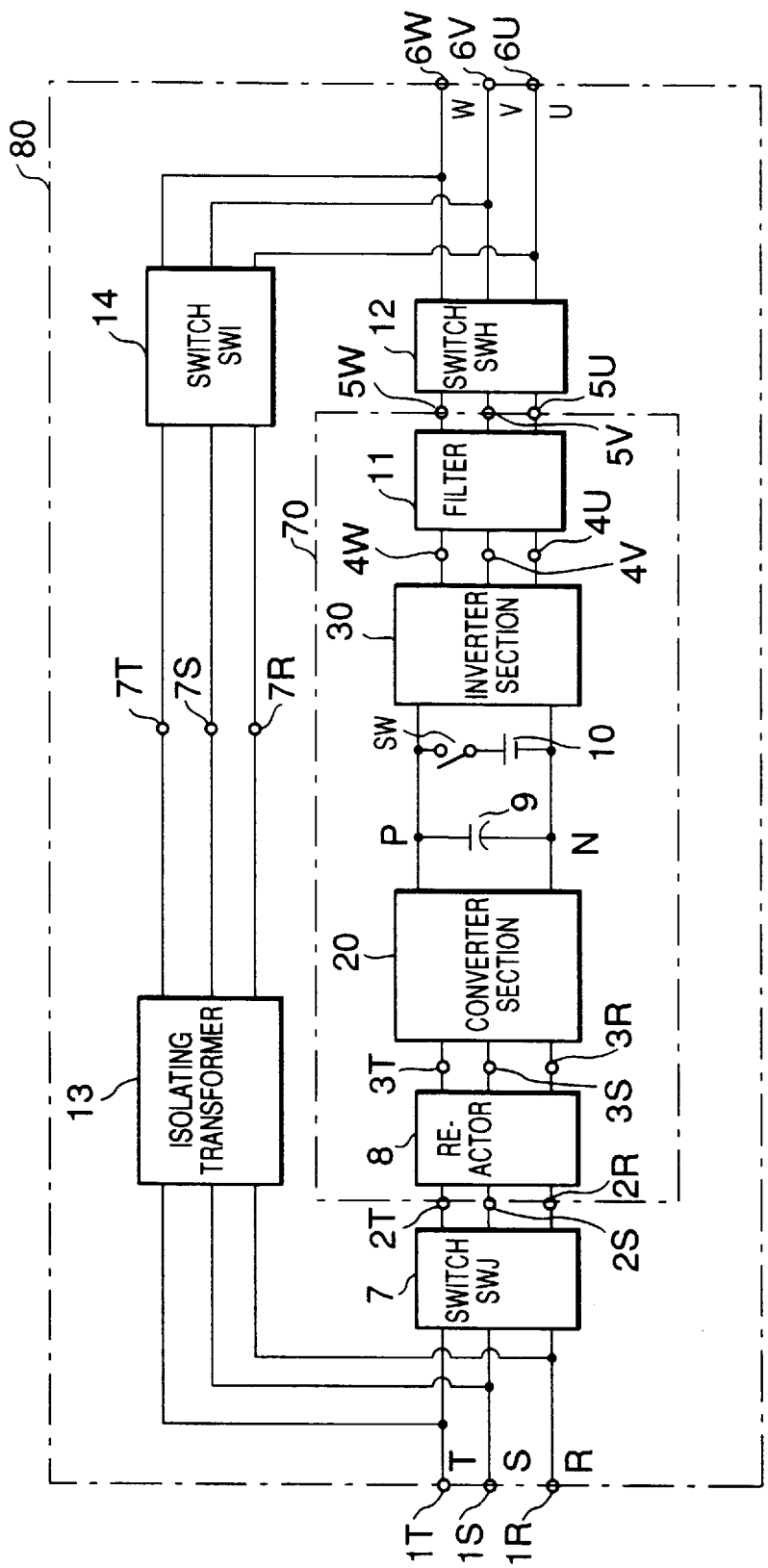
FIG. 39 is a block diagram showing a main circuit arrangement of an uninterruptible power supply employing the prior art three-phase input/three-phase output power conversion apparatus.
Figure 40:
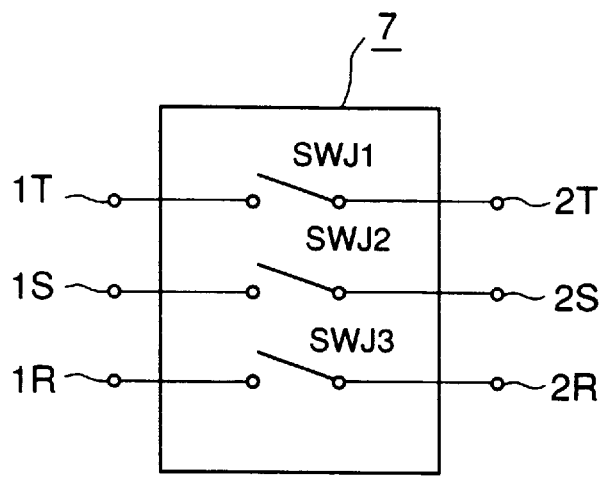
FIG. 40 depicts the internal details of the prior art switch SWJ7.
Figure 41:
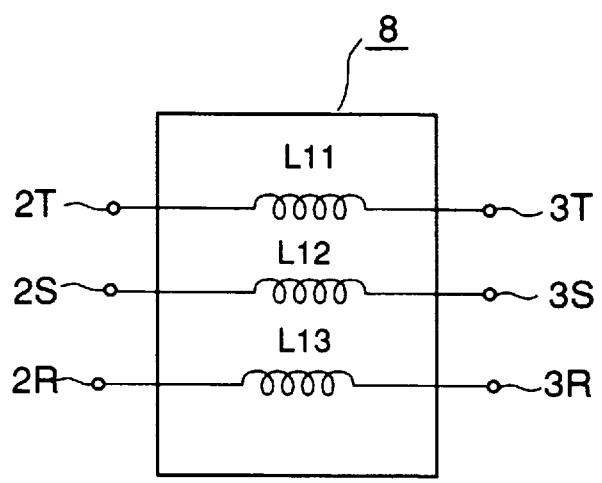
FIG. 41 depicts the internal details of the prior art reactor 8.
Figure 42:
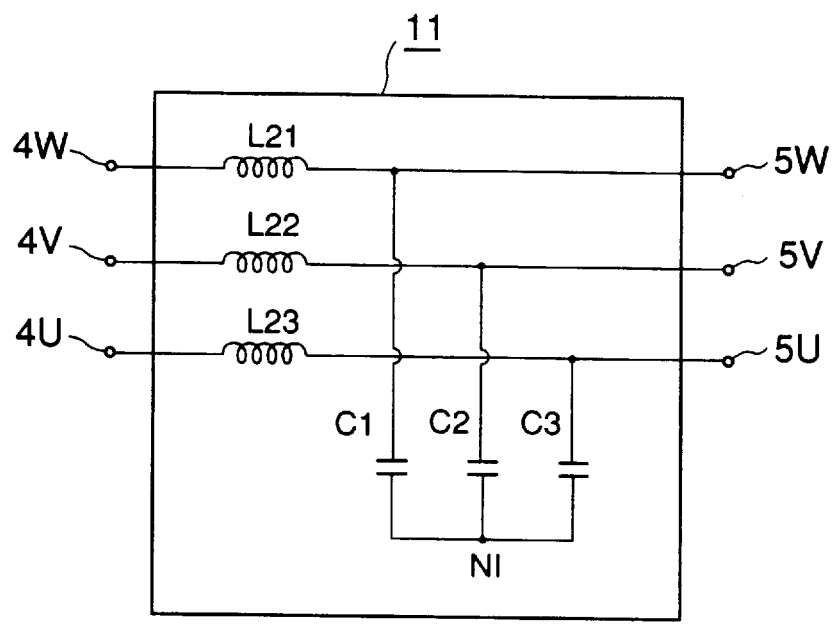
FIG. 42 depicts the internal details of the prior art filter 11.
Figure 43:
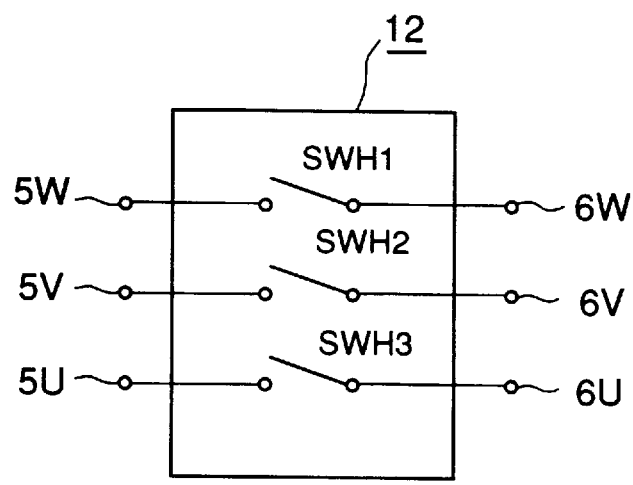
FIG. 43 depicts the internal details of the prior art switch SWH12.
Figure 44:
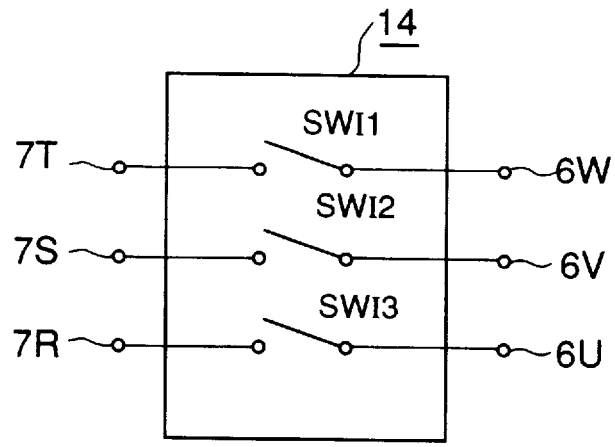
FIG. 44 depicts the internal details of the prior art switch SWI14.
Figure 45:
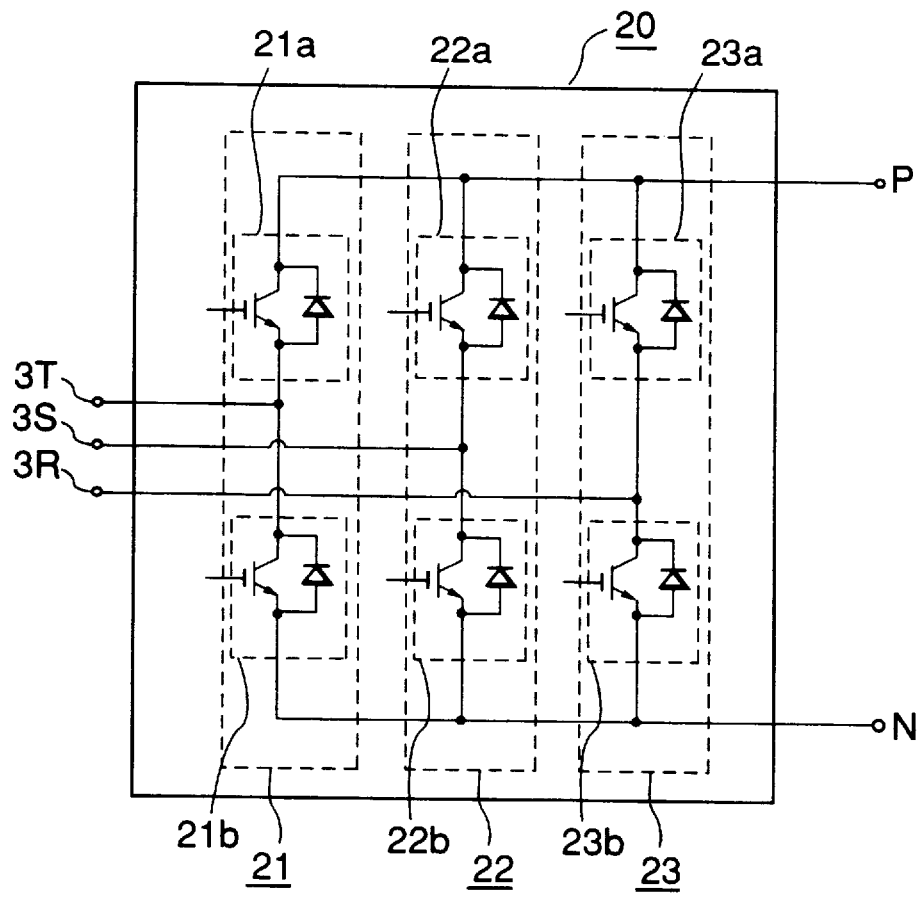
FIG. 45 depicts the internal details of the prior art converter section 20.
Figure 46:
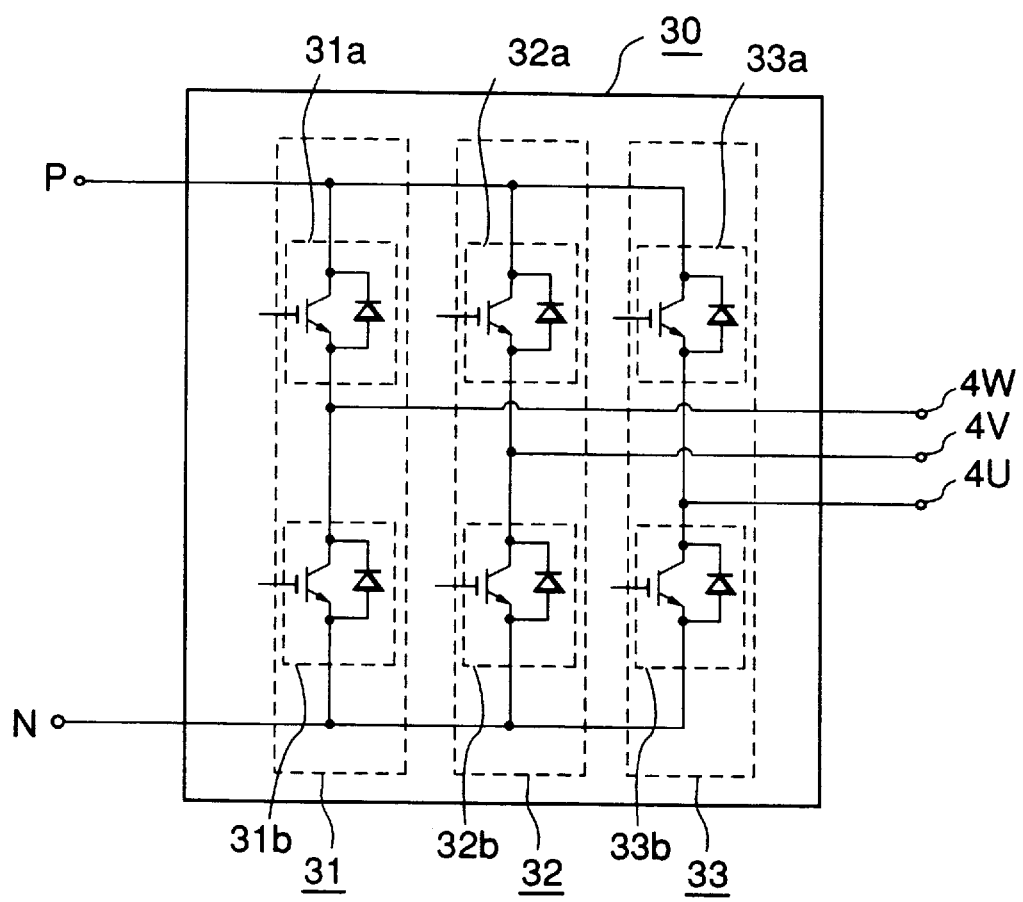
FIG. 46 depicts the internal details of the prior art inverter section 30.
Figure 47:
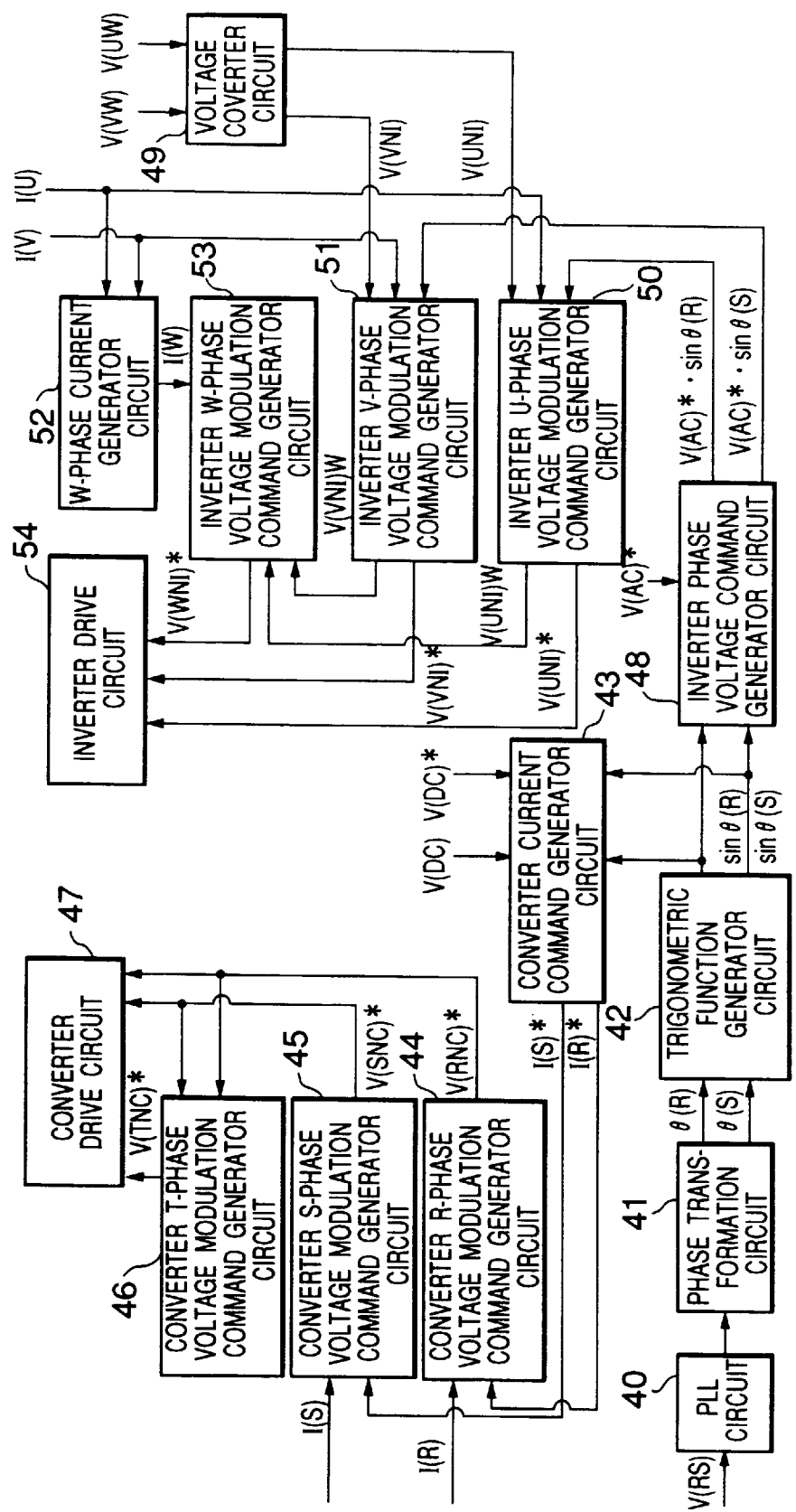
FIG. 47 is a block diagram showing a control circuit arrangement of an uninterruptible power supply employing the prior art three-phase input/three-phase output power conversion apparatus.
Figure 48:
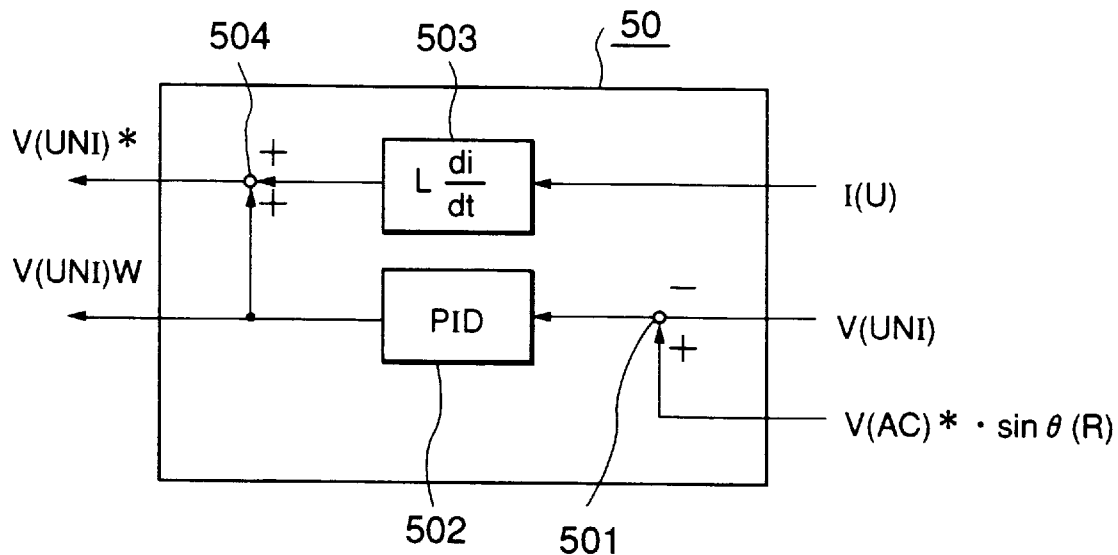
FIG. 48 is a block diagram showing a detailed arrangement of the prior art inverter U-phase voltage modulation command generator circuit 50.
Figure 49:
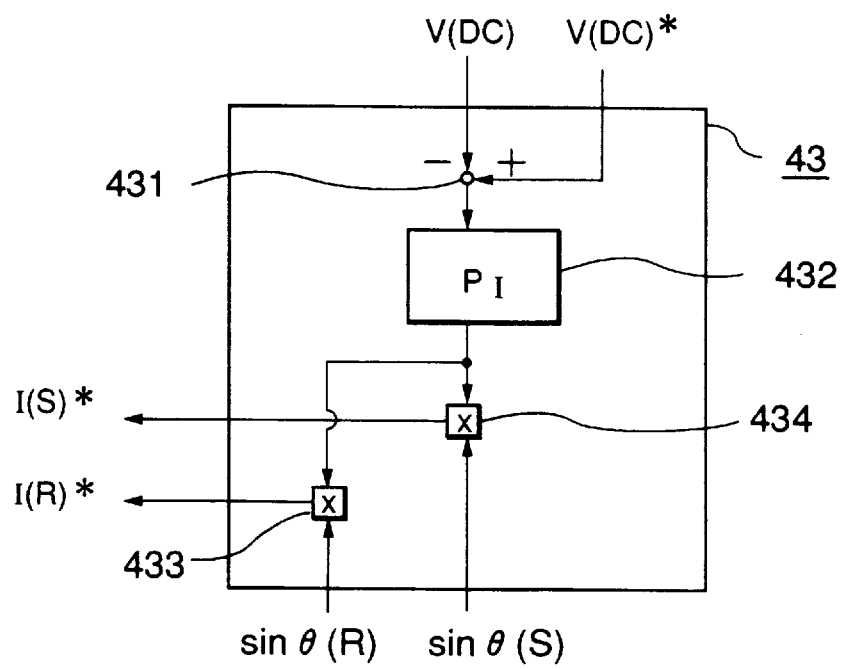
FIG. 49 is a block diagram showing a detailed arrangement of the prior art converter current command generator 43.
Figure 50:
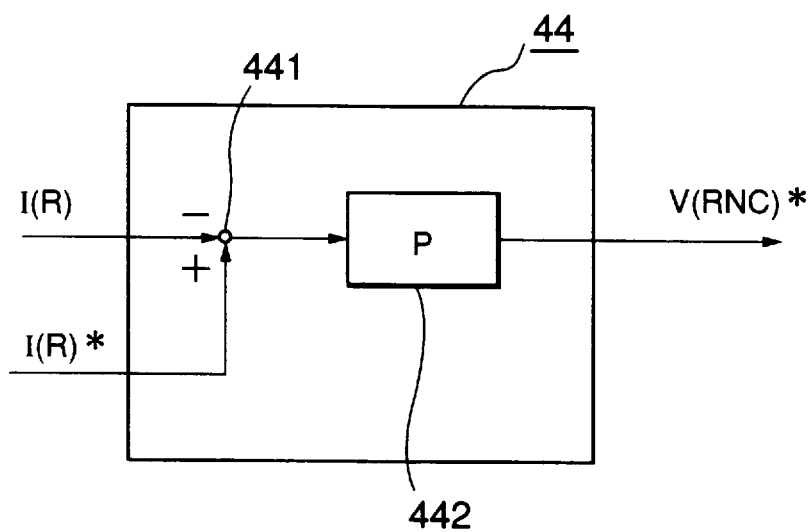
FIG. 50 is a block diagram showing a detailed arrangement of the prior art converter R-phase voltage modulation command generator circuit 44.

Referring to FIGS. 36 to 38, the fourth embodiment of the present invention is discussed, in which an uninterruptible power supply receives an m-phase AC input power and outputs an n-phase AC output power having the same frequency as the m-phase AC input power. FIG. 36 is a block diagram showing the main control circuit arrangement, FIG. 37 shows the internal details of reactor 408, and FIG. 38 shows the internal details of converter 420. In the figures, the components equivalent or identical to those in the prior art or Embodiments 1, 2 and 3 are designated with the same reference numerals.

Shown in FIG. 36 is power conversion apparatus 75. Reactor 408 is made up of reactors L1(1) to L1(m-1) for (m-1) phases. Converter section 420 is for converting an (m-1) phase AC input power to a DC power.

There are also shown (FIG. 38) upper and lower arm switch sections 420(1) to 420(m-1) for the first to (m-1)th phases, including upper arm switch sections 420(1)a to 420(m-1)a for the first to (m-1)th phases and lower arm switch sections 420(1)b to 420(n-1)b for the first to (m-1)th phases. Each of upper and lower arm switch sections 420(1)a to 420(n-1)a and 420(1)b to 420(n-1)b is constructed of a switching element such as transistor, an FET or an IGBT and a diode in an inverse-parallel connection.

In FIG. 36, 1IN(1) to 1IN(m) are input terminals Lo which the first phase to m-th phase input power of three-phase AC input source are respectively supplied. Terminals 1IN(1) to 1IN(m-1) are connected to terminals 3IN(1) to 3IN(m-1) via L1(1) to L1(m-1) of reactor 408, and terminal 3IN(1) to 3IN(m-1) are connected to a connecting point of upper arm switch section 420(1)a and lower arm switch section 420(1)b of the first phase to a connecting point of upper arm switch section 420(m-1)a and lower arm switch section 420(m-1)b of the m-1)th phase.

Terminal 1INOUT(mn) is connected to a connecting point of upper arm switch section 310a and lower arm switch section 310b of common section 310, and 2INOUT(mn) is connected to a connecting point of capacitors C(1) to C(n-1) of filter 311.

Discussed now is the operation of this embodiment of the power conversion apparatus that receives an m-phase AC input power and outputs an n-phase AC output power having the same frequency as the m-phase AC input. In the operation of the converter, converter section 420, common section 310, and reactor 408 convert an m-phase AC voltage of the m-phase AC power source into a DC power, while the upper and lower arm switch sections of converter section 420 and common section 310 are PWM-controlled by predetermined commands so that the input current from the m-phase AC power source is made sinusoidal, and the input voltage and current are set to be in phase, thereby achieving an input power factor of approximately 1, and setting the voltage across smoothing capacitor 9 to a predetermined DC voltage value. The operation of this embodiment, if phase number n=3, is identical to that of Embodiment 1, except that the phase difference between phases herein is π/m rather than π/3.

In the operation of the inverter, the upper and lower arm switch sections of inverter section 330 and common section 310 are PWM-controlled according to predetermined commands so that inverter section 330, common section 310 and filter 311 output a sinusoidal n-phase output voltage that has the same voltage value, frequency and phase relationships as the n-phase AC voltage of the input power source. The control operation of this embodiment, if phase number n=3, is identical to Embodiment 1, except that the phase difference between phases herein is π/n rather than π/3.

As discussed in detail above, according to this embodiment, in the case where an input power source having an arbitrary number of phases and an output power having an arbitrary number of phases different from that of the input power source, the converter is constituted by converter section 420 and common section 310, the inverter is constituted by inverter section 330 and common section 310, the common switch sections common to the converter section and the inverter section are arranged, and each switch section of converter section 420, common section 310 and inverter section 330 is PWM-controlled according to the respective voltage modulation command signal having a predetermined amplitude and phase relationships among the phases, and thus, the number of pairs of upper and lower arm switches constituting the main circuit is reduced by one pair, and along with the reduction, the component count of the control circuit is reduced as well. The reduced component count permits a lightweight and compact design. Furthermore, the reduction of switch sections that are source of loss and heat generation allows the efficiency of the apparatus to be increased and the cooling method of the apparatus to be simplified.

Since the voltage modulation command signal of each phase fed to each of the converter drive circuit, the common section drive circuit and the inverter drive circuit is produced in the same manner as in the Embodiment 1, namely by adding each line-to-line voltage modulation command signal to the n-th phase voltage modulation command signal generated by the common section voltage modulation command generator circuit, each easily measured line-to-line voltage is used, as it is, to generate each line-to-line voltage modulation command signal, and unlike the prior art, the present invention dispenses with voltage converter circuit 49 that is needed to convert each line-to-line voltage measured value into a phase voltage. Thus a highly reliable control circuit having a simplified circuit arrangement results.

As described above, in connection with the embodiments of the invention set forth, the following advantages are obtained:

(1) The power conversion apparatus of the present invention comprises a converter section for converting an AC power into a DC power by PWM-controlling a plurality of switch sections, an inverter section for converting a DC power into an AC power by PWM-controlling a plurality of switch sections, and a common section for converting an AC power into a DC power or a DC power into an AC power by PWM-controlling a plurality of switch sections. A converter control section performs PWM control for converting an AC input power into a DC power through the combination of the common section and the converter section. An inverter control section performs PWM control for converting the DC power into an AC output through the combination of the common section and the inverter section. Since the common section is shared by the converter section and the inverter section, the count of the components of the main circuit and thus the count of the components of the control circuit are reduced, permitting a lightweight and compact design. Furthermore, the reduction of switch sections that are source of loss and heat generation allows the efficiency of the apparatus to be increased and the cooling of the apparatus to be simplified.

(2) Each of the converter section, the inverter section and the common section comprises at least one pair of upper and lower arm switch sections. One phase of the AC input power is commonly connected to one phase of the AC output power and to a connecting point of the upper arm switch section and the lower arm switch section of the common section. The other phases of the AC input are connected to connecting points of the upper arm switch sections and the lower arm switch sections of the converter section, and the other phases of the AC output power are connected to connecting points of the upper arm switch sections and the lower arm switch sections of the inverter section.

Consequently, the converter section and the inverter section are PWM-controlled at the common reference level, and the count of the components of the main circuit and thus the count of the components of the control circuit are reduced, while the AC input power and the AC output power of the inverter section are synchronized and are at the same potential level.

(3) Each of the converter section and the inverter section comprises two pairs of upper and lower arm switch sections, and the common section comprises a pair of upper and lower arm switch sections, whereby two phases of a three-phase AC input power are connected to respective connecting points of the two pairs of upper and lower arm switch sections of the converter section, and two phases of a three-phase AC output power are connected to respective connecting points of the two pairs of upper and lower arm switch sections of the inverter section. When the AC input power is three-phase and the AC output power is three-phase, the converter section and the inverter section are PWM-controlled at the common reference level, and the count of the components of the main circuit and thus the count of the components of the control circuit are reduced, while the AC input power and the AC output power of the inverter section are synchronized and at the same potential level.

(4) The converter section comprises two pairs of upper and lower arm switch sections and each of the inverter section and the common section comprises a pair of upper and lower arm switch sections, whereby two phases of a three-phase AC input power are connected to respective connecting points of the two pairs of upper and lower arm switch sections of the converter section, and one phase of a single phase AC output power is connected to a connecting point of the pair of upper and lower arm switch sections of the inverter section. When the AC input power is three-phase and the AC output power is single-phase, the converter section and the inverter section are PWM-controlled at the common reference level. The count of the components of the main circuit and the count of the components of the control circuit are reduced, while the AC input power and the AC output power of the inverter section are synchronized and are at the same potential level.

(5) Each of the converter section and the common section comprises a pair of upper and lower arm switch sections, and the inverter section comprises two pairs of upper and lower arm switch sections. One phase of a single phase AC input power is connected to a connecting point of the pair of upper and lower arm switch sections of the converter, and two phases of a three-phase AC output power are connected to respective connecting points of the two pairs of upper and lower arm switch sections of the inverter section.

When the AC input power is single-phase and the AC output power is three-phase, the converter section and the inverter section are PWM-controlled at the common reference level. The count of the components of the main circuit and the count of the components of the control circuit are reduced, while the AC input power and the AC output power of the inverter section are synchronized and are at the same potential level.

(6) Generally, the power conversion apparatus comprises a converter section for converting an AC power into a DC power by PWM-controlling a plurality of switch sections, an inverter section for converting the DC power into an AC power by PWM-controlling a plurality of switch sections, a common section for converting the AC power into a DC power or a DC power into an AC power by PWM-controlling a plurality of switch sections, and a converter control section that performs PWM control for converting the AC input power into a DC power through the combination of the common section and the converter section, and performs PWM control for converting the DC power into an AC output power through the combination of the common section and the inverter section. The method for controlling this apparatus comprises the steps of: using as a reference signal at least one phase of the AC input power, producing a common section voltage modulation signal that PWM-controls the common section according to the reference signal, producing a converter section voltage modulation signal and an inverter section voltage modulation signal each having a predetermined phase difference with respect to the common section voltage modulation signal, using as a PWM modulation signal of the converter control section the converter section voltage modulation signal and the common section voltage modulation signal, and using as a PWM modulation signal of the inverter control section the inverter section voltage modulation signal and the common section voltage modulation signal.

Accordingly, the common section is shared by the converter section and the inverter section to perform their own functions, and the count of the components of the main circuit and thus the count of the components of the control circuit are reduced, permitting a lightweight and compact design. Furthermore, the reduction of switch sections that are source of loss and heat generation allows the efficiency of the apparatus to be increased and the cooling of the apparatus to be simplified.

(7) When each of the converter section, the inverter section and the common section comprises at least one pair of upper and lower arm switch sections, the method comprises the steps of: commonly connecting one phase of the AC input power to one phase of the AC output, connecting the commonly connected phase to a connecting point of the upper arm switch section and the lower arm switch section of the common section, connecting other phases of the AC input power to connecting points of the upper arm switch sections and the lower arm switch sections of the converter section, connecting other phases of the AC output power to connecting points of the upper arm switch sections and the lower arm switch sections of the inverter section, and producing the reference signal from a line-to-line voltage between the commonly connected phase of the AC input power and the other phase of the AC input power.

Consequently, the converter section and the inverter section are PWM-controlled at the common reference level, and the count of the-Components of the main circuit and the count of the components of the control circuit are reduced, while the AC input power and the AC output power of the inverter section are synchronized and are at the same potential level.

(8) When each of the converter section and the inverter section comprises two pairs of upper and lower arm switch sections, the common section comprises a pair of upper and lower arm switch sections, the method comprises the steps of: connecting two phases of the three-phase AC input power to respective connecting points of the two pairs of upper and lower arm switch sections of the converter section, connecting two phases of the three-phase AC output power to respective connecting points of the two pairs of upper and lower arm switch sections of the inverter section, producing the common section voltage modulation signal based on the reference signal with a line-to-line phase relationship introduced, and producing the inverter section voltage modulation signal based on the common section voltage modulation signal and a line-to-line voltage modulation signal that is produced based on line-to-line voltages between one phase of an AC output power commonly connected to one phase of the AC input power and the other two phases of the AC output power.

When the AC input power is three-phase and the AC output power is three-phase, each phase voltage modulation command signal fed to each of the converter section and the inverter section is produced by adding each line-to-line voltage modulation command signal to the common section voltage modulation signal. Each easily measured line-to-line voltage is used, as it is, to generate each line-to-line voltage modulation command signal. Therefore, there is no need for the conversion of each line-to-line voltage measured value into a phase voltage. Thus, a highly reliable control circuit having a simplified circuit arrangement results.

(9) When each of the converter section and the inverter section comprises two pairs of upper and lower arm switch sections, and the common section comprises a pair of upper and lower arm switch section, the method comprises the steps of: connecting two phases of the three-phase AC input power to respective connecting, points of the two pairs of upper and lower arm switch sections of the converter section, connecting two phases of the three-phase AC output power to respective connecting points of the two pairs of upper and lower arm switch sections of the inverter section, producing the common section voltage modulation signal based on the reference signal with a line-to-line phase relationship introduced, and a step of producing the converter section voltage modulation signal based on the common section voltage modulation signal and a line-to-line voltage modulation signal that is produced based on line-to-line voltages between one phase of an AC output power commonly connected to one phase of the AC input power and the other two phases of the AC input power.

When the AC input power is three-phase and the AC output is three-phase, each phase voltage modulation command signal fed to each of the converter section and the inverter section is produced by adding each line-to-line voltage modulation command signal to the common section voltage modulation signal. Each easily measured line-to-line voltage is used, as it is, to generate each line-to-line voltage modulation command signal, and there is no need for the conversion of each line-to-line voltage measured value into a phase voltage. Thus, a highly reliable control circuit having a simplified circuit arrangement results.

(10) The function signal used to generate the common section voltage modulation signal for PWM-controlling the common section may be a sinusoidal wave signal, a trapezoidal-wave or a triangular-wave signal. Therefore, each signal can be precisely defined in terms of frequency, amplitude and phase relationship, and thus the voltage modulation command signal of each phase for the converter section and the inverter section is efficiently and precisely produced.

(11) The inventive uninterruptible power supply equipped with a power conversion apparatus comprises a converter section for converting an AC power into a DC power by PWM-controlling a plurality of switch sections, an inverter section for converting a DC power into an AC power by PWM-controlling a plurality of switch sections, a common section for converting an AC power into a DC power or a DC power into an AC power by PWM-controlling a plurality of switch sections, a converter control section that performs PWM control for converting an AC input power into a DC power through a combination of the common section and the converter section, an inverter control section that performs PWM control for converting the DC power into an AC output power through the combination of the common section and the inverter section, and a switch section for selectively outputting either the AC input power directly or the AC output power of the inverter section corresponding to the phase or phases of the AC input power.

The AC input power and the AC output power of the inverter section are synchronized and at the same potential level, and any trouble such as an output shorting is precluded even when the switching between the AC input power and the AC output power of the inverter section is made in an uninterruptible manner, without the need for any special device such as an isolating transformer for absorbing a potential difference taking place at the moment of the switching.

(12) Each of the converter section, the inverter section and the common section comprises at least one pair of upper and lower arm switch sections. One phase of the AC input power is commonly connected to one phase of the AC output power, and the commonly connected phase is connected to a connecting point of the upper arm switch section and the lower arm switch section of the common section. Other phases of the AC input power are connected to connecting points of the upper arm switch sections and the lower arm switch sections of the converter section, and other phases of the AC output power are connected to connecting points of the upper arm switch sections and the lower arm switch sections of the inverter section.

The AC input power and the AC output power of the inverter section are synchronized and at the same potential level, and any trouble such as an output shorting is precluded even when the switching between the AC input power and the AC output power of the inverter section is made in an uninterruptible manner, without the need for any special device such as an isolating transformer for absorbing a potential difference taking place at the moment of the switching.

(13) Each of the converter section and the inverter section comprises two pairs of upper and lower arm switch sections, and the common section comprises a pair of upper and lower arm switch section. Two phases of the three-phase AC input power are connected to respective connecting points of the two pairs of upper and lower arm switch sections of the converter section, and two phases of the three-phase AC output power are connected to respective connecting points of the two pairs of upper and lower arm switch sections in the inverter section.

When the AC input power is three-phase and the AC output power is three-phase, the AC power input and the AC output power of the inverter section are synchronized and are at the same potential level. Therefore, any trouble such as an output shorting is precluded even when the switching between the input AC and the output AC from the inverter section is made in an uninterruptible manner, without the need for any special device such as an isolating transformer for absorbing a potential difference taking place at the moment of the switching.

(14) The converter section comprises two pairs of upper and lower arm switch sections, and each of the inverter section and the common section comprises a pair of upper and lower arm switch sections. Two phases of the three-phase AC input power are connected to respective connecting points of the two pairs of upper and lower arm switch sections of the converter section, and one phase of the single phase AC output is connected to connecting point of the pair of upper and lower arm switch sections of the inverter section.

When the AC input power is three-phase and the AC output power is single-phase, the AC input power and the AC output power of the inverter section are synchronized and are at the same potential level. Thus, any trouble such as an output shorting is precluded even when the switching between the input AC and the output AC from the inverter section is made in an uninterruptible manner, without the need for any special device such as an isolating transformer for absorbing a potential difference taking place at the moment of the switching.

(15) Each of the converter section and the common section comprises a pair of upper and lower arm switch sections, and the inverter section comprises two pairs of upper and lower arm switch sections. One phase of the single phase AC input power is connected to connecting point of the pair of upper and lower arm switch sections of the converter, and two phases of the three-phase AC output power are connected to respective connecting points of the two pairs of upper and lower arm switch sections of the inverter section.

When the AC input power is single-phase and the AC output power is three-phase, the AC input power and the AC output power of the inverter section are synchronized and are at the same potential level. Therefore, any trouble such as an output shorting is precluded even when the switching between the AC input power and the AC output power of the inverter section is made in an uninterruptible manner, without the need for any special device such as an isolating transformer for absorbing a potential difference taking place at the moment of the switching.

The invention has been described with respect to certain preferred embodiments. Various modifications and additions within the spirits of the invention will occur to those of skill in the art. Accordingly, the scope of the invention is limited solely by the following claims.

What is claimed is:

1. A power conversion apparatus comprising:
    a common section having a plurality of first switch sections;
    a converter section having a plurality of second switch sections, said converter section and said common section collectively forming a converter for converting an input AC power received at AC input terminals into a DC power;
    an inverter section having a plurality of third switch sections, said inverter section and said common section collectively forming an inverter for converting the DC power into an output AC power, and applying the output AC power to AC output terminals;
    a converter control section for performing PWM control of the switch sections of each of said common section and said converter section to convert the input AC power into the DC power; and
    an inverter control section for performing PWM control of the switch sections of each of said common section and said inverter section to convert the DC power into the output AC power.

2. A power conversion apparatus according to claim 1, wherein
    each of said converter section, said inverter section and said common section comprises at least one pair of upper and lower arm switch sections;
    one of said AC input terminals is directly connected to one of said AC output terminals to provide a commonly connected phase;
    said commonly connected phase is connected to a connecting point of said upper arm switch section and said lower arm switch section of said common section;
    other of said AC input terminals are connected to connecting points of said upper arm switch sections and said lower arm switch sections of said converter section; and
    other of said AC output terminals are connected to connecting points of said upper arm switch sections and said lower arm switch sections of said inverter section.

3. A power conversion apparatus according to claim 2, wherein said input AC power comprises a three-phase input AC power and said output AC power comprises a three-phase output AC power;
    each of said converter section and said inverter section comprises two pairs of upper and lower arm switch sections;
    said common section comprises a pair of upper and lower arm switch sections;
    two phases of the three-phase input AC power are applied to respective connecting points of said two pairs of upper and lower arm switch sections of said converter section; and
    two phases of the three-phase output AC power are obtained from respective connecting points of said two pairs of upper and lower arm switch sections of said inverter section.

4. A power conversion apparatus according to claim 2, wherein said input AC power comprised a three-phase AC input power, and said output AC power comprises a single-phase AC output power;
    said converter section comprises two pairs of upper and lower arm switch sections;
    each of said inverter section and said common section comprises a pair of upper and lower arm switch sections;
    two phases of the three-phase AC input power are applied to respective connecting points of said two pairs of upper and lower arm switch sections of said converter section; and
    the single phase AC output power is provided from a connecting point of said pair of upper and lower arm switch sections of said inverter section.

5. A power conversion apparatus according to claim 2, wherein said input AC power comprises a single-phase AC input power, and the output AC power comprises a three-phase AC output power;
    each of said converter section and said common section comprises a pair of upper and lower arm switch sections;
    said inverter section comprises two pairs of upper and lower arm switch sections;
    the single phase AC input power is applied to a connecting point of said pair of upper and lower arm switch sections of said converter; and
    two phases of the three-phase AC output power are obtained from respective connecting points of the said two pairs of upper and lower arm switch sections of said inverter section.

6. In a power conversion apparatus which comprises a converter section for converting an AC input power into a DC power by PWM-controlling a plurality of switch sections, an inverter section for converting the DC power into an AC output power by PWM-controlling a plurality of switch sections, a common section for converting the AC input power into the DC power and the DC power into the AC output power by PWM-controlling a plurality of switch sections, and a converter control section that performs PWM control for converting the AC input power into the DC power through the combination of said common section and said converter section, and performs PWM control for converting said DC power into the AC output power through the combination of said common section and said inverter section, a control method comprising the steps of:
    using as a reference signal at least one phase of said AC input power;
    producing a common section voltage modulation signal that PWM controls said common section according to said reference signal;
    producing a converter section voltage modulation signal and an inverter section voltage modulation signal each having a predetermined phase difference with respect to said common section voltage modulate;
    using said converter control section voltage modulation signal and said common section voltage modulation signal as a PWM modulation signal of said converter control section; and
    using said inverter control section voltage modulation signal and said common section voltage modulation signal as a PWM modulation signal of said inverter control section.

7. A control method of power conversion apparatus according to claim 6, in which each of said converter section, said inverter section and said common section comprises at least a pair of upper and lower arm switch sections, comprising the steps of;

commonly connecting one phase of said AC input power to one phase of said AC output power and to a connecting point of said upper arm switch section and said lower arm switch section of said common section;

connecting other phases of said AC input power to connecting points of said upper arm switch sections and said lower arm switch sections of said converter section;

connecting other phases of said AC output power to connecting points of said upper arm switch sections and said lower arm switch sections of said inverter section; and producing said reference signal from a line-to-line voltage between said one phase of said AC input power and other phase of said AC input power.

8. A control method of power conversion apparatus according to claim 6, in which each of said converter section and said inverter section comprises two pairs of upper and lower arm switch sections, and said common section comprises a pair of upper and lower arm switch sections, and wherein said AC input power comprises a three-phase AC input power and said AC output power comprises a three-phase AC output power, comprising the steps of:

connecting one phase of said three-phase AC input power directly to one phase of said three-phase AC output power and to a connecting point of upper and lower arm switch sections of the common section;

connecting remaining two phases of said three-phase AC input power to respective connecting points of said two pairs of upper and lower arm switch sections of said converter section;

connecting remaining two phases of said three-phase AC output power to respective connecting points of said two pairs of upper and lower arm switch sections of said inverter section;

producing said common section voltage modulation signal based on said reference signal with a line-to-line phase relationship introduced;

producing said inverter section voltage modulation signal based on said common section voltage modulation signal and a line-to-line voltage modulation signal that is produced based on line-to-line voltages between the one phase of the AC output power which is commonly connected to the one phase of said AC input power, and the remaining two phases of the AC output power.

9. A control method of power conversion apparatus according to claim 6, in which each of said converter section and said inverter section comprises two pairs of upper and lower arm switch sections, and said common section comprises a pair of upper and lower arm switch sections, and wherein said AC input power comprises a three-phase AC input power and said AC output power comprises a three-phase output power; comprising the steps of:

connecting one phase of said three-phase AC input power to one phase of said three-phase output power and to a connecting point of upper and lower arm switch sections of the common section;

connecting remaining two phases of said three-phase AC input power to respective connecting points of said two pairs of upper and lower arm switch sections of said converter section;

connecting remaining two phases of said three-phase AC output power to respective connecting points of said two pairs of upper and lower arm switch sections of said inverter section;

producing said common section voltage modulation signal based on said reference signal with a line-to-line phase relationship introduced;

producing said converter section voltage modulation signal based on said common section voltage modulation signal and a line-to-line voltage modulation signal that is produced based on line-to-line voltages between the one phase of the AC output power which is commonly connected to the one phase of said AC input power, and the remaining two phases of said AC input power.

10. A control method of power conversion apparatus according to claim 6, wherein a function signal used to generate said common section voltage modulation signal for PWM-controlling said common section is one of a sinusoidal wave signal, a trapezoidal-wave signal and a triangular-wave signal.

11. A control method of power conversion apparatus according to claim 7, wherein a function signal used to generate said common section voltage modulation signal for PWM-controlling said common section is one of a sinusoidal wave signal, a trapezoidal-wave signal and a triangular-wave signal.

12. A control method of power conversion apparatus according to claim 8, wherein a function signal used to generate said common section voltage modulation signal for PWM-controlling said common section is one of a sinusoidal wave signal, a trapezoidal-wave signal and a triangular-wave signal.

13. A control method of power conversion apparatus according to claim 9, wherein a function signal used to generate said common section voltage modulation signal for PWM-controlling said common section is one of a sinusoidal wave signal, a trapezoidal-wave signal and a triangular-wave signal.

14. An uninterruptible power supply equipped with a power conversion apparatus comprising:

a common section having a plurality of first switch sections;

a converter section having a plurality of second switch sections, said converter section and said common section collectively forming a converter for converting an input AC power received at Ac input terminals into a DC power;

an inverter section having a plurality of third switch sections, said inverter section and said common section collectively forming an inverter for converting the DC power into an output AC power, and applying the output AC power to AC output terminals;

a converter control section for performing PWM control of the switch sections of each of said common section and said converter section to convert the input AC power into the DC power;

an inverter control section for performing PWM control of the switch sections of each of said common section and said inverter section to convert the DC power into the output AC power; and an output switch section for selectively applying to said AC output terminals said AC input power and said AC output power of said inverter section.

15. An uninterruptible power supply according to claim 14, wherein each of said converter section, said inverter section and said common section comprises at least one pair of upper and lower arm switch sections;

one of said AC input terminals is directly connected to one of said AC output terminals and to a connecting point of said upper arm switch section and said lower arm switch section of said common section;

other of said AC input terminals are connected to connecting points of said upper arm switch sections and said arm lower switch sections of said converter section; and other of said AC output terminals are connected to connecting points of said upper arm switch sections and said lower arm switch sections of said inverter section.

16. An uninterruptible power supply according to claim 14, wherein each of said converter section and said inverter section comprises two pairs of upper and lower arm switch sections;

said common section comprises one pair of upper and lower arm switch section;

two phases of a three-phase AC input power are applied to respective connecting points of said two pairs of upper and lower arm switch sections of said converter section; and two phases of three-phase AC output power are provided from respective connecting points of said two pairs of upper and lower arm switch sections of said inverter section.

17. An uninterruptible power supply according to claim 14, wherein said converter section comprises two pairs of upper and lower arm switch sections;

each of said inverter section and said common section comprises one pair of upper and lower arm switch sections;

two phases of three-phase AC input power are applied to respective connecting points of said two pairs of upper and lower arm switch sections of said converter section; and one phase of a single phase AC output power is obtained from connecting point of said one pair of upper and lower arm switch sections of said inverter section.

18. An uninterruptible power supply according to claim 14, wherein each of said converter section and said common section comprises one pair of upper and lower arm switch sections;

said inverter section comprises two pairs of upper and lower arm switch sections;

one phase of a single phase AC input power is applied to connecting point of said one pair of upper and lower arm switch sections of said converter section;

two phases of a three-phase AC output power are obtained from respective connecting points of said two pairs of upper and lower arm switch sections of said inverter section.

* * * * *